(12) United States Patent
Kameyama et al.

(10) Patent No.: US 7,391,931 B2
(45) Date of Patent: Jun. 24, 2008

(54) METHOD, APPARATUS, AND PROGRAM FOR MOVING IMAGE SYNTHESIS

(75) Inventors: Hirokazu Kameyama, Kaisei-machi (JP); Wataru Ito, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 794 days.

(21) Appl. No.: 10/750,461

(22) Filed: Jan. 2, 2004

(65) Prior Publication Data

US 2004/0207735 A1    Oct. 21, 2004

(30) Foreign Application Priority Data

| Jan. 10, 2003 | (JP) | ............................. 2003-004552 |
| Jan. 10, 2003 | (JP) | ............................. 2003-004553 |
| Jan. 10, 2003 | (JP) | ............................. 2003-004554 |
| Dec. 5, 2003 | (JP) | ............................. 2003-407319 |
| Dec. 5, 2003 | (JP) | ............................. 2003-407320 |
| Dec. 5, 2003 | (JP) | ............................. 2003-407321 |

(51) Int. Cl.
*G06K 9/32* (2006.01)
*H04B 1/66* (2006.01)

(52) U.S. Cl. ..................... 382/294; 382/295; 382/299; 375/240

(58) Field of Classification Search ................. 382/294, 382/295, 299; 375/240
See application file for complete search history.

(56) References Cited

U.S. PATENT DOCUMENTS 6,631,240 B1 * 10/2003 Salesin et al. ................. 386/68

FOREIGN PATENT DOCUMENTS

JP    2003-354244 A    12/2000

OTHER PUBLICATIONS

Y. Nakazawa et al., "Acquisition of High Resolution Digital Images by Interframe Integration" Journal of Television Academic Society, 1995, vol. 49, No. 3, p. 299-308 (translation).*
Y. Nakazawa et al., "Acquisition of High Resolution Digital Images by Interframe Integration" Journal of Television Academic Society, 1995, vol. 49, No. 3, p. 299-308.

* cited by examiner

*Primary Examiner*—Matthew C. Bella
*Assistant Examiner*—Randolph Chu
(74) *Attorney, Agent, or Firm*—Sughrue Mion, PLLC

(57) ABSTRACT

A single high resolution frame is obtained from a plurality of frames sampled from moving image data, regardless of movement of a subject included in the frames. Patches are provided in a plurality of frames including a reference frame and other frames. The patches are moved and/or deformed, and correspondent relationships are estimated for each frame. The other frames are coordinate converted based on the estimated correspondent relationships. Correlative values, which represent the degrees of correlation between the other frames and the reference frame, are calculated. The number of regions within the patches is changed, and the correlative values are calculated in the same manner. A synthesized frame is generated from the plurality of frames based on the correspondent relationship, which was estimated for the number of regions that yields the maximal correlation.

50 Claims, 15 Drawing Sheets

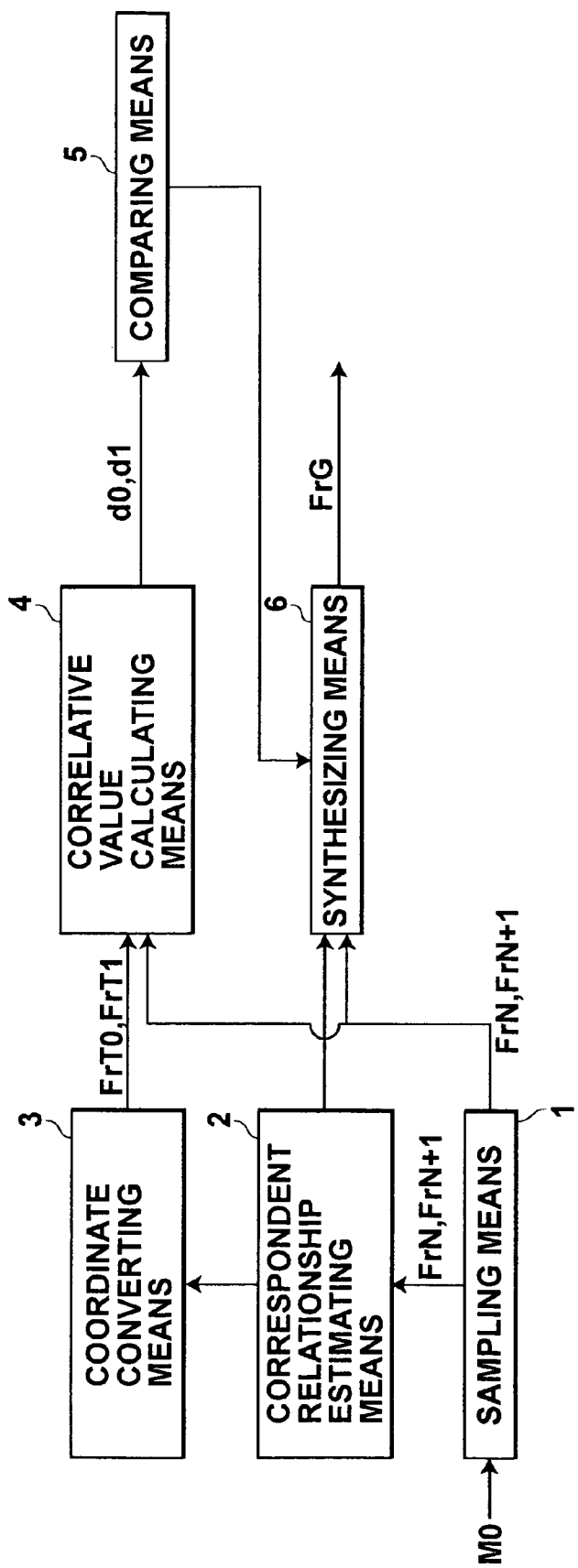

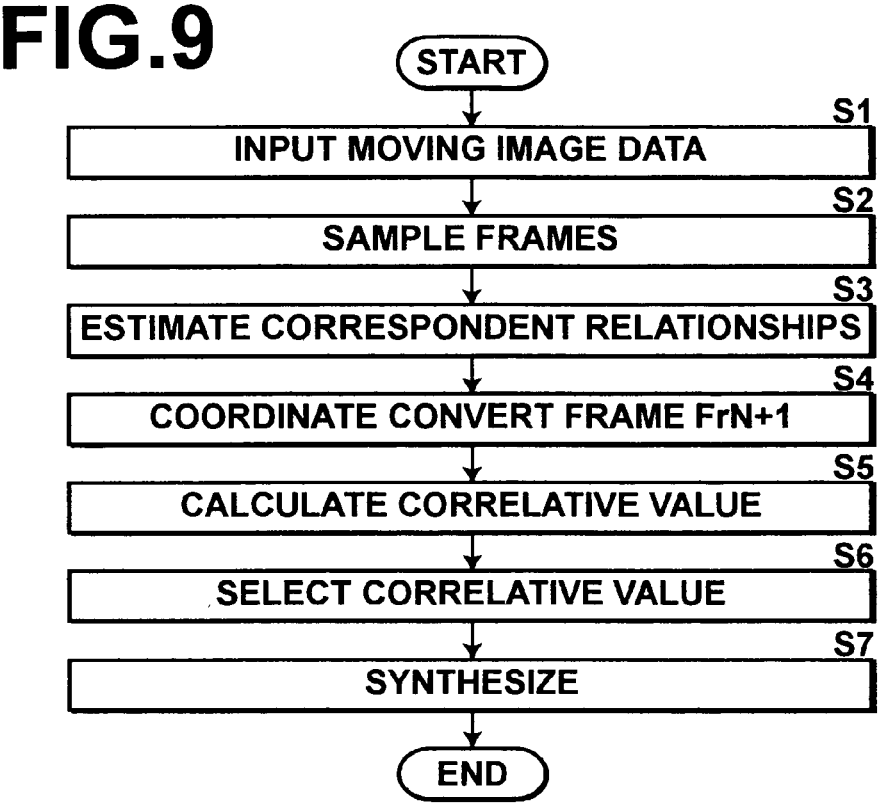
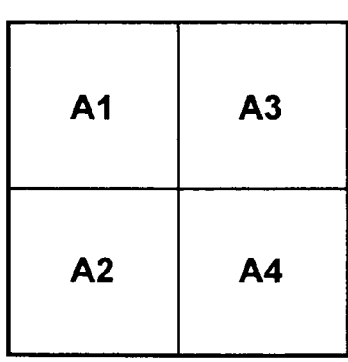

| A1 | A3 |
|----|----|
| A2 | A4 |

| A11 | A13 | A31 | A33 |
|-----|-----|-----|-----|
| A12 | A14 | A32 | A34 |
| A21 | A23 | A41 | A43 |
| A22 | A24 | A42 | A44 |

FIG.16
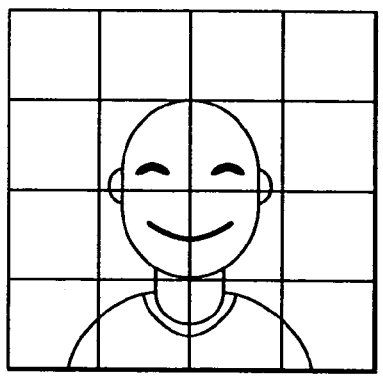
FIG.17
FIG.18
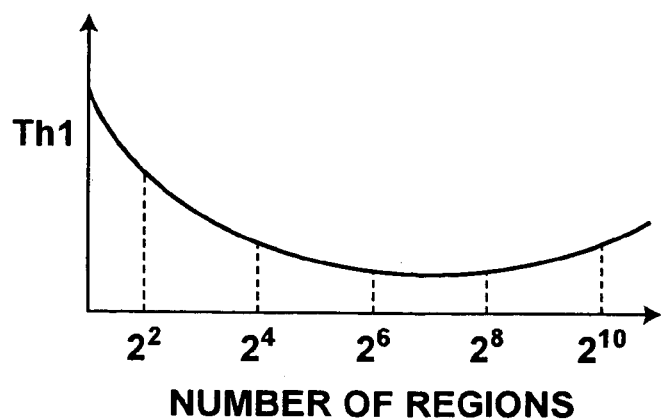

US 7,391,931 B2

METHOD, APPARATUS, AND PROGRAM FOR MOVING IMAGE SYNTHESIS

BACKGROUND OF THE INVENTION

1. Field of the Invention

The present invention relates to a method and apparatus for synthesizing a plurality of frames, sampled from a moving image, to obtain a synthesized frame having a higher resolution than the sampled frames. The present invention also relates to a program that causes a computer to execute the method for synthesizing moving images.

2. Description of the Related Art

With the recent spread of digital video cameras, it has become possible to handle moving images in units of single frames thereof. When these frames of the moving image are to be output as prints, it is necessary to heighten their resolutions, to improve the image qualities thereof. Therefore, methods for sampling a plurality of frames from a moving image, then generating a single synthesized frame having higher resolution than the plurality of frames, have been proposed (for example, in Japanese Unexamined Patent Publication No. 2000-354244). These methods derive motion vectors among the plurality of sampled frames. Then, the methods calculate signal values to be inserted among pixels, based on the motion vectors, when generating the synthesized image from the plurality of frames. In the method disclosed in Japanese Unexamined Patent Publication No. 2000-354244, each of the sampled frames is divided into a plurality of blocks. Then, perpendicular coordinate coefficients that correspond among the frames are calculated. Thereafter, data regarding high frequency components within the perpendicular coordinate coefficients are synthesized with low frequency components within other blocks, to calculate pixel values to be inserted. Therefore, necessary data is not reduced, and a synthesized frame having high image quality can be obtained. In addition, this method calculates motion vectors at resolutions finer than the distances between pixels. Therefore, movement between frames is accurately compensated for, enabling the obtainment of synthesized frames having still higher image quality.

Another method for synthesizing frames of a moving image has been proposed, as disclosed in: Y. Nakazawa, T. Komatsu, and T. Saito, "Obtainment of Finely Detailed Digital Images by Integrating Frames", Journal of the Television Academic Society, 1995, Vol. 49, No. 3 p 299-308. This method designates one of a plurality of frames as a reference frame. A reference patch, having a plurality of rectangular regions therein, is provided in the reference frame. A second patch, which is the same as the reference patch, is provided in a second frame other than the reference frame. The second patch is moved and/or deformed so that the image within the second patch matches the image within the reference patch. Then, correspondent relationships between pixels within the second patch and pixels within the reference patch are estimated, based on the moved and/or deformed second patch and the reference patch. Thereby, a plurality of frames are accurately synthesized.

In the method disclosed by Nakazawa et al., correspondent relationships among the reference frame and the other frames are estimated. Following this estimation, the reference frame and the other frames are assigned to an integrated image, having a necessary resolution. Thereby, a finely detailed synthesized frame is obtained.

There are cases in which a subject included in a frame, or included in a local portion of a frame, moves greatly or at extremely high speed among frames. In these cases, movement and/or deformation the patches in the method disclosed by Nakazawa et al. may not be able to follow such movement. In the case that the movement and/or deformation of the patches cannot follow the movement and/or deformation of the subject, the entirety of a synthesized frame may be blurred, or the subject therein, which exhibits great movement, may be blurred. Thus, there is a problem that a synthesized frame having high image quality cannot be obtained. In these cases, the movement and/or deformation of the patches can be made to follow the movement and/or deformation of the subject, by dividing the patches into a greater number of rectangular regions. However, if the number of rectangular regions is excessively increased, then each of the rectangular regions becomes extremely small, thereby causing great difficulty in following the movement and/or deformation of the subject.

SUMMARY OF THE INVENTION

The present invention has been developed in view of the circumstances described above. It is an object of the present invention to enable obtainment of synthesized frames having high image quality, employing an optimal number of rectangular regions within patches.

The first method for synthesizing moving images comprises the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents the degree of correlation between the images within the reference patch of the reference frame and the coordinate converted frame;

varying the number of rectangular regions within the reference patch and the second patch in a stepwise manner, estimating the aforementioned correspondent relationships, obtaining the coordinate converted frames, and calculating the correlative values for each number of rectangular regions, thereby obtaining a plurality of correlative values corresponding to the number of rectangular regions within the reference patch and the second patch;

comparing the degrees of correlation for each number of rectangular regions; and generating a synthesized frame having a higher resolution than either of the two frames, by administering interpolation calculations on the images within the second patch and the reference patch, based on the correspondent relationships, which were estimated among the pixels of the reference patch and the second patch having the number of rectangular regions therein that yielded the highest degree of correlation.

Here, "varying the number of rectangular regions . . . in a stepwise manner" refers both to a case in which the number of rectangular regions is gradually increased from a small number to a predetermined number in a stepwise manner, and to a case in which the number of rectangular regions is gradually decreased from a large number to a predetermined number in a stepwise manner.

Here, the "correlative value" may be calculated for each rectangular region within the patches of the coordinate converted frame and the reference patch of the reference frame. Alternatively, the correlative value may be calculated for the entire frames.

Here, "comparing the degrees of correlation" refers to comparing the correlative values between frames, in the case that the correlative values have been calculated for the entire frames. In the case that the correlative values have been calculated for each of the rectangular regions, "comparing the degrees of correlation" refers to comparing the correlative values among each of the rectangular regions. Note that the comparison is performed between correlative values which have been obtained between patches having different numbers of rectangular regions therein. As the number of rectangular regions increase, the sizes thereof decrease. Therefore, comparisons between correlative values, which have been calculated for a certain number of rectangular regions, and those which have been calculated for a different number of rectangular regions, are performed such that the correlative values of the larger sized rectangular regions are compared with the mean or median value of a plurality of the smaller sized rectangular regions.

Note that in the first method for synthesizing moving images of the present invention, the correspondent relationships employed in the generation of the synthesized frame may be those which have been estimated for each rectangular region.

In addition, in the first method for synthesizing moving images of the present invention, at least one component that constitutes the frames may be employed during the estimation of the correspondent relationships, the obtainment of the coordinate converted frames, the calculation of the correlative values, and the generation of the synthesized frame.

The second method for synthesizing moving images of the present invention comprises the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents the degree of correlation between the images within the reference patch of the reference frame and the coordinate converted frame;

varying the number of rectangular regions within the reference patch and the second patch in a stepwise manner, estimating the aforementioned correspondent relationships, obtaining the coordinate converted frames, and calculating the correlative values for each number of rectangular regions, thereby obtaining a plurality of correlative values corresponding to the number of rectangular regions within the reference patch and the second patch;

comparing the degrees of correlation for each number of rectangular regions;

obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of rectangular regions therein that yielded the highest degree of correlation;

obtaining a plurality of intermediate synthesized frames by estimating the aforementioned correspondent relationships, obtaining the coordinate converted frames, calculating the plurality of correlative values, and comparing the degrees of correlation, for all of the plurality of sampled frames; and generating a synthesized frame by synthesizing the plurality of intermediate synthesized frames.

Note that in the second method for synthesizing moving images of the present invention, the correspondent relationships may be estimated for each of the rectangular regions.

In addition, in the second method for synthesizing moving images of the present invention, at least one component that constitutes the frames may be employed during the estimation of the correspondent relationships, the obtainment of the coordinate converted frames, the calculation of the correlative values, the generation of the intermediate synthesized frames, and the generation of the synthesized frame.

The "at least one component that constitutes the frames" refers to at least one of three color components RGB, in the case that the frames are constituted by RGB color data, for example. Alternatively, in the case that the frames are constituted by luminance chrominance components YCC, the "at least one component" refers to at least one of the luminance and chrominance components, and preferably the luminance component.

The first moving image synthesizing apparatus of the present invention comprises:

a sampling means, for sampling two consecutive frames from a moving image;

a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a correlative value, which represents the degree of correlation between the images within the reference patch of the reference frame and the coordinate converted frame;

a control means, for controlling the correspondent relationship estimating means, the coordinate converting means, and the correlative value calculating means, to vary the number of rectangular regions within the reference patch and the second patch in a stepwise manner, to estimate the aforementioned correspondent relationships, to obtain the coordinate converted frames, and to calculate the correlative values for each number of rectangular regions, thereby obtaining a plurality of correlative values corresponding to the number of rectangular regions within the reference patch and the second patch;

a comparing means, for comparing the degrees of correlation for each number of rectangular regions; and a synthesizing means, for generating a synthesized frame having a higher resolution than either of the two frames, by administering interpolation calculations on the images within the second patch and the reference patch, based on the correspondent relationships, which were estimated among the pixels of the reference patch and the second patch having the number of rectangular regions therein that yielded the highest degree of correlation.

Note that in the first moving image synthesizing apparatus of the present invention, the correspondent relationships employed in the generation of the generation of the synthesized frame may be estimated for each rectangular region.

In addition, in the first moving image synthesizing apparatus of the present invention, the correspondent relationship estimating means, the coordinate converting means, the correlative value calculating means, and the synthesizing means may employ at least one component that constitutes the frames during the estimation of the correspondent relationships, the obtainment of the coordinate converted frames, the calculation of the correlative values, and the generation of the synthesized frame.

The second moving image synthesizing apparatus of the present invention comprises:

a sampling means, for sampling at least three consecutive frames from a moving image;

a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a correlative value, which represents the degree of correlation between the images within the reference patch of the reference frame and the coordinate converted frame;

a control means, for controlling the correspondent relationship estimating means, the coordinate converting means, and the correlative value calculating means, to vary the number of rectangular regions within the reference patch and the second patch in a stepwise manner, to estimate the aforementioned correspondent relationships, to obtain the coordinate converted frames, and to calculate the correlative values for each number of rectangular regions, thereby obtaining a plurality of correlative values corresponding to the number of rectangular regions within the reference patch and the second patch;

a comparing means, for comparing the degrees of correlation for each number of rectangular regions; and a synthesizing means, for: obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of rectangular regions therein that yielded the highest degree of correlation; obtaining a plurality of intermediate synthesized frames by estimating the aforementioned correspondent relationships, obtaining the coordinate converted frames, calculating the plurality of correlative values, and comparing the degrees of correlation, for all of the plurality of sampled frames; and generating a synthesized frame by synthesizing the plurality of intermediate synthesized frames.

Note that in the second moving image synthesizing apparatus of the present invention, the correspondent relationships employed in the generation of the generation of the synthesized frame may be estimated for each rectangular region.

In addition, in the second moving image synthesizing apparatus of the present invention, the correspondent relationship estimating means, the coordinate converting means, the correlative value calculating means, and the synthesizing means may employ at least one component that constitutes the frames during the estimation of the correspondent relationships, the obtainment of the coordinate converted frames, the calculation of the correlative values, the generation of the intermediate synthesized frames, and the generation of the synthesized frame.

According to the first and second methods and apparatuses for synthesizing moving images of the present invention, a moving image is sampled to obtain a plurality of consecutive frames. Next, a reference patch having at least one rectangular region therein, is provided in a first frame from among the plurality of sampled frames, which is designated as a reference frame. A second patch, which is the same as the reference patch, is provided in another of the plurality of sampled frames. Thereafter, the second patch in the other frame is moved and/or deformed so that an image within the second patch matches that within the reference image. Finally, correspondent relationships among the pixels within the second patch of the other frame and the pixels within the reference patch of the reference frame are estimated, based on the second patch after the movement and/or deformation thereof and the reference patch.

Further, a coordinate converted frame is obtained by coordinate converting the image within the second patch into a coordinate space of the reference frame, based on the correspondent relationships. Then, a correlative value, which represents the degree of correlation between the images within the reference patch of the reference frame and the coordinate converted frame, is calculated.

Thereafter, the number of rectangular regions within the reference patch and the second patch is varied in a stepwise manner. The aforementioned correspondent relationships are estimated, the coordinate converted frames are obtained, and the correlative values are calculated for each number of rectangular regions, thereby obtaining a plurality of correlative values corresponding to the numbers of rectangular regions.

Further, the degrees of correlation are compared, for each number of rectangular regions. A synthesized frame having a higher resolution than either the reference frame of the other frame is generated, by administering interpolation calculations on the images within the second patch and the reference patch, based on the correspondent relationships, which were estimated among the pixels of the reference patch and the second patch having the number of rectangular regions therein that yielded the highest degree of correlation.

Note that in the case that three or more frames were sampled, a plurality of intermediate synthesized frames are obtained, by estimating the aforementioned correspondent relationships, obtaining the coordinate converted frames, calculating the plurality of correlative values, and comparing the degrees of correlation, for all of the plurality of sampled frames. Finally a synthesized frame is generated, by synthesizing the plurality of intermediate synthesized frames.

For this reason, a synthesized frame is generated by employing a number of rectangular regions, which is optimal in following the movement and/or deformation of a subject in the frames. Thereby, a synthesized frame having high image quality is enabled to be obtained, regardless of movement of the subject in the frames.

In addition, the correspondent relationships, to be employed in the generation of the synthesized frame or the intermediate synthesized frames, may be estimated for each rectangular region. In this case, synthesized frames or intermediate synthesized frames are generated for each rectangular region within the reference patch and the second patch. Therefore, a synthesized frame is enabled to be generated, employing a number of rectangular regions, which is optimal in following the movement of the subject in each portion of the frames. Thereby, a synthesized frame having high image quality is enabled to be obtained, regardless of movement of the subject in the frames.

In addition, at least one component that constitutes the frames may be employed during the estimation of the correspondent relationships, the obtainment of the coordinate converted frames, the calculation of the correlative values, the generation of the intermediate synthesized frames (in the case that three or more frames are sampled), and the generation of the synthesized frame. Thereby, synthesized frames can be obtained, in which deterioration of image quality is reduced for each component. Accordingly, a synthesized frame, comprising synthesized frames for each component, is enabled to be obtained.

The third method for synthesizing moving images of the present invention comprises the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents the degree of correlation between the images within the reference patch of the reference frame and the coordinate converted frame;

increasing the number of rectangular regions within the reference patch and the second patch in a stepwise manner, estimating the aforementioned correspondent relationships, obtaining the coordinate converted frames, and calculating the correlative values for each number of rectangular regions, until the degree of correlation is greater than or equal to a predetermined threshold value; and generating a synthesized frame having a higher resolution than either of the two frames, by administering interpolation calculations on the images within the second patch and the reference patch, based on the correspondent relationships, which were estimated among the pixels of the reference patch and the second patch having the number of rectangular regions therein that yielded the degree of correlation greater than or equal to the threshold value.

Here, "increasing the number of rectangular regions ... in a stepwise manner" refers to a case in which the number of rectangular regions is gradually increased from a small number until the correlative value becomes greater than or equal to the predetermined threshold value. Note that if the number of rectangular regions becomes excessively large, each of the rectangular regions becomes too small. This will cause similar images to be represented in a plurality of rectangular images, which in turn may cause an inability for the movement and/or deformation of the second patch to follow the movement and/or deformation of the subject. Therefore, it is preferable that an upper limit is set for the number of rectangular regions.

Here, the "correlative value" may be calculated for the entire coordinate converted frame and the entire image within the reference patch of the reference frame, to represent the degree of correlation therebetween. Specifically, mean values or sum values of all of the correlative values for each pixel within the patches may be employed.

Here, "the degree of correlation becomes greater than or equal to a predetermined threshold value" refers to the correlative value becoming greater than or equal to the threshold value in the case that the correlative value increases with an increase in the degree of correlation. In the case that the correlative value decreases with an increase in the degree of correlation, the term refers to the correlative value becoming less than or equal to the threshold value.

The fourth method for synthesizing moving images of the present invention comprises the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating correlative values, which represent the degree of correlation between the images within the reference patch of the reference frame and the coordinate converted frame, for each of the rectangular regions;

increasing the number of rectangular regions within the reference patch and the second patch, in a stepwise manner, estimating the aforementioned correspondent relationships, obtaining the coordinate converted frames, and calculating the correlative values for each number of rectangular regions, until the degree of correlation or a representative degree of correlation of all of the rectangular regions, or of the rectangular regions at predetermined positions from among all of the rectangular regions, other than those for which the degree of correlation is less than a predetermined value, or of a predetermined number of rectangular regions from among all of the rectangular regions, other than those for which the degree of correlation is less than a predetermined value, becomes greater than or equal to a predetermined threshold value; and generating a synthesized frame having a higher resolution than either of the two frames, by administering interpolation calculations on the images within the second patch and the reference patch for each region corresponding to the rectangular regions, based on the correspondent relationships, which were estimated among the pixels of the reference patch and the second patch having the number of rectangular regions therein that yielded the degree of correlation or the representative degree of correlation greater than or equal to the threshold value.

Here, the "correlative value" may be calculated for the rectangular regions of the coordinate converted frame and the image within the reference patch of the reference frame corresponding thereto, to represent the degree of correlation therebetween. Specifically, mean values or sum values of all of the correlative values for each pixel within the rectangular regions may be employed.

Here, "those for which the degree of correlation is less than a predetermined value", from among all of the rectangular regions, refer to rectangular regions for which the degrees of correlation are extremely low, and for which the degree of correlation will not become greater than or equal to the threshold value, even if the number of rectangular regions is increased.

The "predetermined number of rectangular regions" refers to at least one of "all of the rectangular regions", or at least one rectangular region from among "all of the rectangular regions, other than those for which the degree of correlation is less than a predetermined value" (hereinafter, referred to as "subject rectangular regions"). The "predetermined number of rectangular regions" may be one, a plurality, or all of the subject rectangular regions.

Note that in the case that the percentage of the rectangular regions within the second patch or the reference patch, for which the degree correlation is greater than or equal to the threshold value, is greater than or equal to a predetermined percentage (for example, 50%), the "predetermined number of rectangular regions" may be a number of rectangular regions for which the degree of correlation is greater than or equal to the threshold value.

The "rectangular regions at predetermined positions" refers to rectangular regions within the reference patch or the second patch, at positions where a main subject of the frames is included. Specifically, rectangular regions that include a main subject such as a person's face, a complex texture, etc. may be employed thereas. Alternatively, rectangular regions positioned in the vicinity of the center of the reference patch or the second patch may be employed thereas.

The "representative degree of correlation" is a value that represents the degree of correlation for the predetermined number of rectangular regions or for the rectangular regions at the predetermined positions. Specifically, a mean value, a median value, a maximum value, a minimum value, etc. of the degrees of correlation may be employed thereas.

"Increasing the number of rectangular regions within the reference patch and the second patch, in a stepwise manner, estimating the aforementioned correspondent relationships, obtaining the coordinate converted frames, and calculating the correlative values for each number of rectangular regions, until the degree of correlation or a representative degree of correlation of all of the rectangular regions, or of the rectangular regions at predetermined positions from among all of the rectangular regions, other than those for which the degree of correlation is less than a predetermined value, or of a predetermined number of rectangular regions from among all of the rectangular regions, other than those for which the degree of correlation is less than a predetermined value, becomes greater than or equal to a predetermined threshold value" may be performed in a variety of manners. One such manner is that wherein the correlative value is calculated, for the predetermined number of the subject rectangular regions or the subject rectangular regions at predetermined positions, for each number of rectangular regions, until the degree of correlation or the representative degree of correlation becomes greater than or equal to the threshold value. Alternatively, a case may be considered in which the degree of correlation or a representative degree of correlation for a portion of the predetermined number of subject rectangular regions or the subject rectangular regions at predetermined positions are greater than or equal to the threshold value. In this case, the increase in the number of rectangular regions and the calculation of the correlative values is only performed for the rectangular regions other than the portion for which the degree of correlation or the representative degree of correlation is greater than or equal to the threshold value. In the latter case, the time required for calculating the correlative value can be reduced when compared to the former case.

In the fourth method for synthesizing moving images, there are cases in which the number of rectangular regions that yields the degree of correlation or the representative degree of correlation differs among local areas within the reference patch and the second patch. Therefore, "administering interpolation calculations . . . for each region corresponding to the rectangular regions" refers to administering interpolation calculations based on different correspondent relationships, which have been estimated for the number of rectangular regions corresponding to different local areas within the reference patch and the second patch.

Note that in the third and fourth methods for synthesizing moving images, the threshold value may be set to be small, according to the increase in the number of rectangular regions, until the number of rectangular regions reaches a predetermined value, and the threshold value may be set to be large, when the number of rectangular regions exceeds the predetermined value.

In addition, in the third and fourth methods for synthesizing moving images of the present invention, at least one component that constitutes the frames may be employed during the estimation of the correspondent relationships, the obtainment of the coordinate converted frames, the calculation of the correlative values, and the generation of the synthesized frame.

The "at least one component that constitutes the frames" refers to at least one of three color components RGB, in the case that the frames are constituted by RGB color data, for example. Alternatively, in the case that the frames are constituted by luminance chrominance components YCC, the "at least one component" refers to at least one of the luminance and chrominance components, and preferably the luminance component.

The fifth method for synthesizing moving images of the present invention comprises the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents the degree of correlation between the images within the reference patch of the reference frame and the coordinate converted frame;

increasing the number of rectangular regions within the reference patch and the second patch in a stepwise manner, estimating the aforementioned correspondent relationships, obtaining the coordinate converted frames, and calculating the correlative values for each number of rectangular regions, until the degree of correlation is greater than or equal to a predetermined threshold value;

obtaining an intermediate synthesized frame having a higher resolution than either the reference frame of the other frame, by administering interpolation calculations on the images within the second patch and the reference patch for each region corresponding to the rectangular regions, based on the correspondent relationships, which were estimated among the pixels of the reference patch and the second patch having the number of rectangular regions therein that yielded the degree of correlation greater than or equal to the threshold value;

obtaining a plurality of intermediate synthesized frames by estimating the aforementioned correspondent relationships, obtaining the coordinate converted frames, and calculating the plurality of correlative values, for all of the plurality of sampled frames; and generating a synthesized frame by synthesizing the plurality of intermediate synthesized frames.

The sixth method for synthesizing moving images of the present invention comprises the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents the degree of correlation between the images within the reference patch of the reference frame and the coordinate converted frame;

increasing the number of rectangular regions within the reference patch and the second patch in a stepwise manner, estimating the aforementioned correspondent relationships, obtaining the coordinate converted frames, and calculating the correlative values for each number of rectangular regions, until the degree of correlation or a representative degree of correlation of all of the rectangular regions, or of the rectangular regions at predetermined positions from among all of the rectangular regions, other than those for which the degree of correlation is less than a predetermined value, or of a predetermined number of rectangular regions from among all of the rectangular regions, other than those for which the degree of correlation is less than a predetermined value, becomes greater than or equal to a predetermined threshold value;

obtaining an intermediate synthesized frame having a higher resolution than either the reference frame of the other frame, by administering interpolation calculations on the images within the second patch and the reference patch for each region corresponding to the rectangular regions, based on the correspondent relationships, which were estimated among the pixels of the reference patch and the second patch having the number of rectangular regions therein that yielded the degree of correlation or the representative degree of correlation greater than or equal to the threshold value;

obtaining a plurality of intermediate synthesized frames by estimating the aforementioned correspondent relationships, obtaining the coordinate converted frames, and calculating the plurality of correlative values, for all of the plurality of sampled frames; and generating a synthesized frame by synthesizing the plurality of intermediate synthesized frames.

Note that in the fifth and sixth methods for synthesizing moving images, the threshold value may be set to be small, according to the increase in the number of rectangular regions, until the number of rectangular regions reaches a predetermined value, and the threshold value may be set to be large, when the number of rectangular regions exceeds the predetermined value.

In addition, in the fifth and sixth methods for synthesizing moving images of the present invention, at least one component that constitutes the frames may be employed during the estimation of the correspondent relationships, the obtainment of the coordinate converted frames, the calculation of the correlative values, the obtainment of the intermediate synthesized frames, and the generation of the synthesized frame.

The third moving image synthesizing apparatus of the present invention comprises:

a sampling means, for sampling two consecutive frames from a moving image;

a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a correlative value, which represents the degree of correlation between the images within the reference patch of the reference frame and the coordinate converted frame;

a control means, for controlling the correspondent relationship estimating means, the coordinate converting means, and the correlative value calculating means, to increase the number of rectangular regions within the reference patch and the second patch in a stepwise manner, to estimate the aforementioned correspondent relationships, to obtain the coordinate converted frames, and to calculate the correlative values for each number of rectangular regions, until the degree of correlation is greater than or equal to a predetermined threshold value; and a synthesizing means, for generating a synthesized frame having a higher resolution than either of the two frames, by administering interpolation calculations on the images within the second patch and the reference patch, based on the correspondent relationships, which were estimated among the pixels of the reference patch and the second patch having the number of rectangular regions therein that yielded the degree of correlation greater than or equal to the predetermined threshold value.

The fourth moving image synthesizing apparatus of the present invention comprises:

a sampling means, for sampling two consecutive frames from a moving image;

a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a correlative value, which represents the degree of correlation between the images within the reference patch of the reference frame and the coordinate converted frame;

a control means, for controlling the correspondent relationship estimating means, the coordinate converting means, and the correlative value calculating means, to increase the number of rectangular regions within the reference patch and the second patch in a stepwise manner, to estimate the aforementioned correspondent relationships, to obtain the coordinate converted frames, and to calculate the correlative values for each number of rectangular regions, until the degree of correlation or a representative degree of correlation of all of the rectangular regions, or of the rectangular regions at predetermined positions from among all of the rectangular regions, other than those for which the degree of correlation is less than a predetermined value, or of a predetermined number of rectangular regions from among all of the rectangular regions, other than those for which the degree of correlation is less than a predetermined value, becomes greater than or equal to a predetermined threshold value; and a synthesizing means, for generating a synthesized frame having a higher resolution than either of the two frames, by administering interpolation calculations on the images within the second patch and the reference patch for each region corresponding to the rectangular regions, based on the correspondent relationships, which were estimated among the pixels of the reference patch and the second patch having the number of rectangular regions therein that yielded the degree of correlation or the representative degree of correlation greater than or equal to the predetermined threshold value.

Note that in the third and fourth moving image synthesizing apparatuses, a construction may be adopted wherein:

the control means decreases the threshold value, according to the increase in the number of rectangular regions, until the number of rectangular regions reaches a predetermined value, and increases the threshold value, when the number of rectangular regions exceeds the predetermined value.

In addition, in the third and fourth moving image synthesizing apparatus, a construction may be adopted wherein:

the correspondent relationship estimating means, the coordinate converting means, the correlative value calculating means, and the synthesizing means employ at least one component that constitutes the frames during the estimation of the correspondent relationships, the obtainment of the coordinate converted frames, the calculation of the correlative values, and the generation of the synthesized frame.

The fifth moving image synthesizing apparatus of the present invention comprises:

a sampling means, for sampling at least three consecutive frames from a moving image;

a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a correlative value, which represents the degree of correlation between the images within the reference patch of the reference frame and the coordinate converted frame;

a control means, for controlling the correspondent relationship estimating means, the coordinate converting means, and the correlative value calculating means, to increase the number of rectangular regions within the reference patch and the second patch in a stepwise manner, to estimate the aforementioned correspondent relationships, to obtain the coordinate converted frames, and to calculate the correlative values for each number of rectangular regions, until the degree of correlation is greater than or equal to a predetermined threshold value; and a synthesizing means, for: obtaining an intermediate synthesized frame having a higher resolution than either the reference frame of the other frame, by: administering interpolation calculations on the images within the second patch and the reference patch, based on the correspondent relationships, which were estimated among the pixels of the reference patch and the second patch having the number of rectangular regions therein that yielded the degree of correlation greater than or equal to the threshold value; obtaining a plurality of intermediate synthesized frames by estimating the aforementioned correspondent relationships obtaining the coordinate converted frames, and calculating the plurality of correlative values, for all of the plurality of sampled frames; and generating a synthesized frame by synthesizing the plurality of intermediate synthesized frames.

The sixth moving image synthesizing apparatus of the present invention comprises:

a sampling means, for sampling at least three consecutive frames from a moving image;

a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a correlative value, which represents the degree of correlation between the images within the reference patch of the reference frame and the coordinate converted frame;

a control means, for controlling the correspondent relationship estimating means, the coordinate converting means, and the correlative value calculating means, to increase the number of rectangular regions within the reference patch and the second patch in a stepwise manner, to estimate the aforementioned correspondent relationships, to obtain the coordinate converted frames, and to calculate the correlative values for each number of rectangular regions, until the degree of correlation or a representative degree of correlation of all of the rectangular regions, or of the rectangular regions at predetermined positions from among all of the rectangular regions, other than those for which the degree of correlation is less than a predetermined value, or of a predetermined number of rectangular regions from among all of the rectangular regions, other than those for which the degree of correlation is less than a predetermined value, becomes greater than or equal to a predetermined threshold value; and a synthesizing means, for: obtaining an intermediate synthesized frame having a higher resolution than either the reference frame of the other frame, by: administering interpolation calculations on the images within the second patch and the reference patch for each region corresponding to the rectangular regions, based on the correspondent relationships, which were estimated among the pixels of the reference patch and the second patch having the number of rectangular regions therein that yielded the degree of correlation or the representative degree of correlation greater than or equal to the threshold value; obtaining a plurality of intermediate synthesized frames by estimating the aforementioned correspondent relationships obtaining the coordinate converted frames, and calculating the plurality of correlative values, for all of the plurality of sampled frames; and generating a synthesized frame by synthesizing the plurality of intermediate synthesized frames.

Note that in the fifth and sixth moving image synthesizing apparatuses, a construction may be adopted wherein:

the control means decreases the threshold value, according to the increase in the number of rectangular regions, until the number of rectangular regions reaches a predetermined value, and increases the threshold value, when the number of rectangular regions exceeds the predetermined value.

In addition, in the fifth and sixth moving image synthesizing apparatus, a construction may be adopted wherein:

the correspondent relationship estimating means, the coordinate converting means, the correlative value calculating means, and the synthesizing means employ at least one component that constitutes the frames during the estimation of the correspondent relationships, the obtainment of the coordinate converted frames, the calculation of the correlative values, the obtainment of the intermediate synthesized frames, and the generation of the synthesized frame.

According to the third method and the third apparatus for synthesizing moving images of the present invention, a moving image is sampled to obtain a plurality of consecutive frames. Next, a reference patch having at least one rectangular region therein, is provided in a first frame from among the plurality of sampled frames, which is designated as a reference frame. A second patch, which is the same as the reference patch, is provided in another of the plurality of sampled frames. Thereafter, the second patch in the other frame is moved and/or deformed so that an image within the second patch matches that within the reference image. Finally, correspondent relationships among the pixels within the second patch of the other frame and the pixels within the reference patch of the reference frame are estimated, based on the second patch after the movement and/or deformation thereof and the reference patch.

Further, a coordinate converted frame is obtained by coordinate converting the image within the second patch into a coordinate space of the reference frame, based on the correspondent relationships. Then, a correlative value, which represents the degree of correlation between the images within the reference patch of the reference frame and the coordinate converted frame, is calculated. Thereafter, the number of rectangular regions within the reference patch and the second patch is increased in a stepwise manner. The aforementioned correspondent relationships are estimated, the coordinate converted frames are obtained, and the correlative values are calculated for each number of rectangular regions. The number of rectangular regions within the reference patch and the second patch are increased until the degree of correlation becomes greater than or equal to the threshold value.

A synthesized frame having a higher resolution than either the reference frame of the other frame is generated, by administering interpolation calculations on the images within the second patch and the reference patch, based on the correspondent relationships, which were estimated among the pixels of the reference patch and the second patch having the number of rectangular regions therein that yielded the degree of correlation greater than or equal to the threshold value.

Note that in the case that three or more frames are sampled, as in the fifth method and the fifth apparatus for synthesizing moving images, a plurality of intermediate synthesized frames are obtained, by estimating the aforementioned correspondent relationships, obtaining the coordinate converted frames, and calculating the plurality of correlative values, for all of the plurality of sampled frames. Finally a synthesized frame is generated, by synthesizing the plurality of intermediate synthesized frames.

For this reason, a synthesized frame is generated by employing a number of rectangular regions, which is optimal in following the movement and/or deformation of a subject in the frames. Thereby, a synthesized frame having high image quality is enabled to be obtained, regardless of movement of the subject in the frames.

According to the fourth method and the fourth apparatus for synthesizing moving images of the present invention, a moving image is sampled to obtain a plurality of consecutive frames. Next, a reference patch having at least one rectangular region therein, is provided in a first frame from among the plurality of sampled frames, which is designated as a reference frame. A second patch, which is the same as the reference patch, is provided in another of the plurality of sampled frames. Thereafter, the second patch in the other frame is moved and/or deformed so that an image within the second patch matches that within the reference image. Finally, correspondent relationships among the pixels within the second patch of the other frame and the pixels within the reference patch of the reference frame are estimated, based on the second patch after the movement and/or deformation thereof and the reference patch.

Further, a coordinate converted frame is obtained by coordinate converting the image within the second patch into a coordinate space of the reference frame, based on the correspondent relationships. Then, a correlative value, which represents the degree of correlation between the images within the reference patch of the reference frame and the coordinate converted frame, is calculated. Thereafter, the number of rectangular regions within the reference patch and the second patch is increased in a stepwise manner. The aforementioned correspondent relationships are estimated, the coordinate converted frames are obtained, and the correlative values are calculated for each number of rectangular regions. The number of rectangular regions within the reference patch and the second patch are increased until the degree of correlation or the representative degree of correlation of all of the rectangular regions, or of the rectangular regions at predetermined positions from among all of the rectangular regions, other than those for which the degree of correlation is less than a predetermined value, or of a predetermined number of rectangular regions from among all of the rectangular regions, other than those for which the degree of correlation is less than a predetermined value, becomes greater than or equal to a predetermined threshold value.

A synthesized frame having a higher resolution than either the reference frame of the other frame is generated, by administering interpolation calculations on the images within the second patch and the reference patch, based on the correspondent relationships, which were estimated among the pixels of the reference patch and the second patch having the number of rectangular regions therein that yielded the degree of correlation or the representative degree of correlation greater than or equal to the threshold value.

Note that in the case that three or more frames are sampled, as in the sixth method and the sixth apparatus for synthesizing moving images, a plurality of intermediate synthesized frames are obtained, by estimating the aforementioned correspondent relationships, obtaining the coordinate converted frames, and calculating the plurality of correlative values, for all of the plurality of sampled frames. Finally a synthesized frame is generated, by synthesizing the plurality of intermediate synthesized frames.

For this reason, a synthesized frame is generated by employing a number of rectangular regions, which is optimal in following the movement and/or deformation of a subject in the frames. Thereby, a synthesized frame having high image quality is enabled to be obtained, regardless of movement of the subject in the frames.

Note that the threshold value, to be compared against the degree of correlation or the representative degree of correlation, may be set to be small, according to the increase in the number of rectangular regions, until the number of rectangular regions reaches a predetermined value, and the threshold value may be set to be large, when the number of rectangular regions exceeds the predetermined value.

In addition, at least one component that constitutes the frames may be employed during the estimation of the correspondent relationships, the obtainment of the coordinate converted frames, the calculation of the correlative values, the generation of the intermediate synthesized frames (in the case that three or more frames are sampled), and the generation of the synthesized frame. Thereby, synthesized frames can be obtained, in which deterioration of image quality is reduced for each component. Accordingly, a synthesized frame, comprising synthesized frames for each component, is enabled to be obtained.

The seventh method for synthesizing moving images of the present invention comprises the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents the degree of correlation between the images within the reference patch of the reference frame and the coordinate converted frame;

increasing the number of rectangular regions within the reference patch and the second patch in a stepwise manner by one step, estimating the aforementioned correspondent relationships, obtaining the coordinate converted frames, and calculating the correlative value, thereby obtaining a second correlative value;

calculating the variation between the first and second correlative values;

increasing the number of rectangular regions within the reference patch and the second patch in a stepwise manner an additional step, estimating the aforementioned correspondent relationships, obtaining the coordinate converted frames, calculating the first and second correlative values, and calculating the variation between the first and second correlative values of consecutive steps, until the variation becomes less than or equal to a predetermined threshold value; and generating a synthesized frame having a higher resolution than either of the two frames, by administering interpolation calculations on the images within the second patch and the reference patch, based on the correspondent relationships, which were estimated among the pixels of either of the reference patches and the second patches having the number of rectangular regions therein that yielded the variation less than or equal to the threshold value.

Here, "increasing the number of rectangular regions . . . in a stepwise manner an additional step" refers to increasing the number of rectangular regions one step in the stepwise manner.

Here, the "variation between the first and second correlative values" refers to a value that represents the amount by which the first and second correlative values differ. The first correlative value includes that which was calculated for the initial step in which the correspondent relationship was first estimated. The second correlative value is that which was calculated for the number of rectangular regions one step greater than that for which the first correlative value was calculated. Specifically, the difference between the two correlative values, or an absolute value of the difference may be employed as the variation.

The eighth method for synthesizing moving images of the present invention comprises the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents the degree of correlation between the images within the reference patch of the reference frame and the coordinate converted frame, for each of the rectangular regions;

increasing the number of rectangular regions within the reference patch and the second patch in a stepwise manner by one step, estimating the aforementioned correspondent relationships, obtaining the coordinate converted frames, and calculating the correlative value, thereby obtaining a second correlative value;

calculating the variation between the first and second correlative values for each of the rectangular regions;

increasing the number of rectangular regions within the reference patch and the second patch in a stepwise manner an additional step, estimating the aforementioned correspondent relationships, obtaining the coordinate converted frames, calculating the first and second correlative values, and calculating the variation between the first and second correlative values of consecutive steps, until the variation or a representative variation of all of the rectangular regions, or of the rectangular regions at predetermined positions from among all of the rectangular regions, other than those for which the variation is greater than or equal to a predetermined value, or of a predetermined number of rectangular regions from among all of the rectangular regions, other than those for which the variation is greater than or equal to a predetermined value, becomes less than or equal to a predetermined threshold value; and generating a synthesized frame having a higher resolution than either of the two frames, by administering interpolation calculations on the images within the second patch and the reference patch for each region corresponding to the rectangular regions, based on the correspondent relationships, which were estimated among the pixels of either of the reference patches and the second patches having the number of rectangular regions therein that yielded the variation or the representative variation less than or equal to the threshold value.

Here, "those for which the variation is greater than or equal to a predetermined value", from among all of the rectangular regions, refer to rectangular regions for which the degrees of correlation are extremely low, and for which the variation will not become less than or equal to the threshold value, even if the number of rectangular regions is increased.

The "predetermined number of rectangular regions" refers to at least one of "all of the rectangular regions", or at least one rectangular region from among "all of the rectangular regions, other than those for which the degree of correlation is less than a predetermined value" (hereinafter, referred to as "subject rectangular regions"). The "predetermined number of rectangular regions" may be one, a plurality, or all of the subject rectangular regions.

Note that in the case that the percentage of the rectangular regions within the second patch or the reference patch, for which the variation is less than or equal to the threshold value, is greater than or equal to a predetermined percentage (for example, 50%), the "predetermined number of rectangular regions" may be a number of rectangular regions for which the variation is less than or equal to the threshold value.

The "rectangular regions at predetermined positions" refers to rectangular regions within the reference patch or the second patch, at positions where a main subject of the frames is included. Specifically, rectangular regions that include a main subject such as a person's face, a complex texture, etc. may be employed thereas. Alternatively, rectangular regions positioned in the vicinity of the center of the reference patch or the second patch may be employed thereas.

The "representative variation" is a value that represents the variation for the predetermined number of rectangular regions or for the rectangular regions at the predetermined positions. Specifically, a mean value, a median value, a maximum value, a minimum value, etc. of the variation may be employed thereas.

"Increasing the number of rectangular regions within the reference patch and the second patch in a stepwise manner an additional step, estimating the aforementioned correspondent relationships, obtaining the coordinate converted frames, calculating the first and second correlative values, and calculating the variation between the first and second correlative values of consecutive steps, until the variation or a representative variation of all of the rectangular regions, or of the rectangular regions at predetermined positions from among all of the rectangular regions, other than those for which the variation is greater than or equal to a predetermined value, or of a predetermined number of rectangular regions from among all of the rectangular regions, other than those for which the variation is greater than or equal to a predetermined value, becomes less than or equal to a predetermined threshold value" may be performed in a variety of manners. One such manner is that wherein the variation is calculated, for the predetermined number of the subject rectangular regions or the subject rectangular regions at predetermined positions, for each number of rectangular regions, until the variation or the representative variation becomes less than or equal to the threshold value. Alternatively, a case may be considered in which the variation or a representative variation for a portion of the predetermined number of subject rectangular regions or the subject rectangular regions at predetermined positions are less than or equal to the threshold value. In this case, the increase in the number of rectangular regions and the calculation of the variation is only performed for the rectangular regions other than the portion for which the variation or the representative variation is less than or equal to the threshold value. In the latter case, the time required for calculating the variation can be reduced when compared to the former case.

In the eighth method for synthesizing moving images, there are cases in which the number of rectangular regions that yields the variation or the representative variation differs among local areas within the reference patch and the second patch. Therefore, "administering interpolation calculations . . . for each region corresponding to the rectangular regions" refers to administering interpolation calculations based on different correspondent relationships, which have been estimated for the number of rectangular regions corresponding to different local areas within the reference patch and the second patch.

Note that in the seventh and eighth methods for synthesizing moving images of the present invention, the predetermined threshold value may be set to be larger, according to the increase in the number of rectangular regions, when the number of rectangular regions exceeds a predetermined value.

In addition, in the seventh and eighth methods for synthesizing moving images, at least one component that constitutes the frames may be employed during the estimation of the correspondent relationships, the obtainment of the coordinate converted frames, the calculation of the correlative values, the calculation of the variations, and the generation of the synthesized frame.

The "at least one component that constitutes the frames" refers to at least one of three color components RGB, in the case that the frames are constituted by RGB color data, for example. Alternatively, in the case that the frames are constituted by luminance chrominance components YCC, the "at least one component" refers to at least one of the luminance and chrominance components, and preferably the luminance component.

The ninth method for synthesizing moving images of the present invention comprises the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents the degree of correlation between the images within the reference patch of the reference frame and the coordinate converted frame;

increasing the number of rectangular regions within the reference patch and the second patch in a stepwise manner by one step, estimating the aforementioned correspondent relationships, obtaining the coordinate converted frames, and calculating the correlative value, thereby obtaining a second correlative value;

calculating the variation between the first and second correlative values;

increasing the number of rectangular regions within the reference patch and the second patch in a stepwise manner an additional step, estimating the aforementioned correspondent relationships, obtaining the coordinate converted frames, calculating the first and second correlative values, and calculating the variation between the first and second correlative values of consecutive steps, until the variation becomes less than or equal to a predetermined threshold value;

obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of rectangular regions therein that yielded the variation less than or equal to the threshold value;

obtaining a plurality of intermediate synthesized frames by estimating the aforementioned correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

The tenth method for synthesizing moving images of the present invention comprises the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among the pixels within the second patch of the other frame and the pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents the degree of correlation between the images within the reference patch of the reference frame and the coordinate converted frame, for each of the rectangular regions;

increasing the number of rectangular regions within the reference patch and the second patch in a stepwise manner by one step, estimating the aforementioned correspondent relationships, obtaining the coordinate converted frames, and calculating the correlative value, thereby obtaining a second correlative value;

calculating the variation between the first and second correlative values for each of the rectangular regions;

increasing the number of rectangular regions within the reference patch and the second patch in a stepwise manner an additional step, estimating the aforementioned correspondent relationships, obtaining the coordinate converted frames, calculating the first and second correlative values, and calculating the variation between the first and second correlative values of consecutive steps, until the variation or a representative variation of all of the rectangular regions, or of the rectangular regions at predetermined positions from among all of the rectangular regions, other than those for which the variation is greater than or equal to a predetermined value, or of a predetermined number of rectangular regions from among all of the rectangular regions, other than those for which the variation is greater than or equal to a predetermined value, becomes less than or equal to a predetermined threshold value;

obtaining an intermediate synthesized frame having a higher resolution than either the reference frame of the other frame, by administering interpolation calculations on the images within the second patch and the reference patch for each region corresponding to the rectangular regions, based on the correspondent relationships, which were estimated among the pixels of the reference patch and the second patch having the number of rectangular regions therein that yielded the variation or the representative variation less than or equal to the threshold value;

obtaining a plurality of intermediate synthesized frames by estimating the aforementioned correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

Note that in the ninth and tenth methods for synthesizing moving images of the present invention, the predetermined threshold value may be set to be larger, according to the increase in the number of rectangular regions, when the number of rectangular regions exceeds a predetermined value.

In addition, in the ninth and tenth methods for synthesizing moving images, at least one component that constitutes the frames may be employed during the estimation of the correspondent relationships, the obtainment of the coordinate converted frames, the calculation of the correlative values, the calculation of the variations, the obtainment of the intermediate synthesized frames, and the generation of the synthesized frame.

The seventh moving image synthesizing apparatus of the present invention comprises:

a sampling means, for sampling two consecutive frames from a moving image;

a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, is based on the correspondent relationships;

a correlative value calculating means, for calculating a first correlative value, which represents the degree of correlation between the images within the reference patch of the reference frame and the coordinate converted frame;

a control means, for controlling the correspondent relationship estimating means, the coordinate converting means, and the correlative value calculating means, to increase the number of rectangular regions within the reference patch and the second patch in a stepwise manner by one step, to estimate the aforementioned correspondent relationships, to obtain the coordinate converted frames, and to calculate the correlative value, thereby obtaining a second correlative value;

a variation calculating means, for calculating the variation between the first and second correlative values;

a comparing means, for controlling the correspondent relationship estimating means, the coordinate converting means, the correlative relationship calculating means, and the variation calculating means, to increase the number of rectangular regions within the reference patch and the second patch in a stepwise manner an additional step, to estimate the aforementioned correspondent relationships, to obtain the coordinate converted frames, to calculate the first and second correlative values, and to calculate the variation between the first and second correlative values of consecutive steps, until the variation becomes less than or equal to a predetermined threshold value; and a synthesizing means, for generating a synthesized frame having a higher resolution than either of the two frames, by administering interpolation calculations on the images within the second patch and the reference patch, based on the correspondent relationships, which were estimated among the pixels of either of the reference patches and the second patches having the number of rectangular regions therein that yielded the variation less than or equal to the threshold value.

The eighth moving image synthesizing apparatus of the present invention comprises:

a sampling means, for sampling two consecutive frames from a moving image;

a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a first correlative value, which represents the degree of correlation between the images within the reference patch of the reference frame and the coordinate converted frame, for each of the rectangular regions;

a control means, for controlling the correspondent relationship estimating means, the coordinate converting means, and the correlative value calculating means, to increase the number of rectangular regions within the reference patch and the second patch in a stepwise manner by one step, to estimate the aforementioned correspondent relationships, to obtain the coordinate converted frames, and to calculate the correlative value, thereby obtaining a second correlative value;

a variation calculating means, for calculating the variation between the first and second correlative values for each of the rectangular regions;

a comparing means, for controlling the correspondent relationship estimating means, the coordinate converting means, the correlative relationship calculating means, and the variation calculating means, to increase the number of rectangular regions within the reference patch and the second patch in a stepwise manner an additional step, to estimate the aforementioned correspondent relationships, to obtain the coordinate converted frames, to calculate the first and second correlative values, and to calculate the variation between the first and second correlative values of consecutive steps, until the variation or a representative variation of all of the rectangular regions, or of the rectangular regions at predetermined positions from among all of the rectangular regions, other than those for which the variation is greater than or equal to a predetermined value, or of a predetermined number of rectangular regions from among all of the rectangular regions, other than those for which the variation is greater than or equal to a predetermined value, becomes less than or equal to a predetermined threshold value; and a synthesizing means, for generating a synthesized frame having a higher resolution than either of the two frames, by administering interpolation calculations on the images within the second patch and the reference patch for each region corresponding to the rectangular regions, based on the correspondent relationships, which were estimated among the pixels of either of the reference patches and the second patches having the number of rectangular regions therein that yielded the variation or the representative variation less than or equal to the threshold value.

Note that in the seventh and eighth moving image synthesizing apparatuses of the present invention, the control means may set the predetermined threshold value to be larger, according to the increase in the number of rectangular regions, when the number of rectangular regions exceeds a predetermined value.

In addition, in the seventh and eighth moving image synthesizing apparatuses of the present invention, the correspondent relationship estimating means, the coordinate converting means, the correlative value calculating means, the control means, the variation calculating means, the comparing means, and the synthesizing means may employ at least one component that constitutes the frames during the estimation of the correspondent relationships, the obtainment of the coordinate converted frames, the calculation of the correlative values, the calculation of the variations, and the generation of the synthesized frame.

The ninth moving image synthesizing apparatus of the present invention comprises:

a sampling means, for sampling at least three consecutive frames from a moving image;

a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a first correlative value, which represents the degree of correlation between the images within the reference patch of the reference frame and the coordinate converted frame;

a control means, for controlling the correspondent relationship estimating means, the coordinate converting means, and the correlative value calculating means, to increase the number of rectangular regions within the reference patch and the second patch in a stepwise manner by one step, to estimate the aforementioned correspondent relationships, to obtain the coordinate converted frames, and to calculate the correlative value, thereby obtaining a second correlative value;

a variation calculating means, for calculating the variation between the first and second correlative values;

a comparing means, for controlling the correspondent relationship estimating means, the coordinate converting means, the correlative value calculating means, and the variation calculating means, to increase the number of rectangular regions within the reference patch and the second patch in a stepwise manner an additional step, to estimate the aforementioned correspondent relationships, to obtain the coordinate converted frames, to calculate the first and second correlative values, and to calculate the variation between the first and second correlative values of consecutive steps, until the variation becomes less than or equal to a predetermined threshold value; and a synthesizing means, for: obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of rectangular regions therein that yielded the variation less than or equal to the threshold value; obtaining a plurality of intermediate synthesized frames by estimating the aforementioned correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

The tenth moving image synthesizing apparatus of the present invention comprises:

a sampling means, for sampling at least three consecutive frames from a moving image;

a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among the pixels within the second patch of the other frame and the pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a first correlative value, which represents the degree of correlation between the images within the reference patch of the reference frame and the coordinate converted frame, for each of the rectangular regions;

a control means, for controlling the correspondent relationship estimating means, the coordinate converting means, and the correlative value calculating means, to increase the number of rectangular regions within the reference patch and the second patch in a stepwise manner by one step, to estimate the aforementioned correspondent relationships, to obtain the coordinate converted frames, and to calculate the correlative value, thereby obtaining a second correlative value;

a variation calculating means, for calculating the variation between the first and second correlative values for each of the rectangular regions;

a comparing means, for controlling the correspondent relationship estimating means, the coordinate converting means, the correlative value calculating means, and the variation calculating means, to increase the number of rectangular regions within the reference patch and the second patch in a stepwise manner an additional step, to estimate the aforementioned correspondent relationships, to obtain the coordinate converted frames, to calculate the first and second correlative values, and to calculate the variation between the first and second correlative values of consecutive steps, until the variation of all of the rectangular regions, or of the rectangular regions at predetermined positions from among all of the rectangular regions, other than those for which the variation is greater than or equal to a predetermined value, or of a predetermined number of rectangular regions from among all of the rectangular regions, other than those for which the variation is greater than or equal to a predetermined value, becomes less than or equal to a predetermined threshold value; and a synthesizing means, for: obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of rectangular regions therein that yielded the variation or the representative variation less than or equal to the threshold value; obtaining a plurality of intermediate synthesized frames by estimating the aforementioned correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

Note that in the ninth and tenth moving image synthesizing apparatuses of the present invention, the control means may set the predetermined threshold value to be larger, according to the increase in the number of rectangular regions, when the number of rectangular regions exceeds a predetermined value.

In addition, in the ninth and tenth moving image synthesizing apparatuses of the present invention, the correspondent relationship estimating means, the coordinate converting means, the correlative value calculating means, the control means, the variation calculating means, the comparing means, and the synthesizing means may employ at least one component that constitutes the frames during the estimation of the correspondent relationships, the obtainment of the coordinate converted frames, the calculation of the correlative values, the calculation of the variations, the obtainment of the intermediate synthesized frames, and the generation of the synthesized frame.

According to the seventh method and the seventh apparatus for synthesizing moving images of the present invention, a moving image is sampled to obtain a plurality of consecutive frames. Next, a reference patch having at least one rectangular region therein, is provided in a first frame from among the plurality of sampled frames, which is designated as a reference frame. A second patch, which is the same as the reference patch, is provided in another of the plurality of sampled frames. Thereafter, the second patch in the other frame is moved and/or deformed so that an image within the second patch matches that within the reference image. Finally, correspondent relationships among the pixels within the second patch of the other frame and the pixels within the reference patch of the reference frame are estimated, based on the second patch after the movement and/or deformation thereof and the reference patch.

Further, a coordinate converted frame is obtained by coordinate converting the image within the second patch into a coordinate space of the reference frame, based on the correspondent relationships. Then, the first correlative value, which represents the degree of correlation between the images within the reference patch of the reference frame and the coordinate converted frame, is calculated. Thereafter, the number of rectangular regions within the reference patch and the second patch is increased in a stepwise manner by an additional step. The aforementioned correspondent relationships are estimated, the coordinate converted frames are obtained, and the second correlative value is calculated. Then, the variation between the first and second correlative values is calculated.

Thereafter, the number of rectangular regions within the reference patch and the second patch are increased in a stepwise manner, the aforementioned correspondent relationships are estimated, the coordinate converted frames are obtained, the first and second correlative values are calculated, and the variation between the first and second correlative values of consecutive steps are calculated, until the variation becomes less than or equal to a predetermined threshold value.

A synthesized frame having a higher resolution than either the reference frame of the other frame is generated, by administering interpolation calculations on the images within the second patch and the reference patch, based on the correspondent relationships, which were estimated among the pixels of the reference patch and the second patch having the number of rectangular regions therein that yielded the variation less than or equal to the threshold value.

Note that in the case that three or more frames are sampled, as in the ninth method and the ninth apparatus for synthesizing moving images, a plurality of intermediate synthesized frames are obtained, by estimating the aforementioned correspondent relationships, obtaining the coordinate converted frames, calculating the plurality of correlative values, and calculating the variations for all of the plurality of sampled frames. Finally a synthesized frame is generated, by synthesizing the plurality of intermediate synthesized frames.

For this reason, a synthesized frame is generated by employing a number of rectangular regions, which is optimal in following the movement and/or deformation of a subject in the frames. Thereby, a synthesized frame having high image quality is enabled to be obtained, regardless of movement of the subject in the frames.

According to the eighth method and the eighth apparatus for synthesizing moving images of the present invention, a moving image is sampled to obtain a plurality of consecutive frames. Next, a reference patch having at least one rectangular region therein, is provided in a first frame from among the plurality of sampled frames, which is designated as a reference frame. A second patch, which is the same as the reference patch, is provided in another of the plurality of sampled frames. Thereafter, the second patch in the other frame is moved and/or deformed so that an image within the second patch matches that within the reference image. Finally, correspondent relationships among the pixels within the second patch of the other frame and the pixels within the reference patch of the reference frame are estimated, based on the second patch after the movement and/or deformation thereof and the reference patch.

Further, a coordinate converted frame is obtained by coordinate converting the image within the second patch into a coordinate space of the reference frame, based on the correspondent relationships. Then, the first correlative value, which represents the degree of correlation between the images within the reference patch of the reference frame and the coordinate converted frame, is calculated. Thereafter, the number of rectangular regions within the reference patch and the second patch is increased in a stepwise manner by an additional step. The aforementioned correspondent relationships are estimated, the coordinate converted frames are obtained, and the second correlative value is calculated. Then, the variation between the first and second correlative values is calculated.

Thereafter, the number of rectangular regions within the reference patch and the second patch are increased in a stepwise manner, the aforementioned correspondent relationships are estimated, the coordinate converted frames are obtained, the first and second correlative values are calculated, and the variation between the first and second correlative values of consecutive steps are calculated, until the variation or the representative variation of all of the rectangular regions, or of the rectangular regions at predetermined positions from among all of the rectangular regions, other than those for which the variation is greater than or equal to a predetermined value, or of a predetermined number of rectangular regions from among all of the rectangular regions, other than those for which the variation is greater than or equal to a predetermined value, becomes less than or equal to a predetermined threshold value.

A synthesized frame having a higher resolution than either the reference frame of the other frame is generated, by administering interpolation calculations on the images within the second patch and the reference patch, based on the correspondent relationships, which were estimated among the pixels of the reference patch and the second patch having the number of rectangular regions therein that yielded the variation or the representative variation less than or equal to the threshold value.

Note that in the case that three or more frames are sampled, as in the tenth method and the tenth apparatus for synthesizing moving images, a plurality of intermediate synthesized frames are obtained, by estimating the aforementioned correspondent relationships, obtaining the coordinate converted frames, calculating the plurality of correlative values, and calculating the variations for all of the plurality of sampled frames. Finally a synthesized frame is generated, by synthesizing the plurality of intermediate synthesized frames.

For this reason, a synthesized frame is generated by employing a number of rectangular regions, which is optimal in following the movement and/or deformation of a subject in the frames. Thereby, a synthesized frame having high image quality is enabled to be obtained, regardless of movement of the subject in the frames.

Note that the threshold value, to be compared against the variation or the representative variation, may be set to be large, according to the increase in the number of rectangular regions, when the number of rectangular regions exceeds a predetermined value.

In addition, at least one component that constitutes the frames may be employed during the estimation of the correspondent relationships, the obtainment of the coordinate converted frames, the calculation of the correlative values, the generation of the intermediate synthesized frames (in the case that three or more frames are sampled), and the generation of the synthesized frame. Thereby, synthesized frames can be obtained, in which deterioration of image quality is reduced for each component. Accordingly, a synthesized frame, comprising synthesized frames for each component, is enabled to be obtained.

Note that the first through tenth methods for synthesizing moving images may be provided as programs that cause a computer to execute the methods. The programs may be recorded on computer readable media.

A skilled artisan would know that computer readable media are not limited to any specific type of storage device and includes any kind of device, including but not limited to: CD's, floppy disks, RAM's, ROM's, hard disks, magnetic tapes in which computer instructions can be stored. Transmission of computer code through a network or through wireless transmission means is also within the scope of this invention. Additionally, computer code includes, but is not limited to: source, object, and executable code, and can be in any language, including higher level languages, assembly language, and machine language.

BRIEF DESCRIPTION OF THE DRAWINGS

FIG. 1 is a block diagram illustrating the schematic construction of a moving image synthesizing apparatus according to a first embodiment of the present invention.

FIG. 9 is a flow chart illustrating the processes performed by the moving image synthesizing apparatus of the first embodiment.

FIGS. 10A and 10B are diagrams for explaining the processes performed by a moving image synthesizing apparatus according to a second embodiment of the present invention.

FIGS. 13A and 13B are diagrams for explaining the processes performed by a moving image synthesizing apparatus according to a fourth embodiment of the present invention (part 1).

FIG. 14 is a diagram for explaining the processes performed by the moving image synthesizing apparatus according to the fourth embodiment of the present invention (part 2).

FIG. 16 is a diagram for explaining other processes performed by the moving image synthesizing apparatus of the fourth embodiment (part 1).

FIG. 17 is a diagram for explaining other processes performed by the moving image synthesizing apparatus of the fourth embodiment (part 2).

FIG. 18 is a graph illustrating the relationship between numbers of rectangular regions and a threshold value in the fourth embodiment.

DESCRIPTION OF THE PREFERRED EMBODIMENTS

Figure 2A:
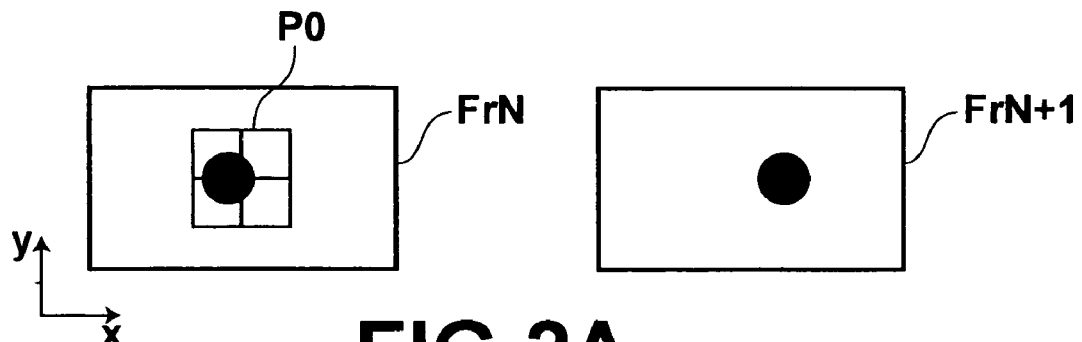
FIGS. 2A, 2B, 2C, and 2D are diagrams for explaining a correspondent relationship between a reference frame FrN and a frame FrN+1.

Hereinafter, the embodiments of the present invention will be described with reference to the attached drawings. FIG. 1 is a block diagram illustrating the schematic construction of a moving image synthesizing apparatus according to a first embodiment of the present invention. As shown in FIG. 1, the moving image synthesizing apparatus of the first embodiment comprises: a sampling means 1; a correspondent relationship estimating means 2; a coordinate converting means 3; a correlative value calculating means 4; a comparing means 5; and a synthesizing means 6. The sampling means 1 samples a plurality of frames from moving image data M0, which is input to the apparatus. The correspondent relationship estimating means 2 estimates correspondent relationships among pixels of a first frame from among the plurality of frames, which is designated as a reference frame, and those of a second frame from among the plurality of frames. The coordinate converting means 3 coordinate converts the second frame to a coordinate space of the reference frame, based on the correspondent relationships estimated by the correspondent relationship estimating means 2. The coordinate converting means 3 thus obtains a plurality of coordinate converted frames FrT0, FrT1, corresponding to numbers of rectangular regions within patches (to be described later) for which correspondent relationships are estimated. The correlative value calculating means 4 calculates a plurality of correlative values, which represent degrees of correlation among the coordinate converted frames FrT0, FrT1, and the reference frame, corresponding to the numbers of rectangular regions within the patches (to be described later) for which correspondent relationships are estimated. The comparing means 5 compares the degrees of correlation among the numbers of rectangular regions, based on the plurality of correlative values.

The synthesizing means 6 generates a synthesized frame FrG having a higher resolution than either the reference frame or the second frame, by administering interpolation calculations on the reference frame and the second frame, based on the correspondent relationships, which were estimated by the correspondent relationship estimating means 2 regarding the frames having the number of rectangular regions therein that yielded the highest degree of correlation. Note that in the first embodiment, the synthesized frame FrG has two times the number of pixels of each of the sampled frames in both the vertical and horizontal directions. Note also that hereinafter, the synthesized frame FrG will be described as that which has two times the number of pixels of each of the sampled frames. However, the synthesized frame FrG may have n times (wherein n is a whole number) the number of pixels of each of the sampled frames.

The sampling means 1 samples a plurality of frames from the moving image data M0. In the first embodiment, the sampling means 1 samples two frames, FrN and FrN+1, from the moving image data M0. Note that the frame FrN is designated as the reference frame. Here, the moving image data M0 represents a color moving image, and the frames FrN and FrN+1 comprise luminance chrominance components Y, Cb, and Cr. In the following description, processes are performed with respect to each of the components Y, Cb, and Cr. However, the same processes are performed with respect to all of the components. Therefore, a detailed description will be given only for the processes administered on the luminance component Y, and descriptions regarding the processes administered on the chrominance components Cb and Cr will be omitted.

The correspondent relationship estimating means 2 estimates the correspondent relationship between the reference frame FrN and the second frame FrN+1 in the following manner. FIGS. 2A, 2B, 2C, and 2D are diagrams for explaining the estimation of the correspondent relationship between the reference frame FrN and the frame FrN+1. In FIGS. 2A, 2B, 2C, and 2D, it is assumed that a circular subject, which is included in the reference frame FrN, has moved slightly to the right of the figures in the frame FrN+1.

Figure 2B:
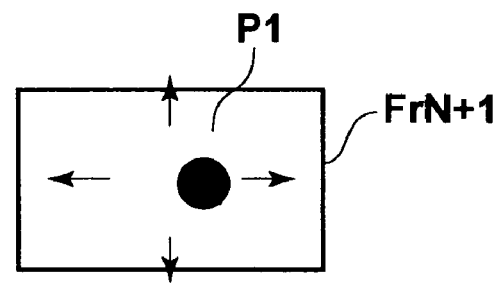

First, the correspondent relationship estimating means 2 provides a reference patch P0, which has a plurality of rectangular regions therein, in the reference frame FrN. FIG. 2A shows a state in which the reference patch P0 is provided in the reference frame FrN. As shown in FIG. 2A, in the first embodiment, the reference patch P0 comprises rectangular regions in a 2×2 arrangement. Then, a second patch P1, which is the same as the reference patch P0, is provided at an appropriate position in the frame FrN+1, as shown in FIG. 2B. A correlative value, which represents the degree of correlation between the image within the reference patch P0 and the image within the patch P1, is calculated. The correlative value may be calculated as a mean square error according to Formula (1) below. In addition, coordinate axes are set such that the horizontal direction in the figures is the x axis, and the vertical direction in the figures is the y axis.

$$E = \frac{1}{N}\sum_{i}^{N}(pi - qi)^2 \qquad \text{Formula (1)}$$

wherein E: correlative value pi, qi: pixel values of the corresponding pixels within the reference patch P0 and the patch P1, respectively N: the number of pixels within the reference patch P0 and the patch P1

Next, the patch P1 is moved in four directions (up, down, left, and right) for a predetermined number of pixels ±Δx and ±Δy. Correlative values, which represent the degrees of correlation between the images within the moved patch P1 and the reference patch P0 in the reference frame, are calculated. Each correlative value is designated as E(Δx, 0), E(−Δx, 0), E(0, Δy), and E(0, −Δy).

Figure 2C:
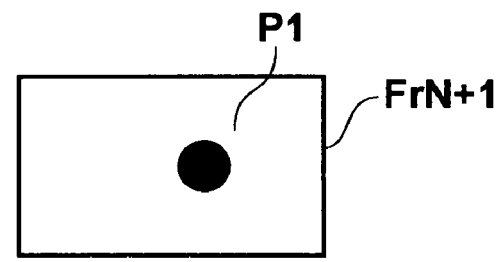

Then, a gradient direction, in which the correlative values E(Δx, 0), E(−Δx, 0), E(0, Δy), and E(0, −Δy) decrease (that is, in which the degrees of correlation increase), is derived as a correlation gradient. The patch P1 is moved by a real number multiple in the direction of the correlation gradient, as shown in FIG. 2C. Specifically, coefficients C(Δx, 0), C(−Δx, 0), C(0, Δy), and C(0, −Δy) are calculated according to Formula (2) below. Then, correlation gradients gx and gy are calculated according to Formulas (3) and (4), based on the coefficients C(Δx, 0), C(−Δx, 0), C(0, Δy), and C(0, −Δy).

$$c(\Delta x, \Delta y) = \frac{\sqrt{E(\Delta x, \Delta y)}}{255} \quad \text{Formula (2)}$$

$$gx = \frac{c(\Delta x, 0) - c(-\Delta x, 0)}{2} \quad \text{Formula (3)}$$

$$gy = \frac{c(0, \Delta y) - c(0, -\Delta y)}{2} \quad \text{Formula (4)}$$

Figure 2D:
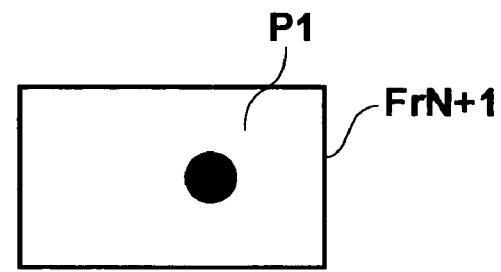

Thereafter, the entire patch P1 is moved (λ1gx, λ1gy), based on the calculated correlation gradients gx and gy. Then, the patch P1 is repetitively moved until it converges at a certain position, as shown in FIG. 2D, by repeating the processes described above. Here, λ1 is a parameter that determines the speed of convergence, and is a real number. Note that if the value of λ1 is set too high, the solutions of the repetitive processes will become dispersed. Therefore, it is necessary to select an appropriate value (10, for example) therefor.

Figure 3:
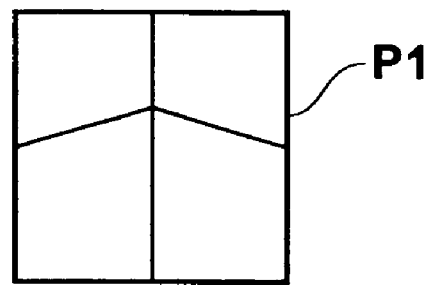
FIG. 3 is a diagram for explaining deformation of a patch.

Further, a lattice point of the patch P1 is moved in the four directions along the coordinate axes, for the distance of a predetermined number of pixels. At this time, the rectangular regions that contain the moved lattice point become deformed as shown in FIG. 3, for example. Then, correlative values, which represent the degrees of correlation between the deformed rectangular regions and the rectangular regions of the reference patch P0 corresponding thereto, are calculated. Each correlative value is designated as E1(Δx, 0), E1(−Δx, 0), E1(0, Δy), and E1(0, −Δy).

Then, a gradient direction, in which the correlative values E1(Δx, 0), E1(−Δx, 0), E1(0, Δy), and E1(0, −Δy) decrease (that is, in which the degrees of correlation increase), is derived in the same manner as above. The lattice points of the patch P1 are moved by a real number multiple in the gradient direction. This is performed for all of the lattice points of the patch P1, to complete one cycle of a process. The process is repeated until the coordinates of the lattice points converge.

The amount of movement and the amount of deformation of the patch P1 with respect to the reference patch P0 is derived by the above processes. The correspondent relationships among the pixels of the reference patch P0 and the patch P1 can be estimated, based on these values.

Figure 4A:
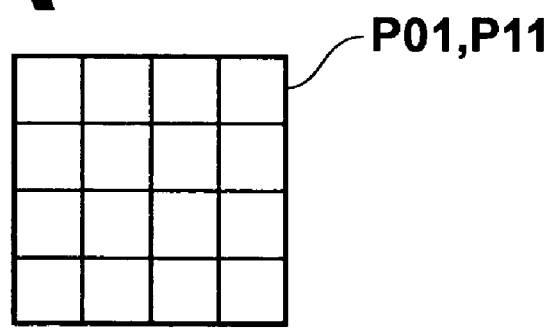
FIGS. 4A and 4B illustrate patches having different numbers of rectangular regions therein.

Next, as shown in FIG. 4A, the correspondent relationship estimating means 2 provides a reference patch P01 and a second patch P11, having a greater number of rectangular regions therein (4×4 in this case) at appropriate positions in the reference frame FrN and the second frame FrN+1, respectively. Then, the amount of movement and the amount of deformation of the second patch P11 with respect to the reference patch P01 is derived in the same manner as that described above. Thereafter, the correspondent relationships among the pixels of the reference patch P01 and the second patch P11 are estimated.

Figure 4B:
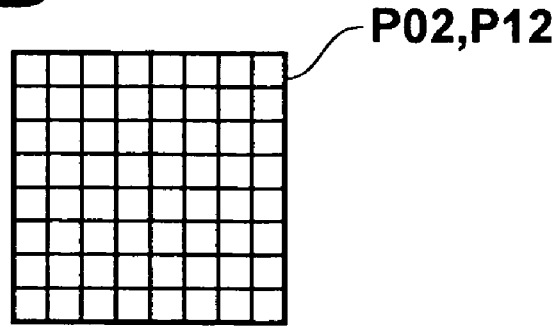

Note that as shown in FIG. 4B, a reference patch P02 and a second patch P12 having a still greater number of rectangular regions therein (8×8 in this case) may be employed. However, in the first embodiment, the correspondent relationships are estimated for rectangular regions of the two steps of 2×2 and 4×4 arrangements. In the first embodiment, the correspondent relationships, which have been estimated for the reference patch P0 and the second patch P1 having rectangular regions therein in a 2×2 arrangement, are referred to as a first correspondent relationship. The correspondent relationships, which have been estimated for the reference patch P01 and the second patch P11 having rectangular regions therein in a 4×4 arrangement, are referred to as a second correspondent relationship.

The coordinate converting means 3 converts the second frame FrN+1 into the coordinate space of the reference frame FrN for each number of rectangular regions, based on the first and second correspondent relationships, to obtain coordinate converted frames FrT0 and FrT1, in the following manner. First, the obtainment of the coordinate converted frame FrT0, based on the first correspondent relationship, will be described. Note that in the following description, conversion and synthesis is performed only on the regions of the reference frame FrN within the reference patches P0 and P01. Similarly, conversion and synthesis is performed only on the regions of the second frame FrN+1 within the second patches P1 and P11.

In the first embodiment, the coordinate conversion is performed employing bilinear conversion. The coordinate conversion by bilinear conversion is defined by the following Formulas (5) and (6).

$$x=(1-u)(1-v)x1+(1-v)ux2+(1-u)vx3+uvx4 \quad \text{Formula (5)}$$

$$y=(1-u)(1-v)y1+(1-v)uy2+(1-u)vy3+uvy4 \quad \text{Formula (6)}$$

Formulas (5) and (6) interpolate coordinates within the patch P1, which is defined by four points (xn, yn) (wherein $1 \leq n \leq 4$) within two dimensional coordinates, by a normalized coordinate system (u, v) (wherein $0 \leq u, v \leq 1$). Coordinate conversion within two desired rectangular shapes are enabled by combinations of Formulas (5) and (6), and inverse conversion of Formulas (5) and (6).

Figure 5:
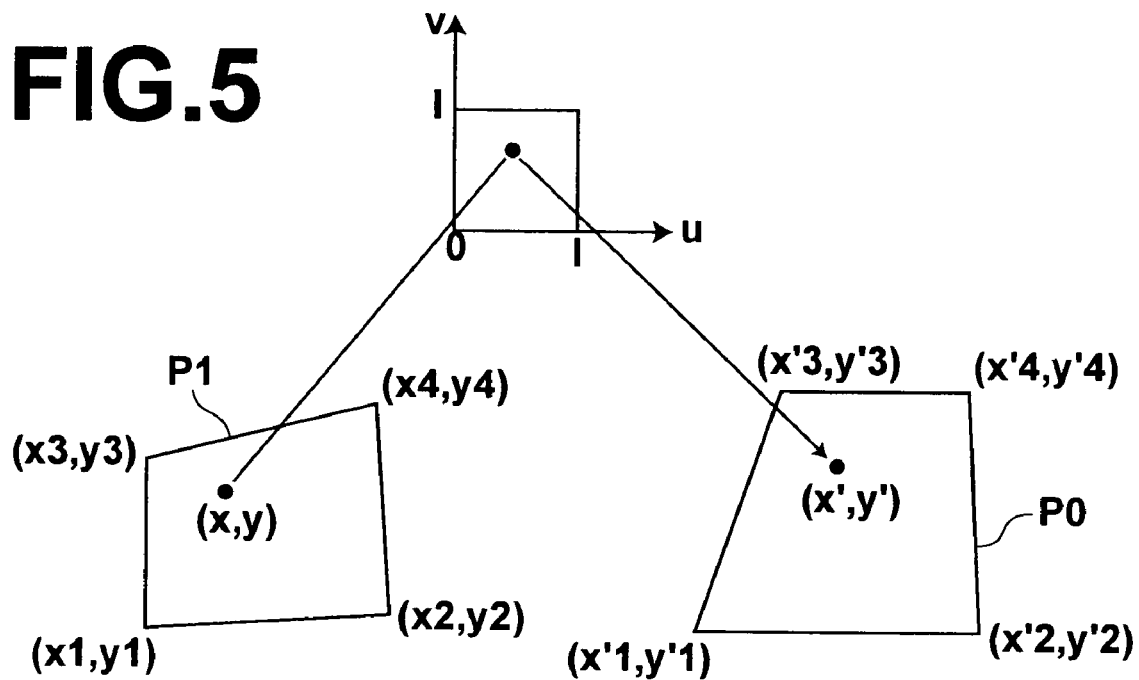
FIG. 5 is a diagram for explaining a correspondent relationship between a reference patch P0 and a patch P1.

Here, as shown in FIG. 5, the position that a point (x, y) within the patch P1 (xn, yn) corresponds to within the reference patch P0 (x'n, y'n) is considered. First, normalized coordinates (u, v) are derived for the point (x, y) within the patch P1 (xn, yn). The normalized coordinates (u, v) are derived by inverse conversions of Formulas (5) and (6). Then, coordinates (x', y'), which correspond to the point (x, y) are derived, based on the reference patch P0 (x'n, y'n) that corresponds to (u, v), by Formulas (5) and (6). Here, there are cases that the point (x', y') is defined by real number coordinates where pixel values do not originally exist, whereas the point (x, y) is defined by integer coordinates, where pixel values exist. Therefore, the pixel value of the converted integer coordinates is derived as a weighted sum of the coordinates (x', y'), within a region defined by the eight adjacent integer coordinates surrounding integer coordinates of the reference patch P0.

Figure 6:
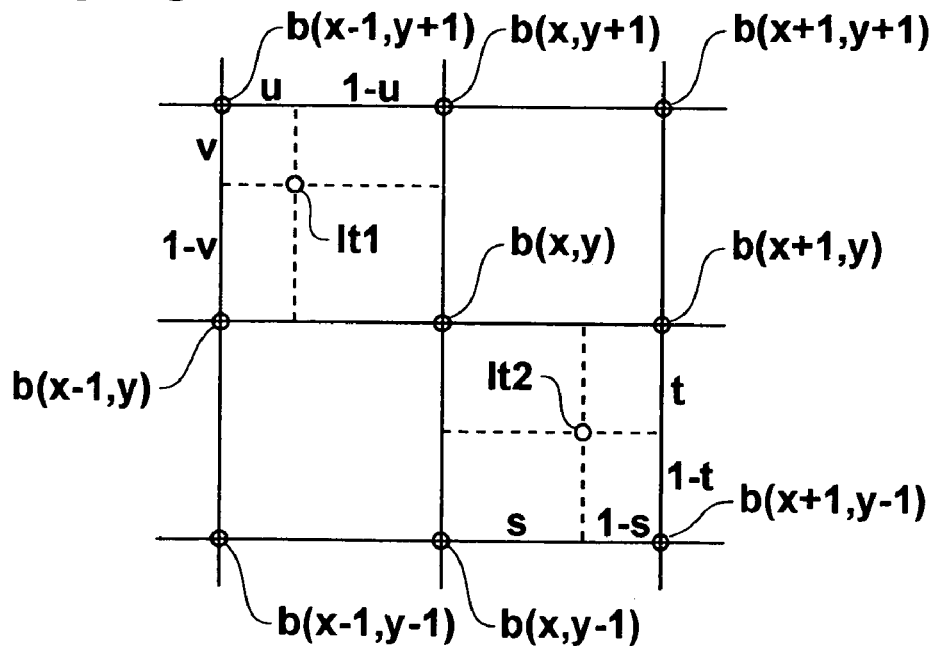
FIG. 6 is a diagram for explaining bilinear insertion.

Specifically, as shown in FIG. 6, a pixel value of integer coordinates b(x, y) is calculated, based on a pixel value of the frame FrN+1, which has been converted within a region surrounded by eight adjacent integer coordinate points b(x−1, y−1), b(x, y−1), b(x+1, y−1), b(x−1, y), b(x+1, y), b(x−1, y+1), b(x, y+1), and b(x, y+1). Here, an m number of pixel values of the frame FrN+1 are converted within the region surrounded by the eight pixels. If the pixel values of each of the converted pixels are set as Itj(x°, y°) (wherein 1≦j≦m), then the pixel value It(x^, y^), at the integer coordinates b(x, y) can be calculated by Formula (7) below. Note that in Formula (7), φ is a function that represents a weighted sum calculation.

$$It(\hat{x}, \hat{y}) = \varphi(Itj(x°, y°))$$
$$= \frac{\{W1 \times It1(x°, y°) + W2 \times It2(x°, y°) + \cdots Wm \times Itm(x°, y°)\}}{(W1 + W2 + \cdots Wk)}$$
$$= \frac{\sum_{j=1}^{m} Wj \times Itj(x°, y°)}{\sum_{j=1}^{m} Wj}$$

Formula (7)

wherein Wj (1≦j≦m): the product of division ratios within the coordinates as viewed from the integer pixels in the vicinity of the position that the pixel value Itj(x°, y°) is assigned to. Here, for simplicity's sake, a case is considered in which two pixel values It1 and It2 are converted to the region surrounded by eight pixels, employing FIG. 6. In this case, the pixel value It(x^, y^) at the integer coordinates b(x, y) can be calculated by Formula (8) below.

$$It(\hat{x}, \hat{y}) = \frac{1}{W1 + W2} = (W1 \times It1 + W2 + It2)$$

Formula (8)

wherein W1=u×v, and W2=(1−s)×(1−t).

By performing the above processes for every pixel within the patch P1, the image within the patch P1 is converted into the coordinate space of the reference frame FrN, and a coordinate converted frame FrT0 is obtained.

A coordinate converted frame FrT1 is obtained by converting the image within the patch P11 into the coordinate space of the reference frame FrN in a similar manner, based on the second correspondent relationship.

The correlative value calculating means 4 calculates a correlative value d0 between the reference frame FrN and the coordinate converted frame FrT0, and a correlative value d1 between the reference frame FrN and the coordinate converted frame FrT1. The correlative value d0 is calculated as shown in Formula (9) below. Specifically, the sums of the absolute values of the differences between the pixel values FrN(x, y) and FrT0 (x, y), for corresponding pixels within the reference frame FrN and the coordinate converted frame FrT0, are divided by the number of pixels m, with respect to all of the pixels within the reference patch P0. The mean value of the quotients, that is, the absolute values of the differences, is calculated as the correlative value d0. In addition, the correlative value d1 is calculated as shown in Formula (10). Specifically, the mean value of the absolute values of the differences between the pixel values FrN(x, y) and FrT1(x, y), for corresponding pixels within the reference frame FrN and the coordinate converted frame FrT1, are calculated with respect to all of the pixels within the reference patch P0, as the correlative value d1. Note that the correlative values d0 and d1 decrease as the degree of correlation between the reference frame FrN and the coordinate converted frames FrT0 and FrT1 increase.

$$d0 = \frac{\sum^{m} |FrT0(x, y) - FrN(x, y)|}{m}$$

Formula (9)

$$d1 = \frac{\sum^{m} |FrT1(x, y) - FrN(x, y)|}{m}$$

Formula (10)

Note that in the first embodiment, the correlative values d0 and d1 are calculated from the absolute values of the differences in pixel values of the pixels that correspond among the reference frame FrN and the coordinate converted frames FrT0 and FrT1. Alternatively, the correlative values may be calculated from squares of the differences. In addition, the correlative values may be the sums of the absolute values of the differences in pixel values of the pixels that correspond among the reference frame FrN and the coordinate converted frames FrT0 and FrT1. As a further alternative, histograms may be calculated for the reference frame FrN, the coordinate converted frame FrT0, and the coordinate converted frame FrT1. In this case, a mean value, a median value, a differential value of the standard deviation, or a cumulative sum of the differential values of the histograms may be employed as the correlative value. As a still further alternative, motion vectors of the coordinate converted frames FrT0 and FrT1 with respect to the reference frame FrN may be calculated for each pixel or each small region of the reference frame FrN. In this case, the mean value, the mediam value, or the standard deviation of the motion vectors may be employed as the correlative value. In addition, the cumulative sum of the histograms of the motion vectors may be employed as the correlative value.

The comparing means 5 compares the correlative value d0 and the correlative value d1, and selects the smaller correlative value, that is, the correlative value that represents the greater degree of correlation. Note that in the first embodiment, it is assumed that the correlative value d1, which was calculated based on the reference patch P01 and the patch P11 having rectangular regions therein at a 4×4 arrangement, is selected.

Figure 7:
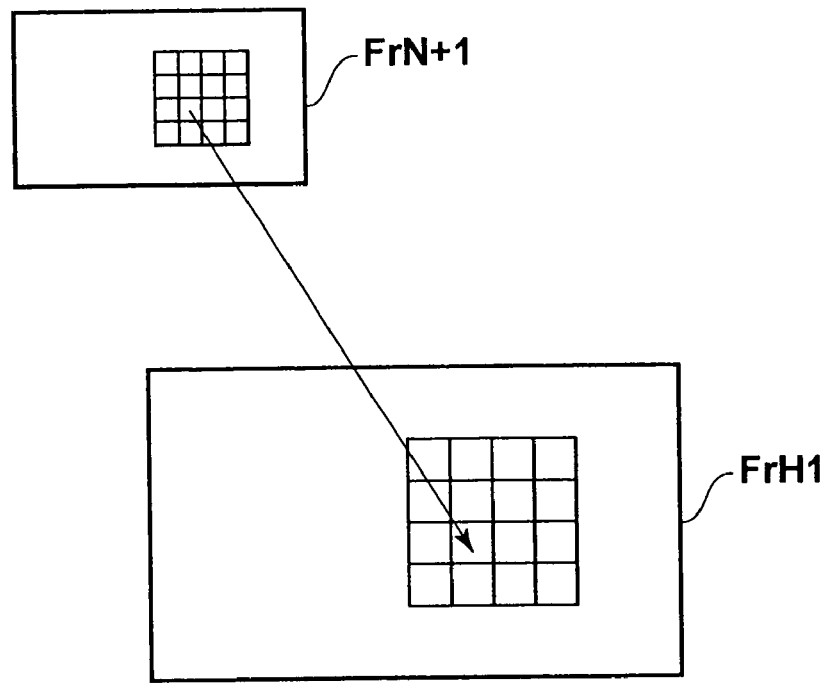
FIG. 7 is a diagram for explaining assignment of the frame FrN+1 to an integrated image.

The synthesizing means 6 generates the synthesized frame FrG, by administering interpolation calculations on the reference frame FrN and the frame FrN+1, based on the second correspondent relationship d1, which was estimated based on the reference patch P01 and the patch P11 having the rectangular regions therein in a 4×4 arrangement. Specifically, as shown in FIG. 7, first, an integrated image having an ultimately necessary number of pixels (in the first embodiment, a case is described in which the integrated image has two times the number of pixels of the frames FrN and FrN+1 in both the horizontal and vertical directions; however, the number of pixels may be n times (wherein n is a whole number) the number of pixels of the frames FrN and FrN+1) is prepared. Then, pixel values of the pixels of the frame FrN+1 (the region within the patch P11) are assigned to the integrated image, based on the second correspondent relationship derived by the correspondent relationship estimating means 2. If the assignment function is designated as Π, the pixel values of each pixel within the frame FrN+1 is assigned to the integrated frame according to Formula (11) below.

$$I1N+1(x°,y°) = \Pi(FrN+1(x, y))\qquad\text{Formula (11)}$$

wherein I1N+1(x°, y°): pixel values of the frame FrN+1 which have been assigned to the integrated frame; and FrN+1(x, y): pixel values of the frame FrN+1

A first interpolation frame having pixel values of I1 (x°, y°)(=I1N+1(x°, y°)) for each pixel is obtained, by assigning pixel values of the frame FrN+1 to the integrated image in this manner.

During assignment of the pixel values to the integrated image, there are cases in which pixels of the frame FrN+1 do not correspond to the integer coordinates (that is, the coordinates where a pixel value should exist) of the integrated image, depending on the relationship between the number of pixels in the integrated image and the number of pixels in the frame FrN+1. In the first embodiment, the pixel values at integer coordinates within the integrated image are derived in the following manner. A region of eight integer coordinates that surround the integer coordinate is set. Then, the pixel value of the integer coordinate within the region is derived as a weighted sum of the pixel values of the pixels from the frame FrN+1, which are assigned within this region.

Figure 8:
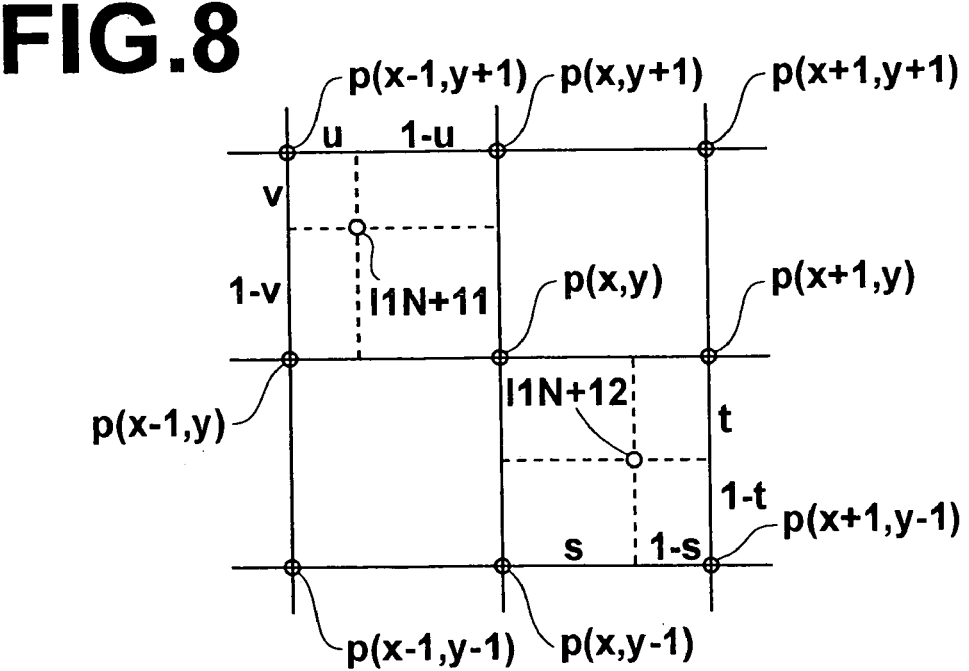
FIG. 8 is a diagram for explaining calculation of pixel values in an integer coordinate space of the integrated image.

That is, as shown in FIG. 8, the pixel value for an integer coordinate p(x, y) within the integrated image is calculated based on the pixel values from the frame FrN+1, which have been assigned within a region surrounded by integer coordinates p(x−1, y−1), p(x, y−1), p(x+1, y−1), p(x−1, y), p(x+1, y), p(x−1, y+1), p(x, y+1), and p(x+1, y+1). Here, k number of pixel values are assigned from the frame FrN+1 to the region surrounded by the eight pixels. If the pixel values of each of the assigned pixels are designated as I1N+1i(x°, y°) (wherein 1≦i≦k), the pixel value I1N+1(x̂, ŷ) of the integer coordinates can be calculated by Formula (12) below. Note that in Formula (12), Φ is a function that represents weighted sum calculation.

$$I1N+1(\hat{x},\hat{y}) = \Phi(I1N+1(x°, y°))\qquad\text{Formula (12)}$$

$$= \frac{\{(M1 \times I1N+11(x°, y°) + M2 \times I1N+12(x°, y°) + \cdots + Mk \times I1N+1k(x°, y°))\}}{(M1+M2+\cdots+Mk)}$$

$$= \frac{\sum_{i=1}^{k}(Mi \times I1N+1i(x°, y°))}{\sum_{j=1}^{k}Mi}$$

wherein Mi(1≦i≦k) the product of division rations within coordinates at positions where pixel values I1N+1i(x°, y°) are assigned, when viewed from integer pixels in their vicinity.

Here, for the sake of simplicity, a case in which two pixel values I1N+11 and I1N+12 are assigned from the frame FrN+1 to the region surrounded by eight pixels shown in FIG. 8. In this case, the pixel value 11N+1(x̂, ŷ) at the integer coordinate p(x, y) can be calculated by Formula (13) below.

$$I1N+1(\hat{x},\hat{y}) = \frac{1}{M1+M2}\qquad\text{Formula (13)}$$
$$= (M1 \times I1N+11 + M2 \times I1N+12)$$

wherein M1=u×v; and M2=(1−s)×(1−t)

Pixel values I1N+1(x̂, ŷ) for all of the integer coordinates within the integrated image are obtained by assigning the pixel values of the frame FrN+1 thereto. In this case, the pixel values I1(x°, y°) of the first interpolation frame are I1N+1(x°, y°).

Note that regarding the reference frame FrN, the pixels thereof are interpolated and directly assigned to the integer coordinates of the integrated image. The pixel values obtained by assigning the reference frame FrN to the integer coordinates of the integrated image are designated as I2 (x̂, ŷ) The frame having the pixel values I2(x̂, ŷ) is referred to as a second interpolation frame.

The synthesized frame FrG, which has pixel values FrG(x̂, ŷ), is generated by adding or weighting and adding the pixel values I1(x̂, ŷ) and I2(x̂, ŷ) of corresponding pixels of the first and second interpolation frames. Note that the synthesized frame FrG, having the pixel values FrG(x̂, ŷ), may be generated from only the pixel values I1(x̂, ŷ), There are cases in which pixel values cannot be assigned to all of the integer coordinates of the integrated images. In these cases, the pixel values for the integer coordinates, for which no pixel values are assigned, may be calculated from assigned pixel values or from pixel values of the reference frame that correspond to the coordinates, for which no pixel values are assigned. The calculation may be an interpolation calculation such as linear interpolation and spline interpolation.

The process described above derives the synthesized frame FrG with respect to the luminance component Y. Synthesized frames are obtained in the same manner, for the chrominance components Cb and Cr as well. A final synthesized frame is obtained by synthesizing the synthesized frame FrG(Y) derived from the luminance component Y, a synthesized frame FrG(Cb) derived from the chrominance component Cb, and a synthesized frame FrG(Cr), derived from the chrominance component Cr. Note that it is preferable to estimate the correspondent relationships between the reference frame FrN and the frame FrN+1 only for the luminance component Y. Then the processes are administered regarding the chrominance components Cb and Cr, based on the correspondent relationships, which have been estimated for the luminance component Y. This expedites the synthesis process.

Next, the operation of the first embodiment will be described. FIG. 9 is a flow chart illustrating the processes performed by the moving image synthesizing apparatus of the first embodiment. First, moving image data M0 is input to the sampling means 1 (step S1), and the reference frame FrN and the frame FrN+1 are sampled therefrom (step S2). Next, a plurality of correspondent relationships between the reference frame FrN and the frame FrN+1, corresponding to the numbers of rectangular regions within the patches, are estimated by the correspondent relationship estimating means 2 (step S3).

Then, the frame FrN+1 is converted into the coordinate space of the reference frame FrN by the coordinate converting means 3, based on the plurality of correspondent relationships, to obtain a plurality of coordinate converted frames, FrT0 and FrT1 (step S4). Thereafter, the correlative value d0, which represents the degree of correlation between the reference frame FrN and the coordinate converted frame FrT0, and the correlative value d1, which represents the degree of correlation between the reference frame FrN and the coordinate converted frame FrT1, are calculated by the correlative value calculating means 4 (step S5). Further, the correlative value that represents the larger degree of correlation is selected by the comparing means 5 (step S6).

Finally, the synthesizing means generates the synthesized frame FrG from the reference frame FrN and the frame FrN+

1, based on the correspondent relationship (here, the second correspondent relationship) which was estimated for the number of rectangular regions (here, 4×4) that yielded the selected correlative value d1 (step S7), and the process ends.

In this manner, the synthesized frame FrG is generated from the reference frame FrN and the frame FrN+1, based on the correspondent relationship which was estimated for the number of rectangular regions that yielded the largest degree of correlation in the first embodiment. Therefore, the synthesized frame FrG is enabled to be generated employing the optimal number of rectangular regions for following the movement and/or deformation of a moving subject within the frames. Accordingly, a synthesized frame FrG having high image quality is enabled to be obtained, regardless of movement of a subject included in the frames.

Next, a second embodiment of the present invention will be described. In the first embodiment described above, the synthesized frame FrG is generated based on the correspondent relationship, estimated for the number of rectangular regions that yields the largest degree of correlation, of the entirety of the images in the patches within the reference frame FrN and the frame FrN+1. In the second embodiment, correlative values are calculated for each rectangular region within the patches, and a synthesized frame FrG is generated based on the correspondent relationships of each of the rectangular regions.

FIGS. 10A and 10B are diagrams for explaining the calculation of correlative values for each of the rectangular regions. As shown in FIG. 10A, each rectangular region of a reference patch P0 and a second patch P1, in which rectangular regions are provided in a 2×2 arrangement, is designated as rectangular regions A1, A2, A3, and A4. Meanwhile, each rectangular region of a reference patch P0 and a second patch P1, in which rectangular regions are provided in a 4×4 arrangement, is designated as A11~A14, A21~A24, A31~A34, and A41~A44. Note that the rectangular region A1 corresponds to the rectangular regions A11 through A14, the rectangular region A2 corresponds to the rectangular regions A21 through A24, the rectangular region A3 corresponds to the rectangular regions A31 through A34, and the rectangular region A4 corresponds to the rectangular regions A41 through A44.

In the case that the rectangular regions are provided in the 2×2 arrangement, correlative values for the reference frame FrN and the frame FrN+1 are calculated for each of the rectangular regions A1 through A4. The correlative values calculated for each of the rectangular regions A1 through A4 are designated as correlative values d01, d02, d03, and d04, respectively.

On the other hand, in the case that the rectangular regions are provided in the 4×4 arrangement, correlative values are calculated for each of the rectangular regions A11 through A14, A21 through A24, A31 through A34, and A41 through A44. The mean value of the correlative values calculated for the rectangular regions A11 through A14 is calculated and designated as correlative value d11. The mean value of the correlative values calculated for the rectangular regions A21 through A24 is calculated and designated as correlative value d12. The mean value of the correlative values calculated for the rectangular regions A31 through A34 is calculated and designated as correlative value d13. The mean value of the correlative values calculated for the rectangular regions A41 through A44 is calculated and designated as correlative value d14.

Then, the correlative values of corresponding regions are compared. That is, the correlative value d01 of the rectangular region A1 is compared against the mean correlative value d11 of the rectangular regions A11 through A14, the correlative value d02 of the rectangular region A2 is compared against the mean correlative value d12 of the rectangular regions A21 through A24, the correlative value d03 of the rectangular region A3 is compared against the mean correlative value d13 of the rectangular regions A31 through A34, and the correlative value d04 of the rectangular region A4 is compared against the mean correlative value d14 of the rectangular regions A41 through A44. Then, the synthesized frame FrG is generated from the reference frame FrN and the frame FrN+1 for each of the rectangular regions, based on the correspondent relationship, which was estimated for the number of rectangular regions that yielded the higher degree of correlation, based on the comparison results.

In the second embodiment, the larger the degree of correlation, the lower the correlative value is. Therefore, for example, in the case that the correlative value d01 is less than the correlative value d11, interpolation calculations are performed based on the correspondent relationships, which were estimated for the rectangular regions provided in the 2×2 arrangement, regarding the regions that correspond to the rectangular region A1 in the reference frame FrN and the frame FrN+1. Likewise, in the case that the correlative value d02 is less than then correlative value d12, interpolation calculations are performed based on the correspondent relationships, which were estimated for the rectangular regions provided in the 2×2 arrangement, regarding the regions that correspond to the rectangular region A2 in the reference frame FrN and the frame FrN+1.

On the other hand, in the case that the correlative value d03 is greater than the correlative value d13, interpolation calculations are performed based on the correspondent relationships, which were estimated for the rectangular regions provided in the 4×4 arrangement, regarding the regions that correspond to the rectangular region A3 in the reference frame FrN and the frame FrN+1. Further, in the case that the correlative value d04 is greater than the correlative value d14, interpolation calculations are performed based on the correspondent relationships, which were estimated for the rectangular regions provided in the 4×4 arrangement, regarding the regions that correspond to the rectangular region A4 in the reference frame FrN and the frame FrN+1. Finally, the synthesized frame FrG, comprising the pixels obtained by the interpolation calculations, is generated.

In this manner, the second embodiment estimates the correspondent relationships to be employed during generation of the synthesized frame FrG for each rectangular region. Thereby, the synthesized frame FrG is generated for each rectangular region within the reference patch and the second patch. For this reason, the synthesized frame FrG is enabled to be generated employing the optimal number of rectangular regions for following the movement of subjects included in each portion within the frame. Accordingly, a synthesized frame FrG is enabled to be obtained, regardless of movement of a subject included in the frames.

In the first and second embodiments described above, the correlative values d0 and d1 are calculated for each of the luminance chrominance components Y, Cb, and Cr. However, a single correlative value d0' may be calculated, by weighting a correlative value d0Y for the luminance component, and correlative values d0Cb and d0Cr for the chrominance components with weighting coefficients a1, b1, and c1, as shown in Formula (14) below.

$$di' = a1 \cdot diY + b1 \cdot diCb + c1 \cdot diCr \qquad \text{Formula (14)}$$

Alternatively, Euclid distances, weighted by weighting coefficients a2, b2, and c2, among luminance components FrTi (x, y) and chrominance components FrTiCb (x, y) and FrTiCr (x, y) of a coordinate converted frame FrTi, and luminance components FrNY (x, y), and chrominance components FrNCb and FrNCr, may be calculated for each of the pixels within the reference patch P0, as shown in Formula (15) below. The Euclid distances are designated as correlative values di" (x, y) for each pixel. When applied to the first embodiment, the mean value of the correlative values di" (x, y) for all of the pixels within the reference patch P0 may be employed as the correlative value employed for comparison. When applied to the second embodiment, the mean value of the correlative values di" (x, y) for all of the pixels within each rectangular region may be employed as the correlative value employed for comparison.

$$di"(x,y)=\{a2(FrTiY(x,y)-FrNY(x,y))^2+b2(FrTiCb(x,y)-FrNCb(x,y))^2+c2(FrTiCr(x,y)-FrNCr(x,y))^2\}^{0.5}$$ Formula (15)

Note that in the first and second embodiments described above, the synthesized frames FrG are generated from two frames FrN and FrN+1. However, a synthesized frame FrG may be generated from three or more frames. For example, a case is considered in which a synthesized frame FrG is generated from T number of frames FrN+t' (wherein $0 \leq t' \leq T-1$). In this case, a plurality of correspondent relationships, between a reference frame FrN (=FrN+0) and each of a plurality of other frames FrN+t (wherein $1 \leq t \leq T-1$), are estimated, according to the numbers of rectangular regions within patches thereof. Further, a plurality of coordinate converted frames are obtained, according to the plurality of correspondent relationships. Then, correlative values are calculated between the reference frame FrN and each of the plurality of coordinate converted frames. Then, the correspondent relationship estimated for the number of rectangular regions, to be employed in the generation of a synthesized frame is selected, based on the correlative values. Next, a synthesized frame is generated, based on the correspondent relationship, which was estimated for the selected number of rectangular regions, in the same manner as in the first embodiment. This synthesized frame is designated as an intermediate synthesized frame FrGt. Note that pixel values of the intermediate synthesized frame FrGt at integer coordinates of an integrated images are designated as FrGt (x^, y^).

Intermediate synthesized frames FrGt are obtained for all of the other frames FrN+t. Finally, a synthesized frame FrG comprising pixel values (x^, y^) is generated, by adding corresponding pixels of the intermediate frames according to formula (16) below.

$$FrG(x^\wedge, y^\wedge) = \sum_{t=1}^{T-1} FrGt(x^\wedge, y^\wedge)$$ Formula (16)

There are cases in which pixel values cannot be assigned to all of the integer coordinates of the integrated images. In these cases, the pixel values for the integer coordinates, for which no pixel values are assigned, may be calculated from assigned pixel values or from pixel values of the reference frame that correspond to the coordinates, for which no pixel values are assigned. The calculation may be an interpolation calculation such as linear interpolation and spline interpolation.

In the case that the synthesized frame FrG is generated from three or more frames, the intermediate synthesized frames may be generated in the same manner as that described in the second embodiment. That is, correlative values may be calculated for each of the rectangular regions within the patches, then the intermediate synthesized frames may be generated based on the correspondent relationships of each of the rectangular regions.

Figure 11:
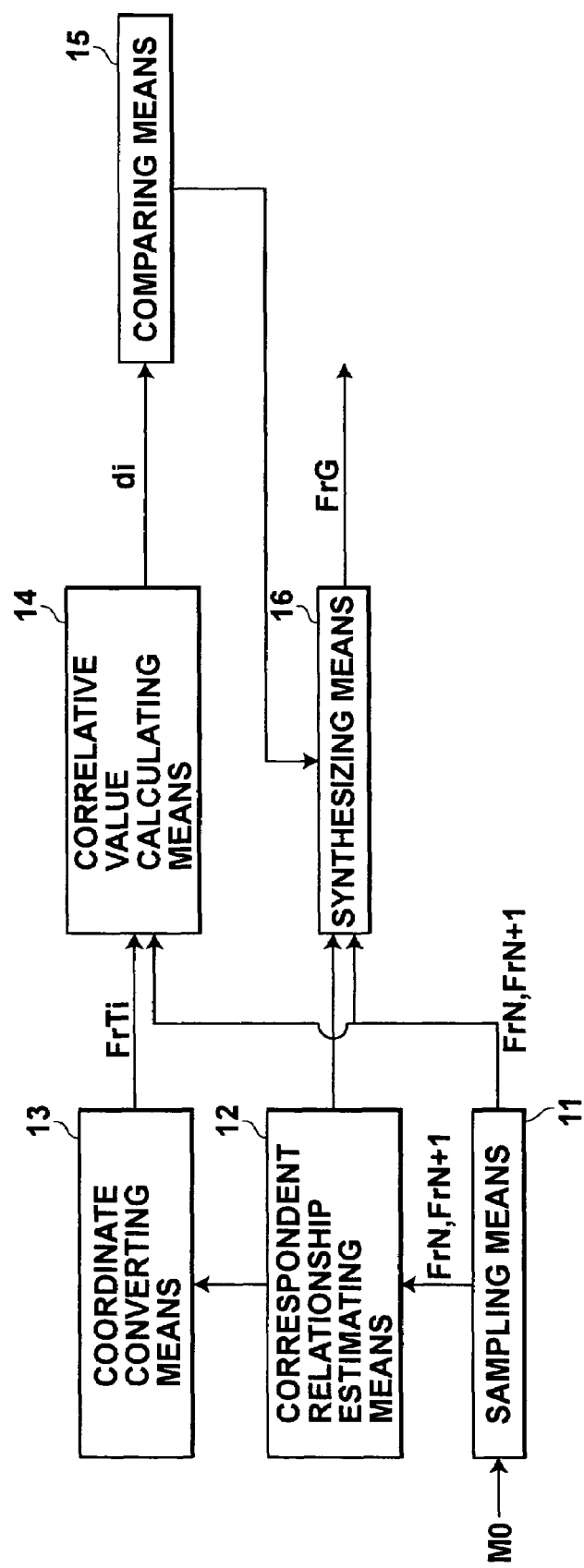
FIG. 11 is a block diagram illustrating the schematic construction of a moving image synthesizing apparatus according to a third embodiment of the present invention.

Next, a third embodiment of the present invention will be described. FIG. 11 is a block diagram illustrating the schematic construction of a moving image synthesizing apparatus according to the third embodiment of the present invention. The moving image synthesizing apparatus of the third embodiment comprises: a sampling means 11; a correspondent relationship estimating means 12; a coordinate converting means 13; a correlative value calculating means 14; a comparing means 15; and a synthesizing means 16, instead of the sampling means 1; the correspondent relationship estimating means 2; the coordinate converting means 3; the correlative value calculating means 4; the comparing means 5; and the synthesizing means 6 of the first embodiment. The coordinate converting means 13 coordinate converts frames other than a reference frame to a coordinate space of the reference frame, based on the correspondent relationships estimated by the correspondent relationship estimating means 12. The coordinate converting means 13 thus obtains a plurality of coordinate converted frames FrTi. The correlative value calculating means 14 calculates a plurality of correlative values d1, which represent degrees of correlation among the coordinate converted frames FrTi and the reference frame. The comparing means 15 compares the correlative values di against a threshold value Th1. The comparing means 15 causes the correspondent relationship estimating means 12, the coordinate converting means 13, and the correlative value calculating means 14 to increase the number of rectangular regions within patches, for which correspondent relationships are estimated, in a stepwise manner, to estimate correspondent relationships, to obtain coordinate converted frames FrTi, and to calculate correlative values di for each increased step of the number of rectangular regions, until the correlative value becomes less than or equal to the threshold value Th1 (to be described later). The synthesizing means 16 generates a synthesized frame FrG having a higher resolution than the sampled frames, by administering interpolation calculations on the reference frame and the other frame, based on the correspondent relationships, which were estimated by the correspondent relationship estimating means 12 regarding the frames having the number of rectangular regions therein that yielded the correlative value di less than or equal to the threshold value Th1.

The sampling means 11 samples a plurality of frames from moving image data M0 in the same manner as the sampling means 1 of the first embodiment. In the third embodiment as well, the sampling means 11 samples two frames, FrN and FrN+1, from the moving image data M0.

In the first embodiment, the correspondent relationship estimating means 2 estimated the first correspondent relationship, then estimated the second correspondent relationship after increasing the number of rectangular regions in a stepwise manner. In the third embodiment, the correspondent relationship estimating means 12 derives a first correspondent relationship, then estimates further correspondent relationships after increasing the number of rectangular regions, as will be described later.

The coordinate converting means 13 obtains a coordinate converted frame FrT0 by employing bilinear conversion, as illustrated in Formulas (5) and (6), to coordinate convert the frame FrN+1 to the coordinate space of the reference frame FrN, based on the estimated first correspondent relationship. Note that in the following description, conversion and synthesis is performed only for the regions within a reference patch P0 of the reference frame FrN and a patch P1 within the other frame FrN+1.

The correlative value calculating means 14 calculates the correlative value d0, which represents the degree of correlation between the reference frame FrN and the coordinate converted frame FrT0, according to Formula (9).

The comparing means 15 compares the correlative value d0 against the threshold value Th1. The threshold value Th1 is predetermined and recorded in a memory (not shown) of the comparing means 15. Note that a value on the order of 10 may be employed as the threshold value Th1, in the case that the moving image data M0 is 8 bit data. In the case that the correlative value d0 is less than or equal to the threshold value Th1, the number of rectangular regions within the patches P0 and P1, for which the correlative value d0 was calculated, is determined. This number of rectangular regions is designated as the number of rectangular regions for which the correspondent relationship, to be employed by the synthesizing means 16 to generate the synthesized frame FrG from the frames FrN and FrN+1, was estimated.

In the case that the correlative value d0 exceeds the threshold value Th1, the comparing means 15 controls the correspondent relationship estimating means 12, the coordinate converting means 13, and the correlative value calculating means 14 to increase the number of rectangular regions within patches, for which correspondent relationships are estimated, one step in a stepwise manner, to estimate correspondent relationships, to obtain a coordinate converted frame FrT1, and to calculate a correlative value for the increased number of rectangular regions.

Specifically, the correspondent relationship estimating means 12 increases the number of rectangular regions within the reference patch P0 and the patch P1 from a 2×2 arrangement to a 4×4 arrangement, as shown in FIG. 4A. The reference patch P0 and the patch P1 are provided at appropriate positions in the reference frame FrN and the frame FrN+1, respectively. Then, the amount of movement and the amount of deformation of the patch P1 with respect to the reference patch P0 is derived in the same manner as that described above. Thereafter, the correspondent relationships among the pixels of the reference patch P0 and the patch P1 are estimated. Next, the coordinate converting means 13 converts the frame FrN+1 to a coordinate space of the reference frame FrN, based on the correspondent relationships estimated by the correspondent relationship estimating means 12. The coordinate converting means 13 thus obtains a coordinate converted frame FrT1. The correlative value calculating means 14 calculates the correlative value d1, which represents the degree of correlation between the coordinate converted frame FrT1 and the reference frame FrN, according to Formula (10).

Then, the comparing means 15 compares the calculated correlative value d1 against the threshold value Th1. In the case that the correlative value d1 exceeds the threshold value Th1, the number of rectangular regions within the reference patch P0 and the patch P1 is further increased, as shown in FIG. 4B. Thereafter, the correspondent relationship estimating means 12, the coordinate converting means 13 and the correlative value calculating means 14 are caused to estimate correspondent relationships, to obtain coordinate converted frames FrTi (wherein $-1 \leq i$) (hereinafter, the variable "i" will be employed for generalization), and to calculate correlative values di, for each stepwise increase in the number of rectangular regions, until the correlative value di becomes less than or equal to the threshold value Th1. Note that in the third embodiment, the number of rectangular regions within the reference patch P0 and the patch p1 of the i-th step is $2^{i+1} \times 2^{i+1}$. The coordinate converted frame, obtained by the number of rectangular regions of the i-th step, is designated as coordinate converted frame FrTi. The correlative value, calculated for the patches having therein the number of rectangular regions of the i-th step, is designated as correlative value di. The number of rectangular regions within the reference patch P0 and the patch P1 that yields the correlative value di which is less than or equal to the threshold value Th1 is determined. This number of rectangular regions is designated as the number of rectangular regions to be employed to generate the synthesized frame.

Note that if the number of rectangular regions becomes excessively large, each of the rectangular regions becomes too small. This will cause similar images to be represented in a plurality of rectangular images, which in turn may cause an inability for the movement and/or deformation of the second patch to follow the movement and/or deformation of the subject. Therefore, it is preferable that an upper limit is set for the number of rectangular regions.

The synthesizing means 16 administers interpolation calculations on the reference frame FrN and the frame FrN+1, based on the correspondent relationship, which was estimated for the number of rectangular regions designated to be employed in the generation of the synthesized frame, and generates the synthesized frame FrG in the same manner as the synthesizing means 6 of the first embodiment.

Note that in the third embodiment, synthesized frames FrG are obtained for the luminance component Y and the chrominance components Cb and Cr, as in the first embodiment. A final synthesized frame is obtained by synthesizing the synthesized frame FrG(Y) derived from the luminance component Y, a synthesized frame FrG(Cb) derived from the chrominance component Cb, and a synthesized frame FrG (Cr), derived from the chrominance component Cr.

Figure 12:
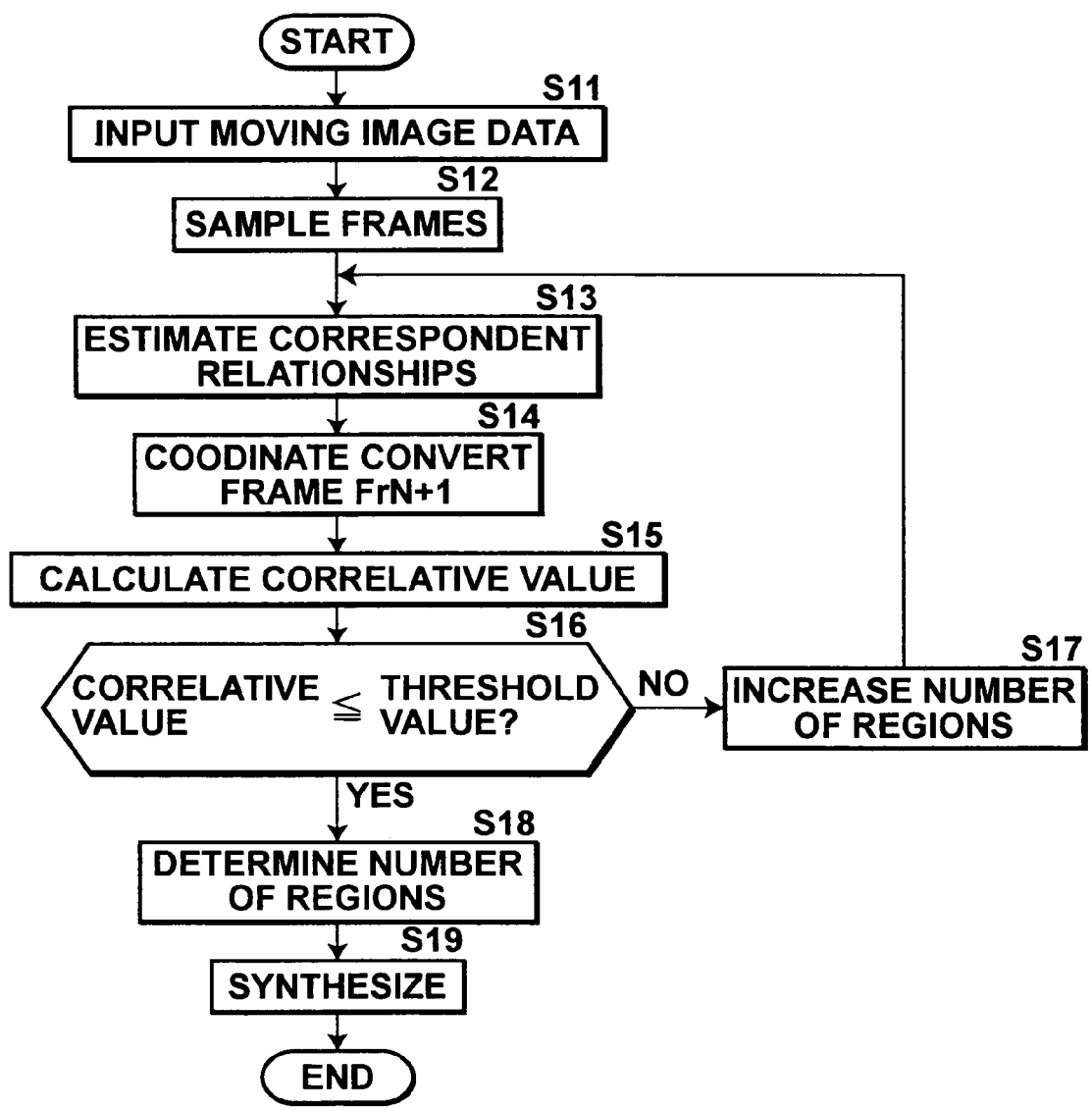
FIG. 12 is a flow chart illustrating the processes performed by the moving image synthesizing apparatus of the third embodiment.

Next, the operation of the third embodiment will be described. FIG. 12 is a flow chart illustrating the processes performed by the moving image synthesizing apparatus of the third embodiment. First, moving image data M0 is input to the sampling means 11 (step S11), and the reference frame FrN and the frame FrN+1 are sampled therefrom (step S12). Next, a correspondent relationship between the reference frame FrN and the frame FrN+1 is estimated by the correspondent relationship estimating means 12 (step S13).

Then, the frame FrN+1 is converted into the coordinate space of the reference frame FrN by the coordinate converting means 13, based on the estimated correspondent relationships, to obtain the coordinate converted frame FrT0 (step S14) Thereafter, the correlative value d0, which represents the degree of correlation between the reference frame FrN and the coordinate converted frame FrT0, is calculated by the correlative value calculating means 14 (step S15). Whether the correlative value is less than or equal to the threshold value Th1 is judged by the comparing means 15 (step S16).

In the case that the judgment in step S16 is negative, the number of rectangular regions within the reference patch P0 and the patch P1 is increased by one step (step S17). Then, the process returns to step S13, and steps S13 through S16 are repeated.

In the case that the judgment in step S16 is affirmative, the number of rectangular regions that yielded the correlative value is determined to be that which is to be employed in generating the synthesized frame (step S18). Then, the synthesizing means 16 generates the synthesized frame FrG from the reference frame FrN and the frame FrN+1, based on the correspondent relationship which was estimated for the determined number of rectangular regions (step S19), and the process ends.

In this manner, the synthesized frame FrG is generated from the reference frame FrN and the frame FrN+1, based on the correspondent relationship which was estimated for the number of rectangular regions that yielded the correlative value less than or equal to the threshold value Th1, in the third embodiment. Therefore, the synthesized frame FrG is enabled to be generated employing the optimal number of rectangular regions for following the movement and/or deformation of a moving subject within the frames. Accordingly, a synthesized frame FrG having high image quality is enabled to be obtained, regardless of movement of a subject included in the frames.

Next, the fourth embodiment of the present invention will be described. In the third embodiment described above, the synthesized frame FrG is generated based on the correspondent relationship, estimated for the number of rectangular regions that yields the correlative value less than or equal to the threshold value Th1, of the entirety of the images in the patches within the reference frame FrN and the frame FrN+1. In the fourth embodiment, correlative values are calculated for each rectangular region within the patches. Each of the correlative values are compared against the threshold value Th1, and a synthesized frame FrG is generated based on the correspondent relationships of each of the rectangular regions. Note that in the fourth embodiment, Formula (9) is employed to calculate the sums of the absolute values of the differences between the pixel values FrN (x, y) and FrT0 (x, y), for corresponding pixels within the reference frame FrN and the coordinate converted frame FrT0, divided by the number of pixels m, with respect to all of the pixels within each of the rectangular regions. The mean value of the quotients, that is, the absolute values of the differences of each pair of corresponding pixels, is calculated as the correlative value of each rectangular region.

FIGS. 13A and 13B are diagrams for explaining the calculation of correlative values for each of the rectangular regions. As shown in FIG. 13A, each rectangular region of a reference patch P0 and a patch P1, in which rectangular regions are provided in a 2×2 arrangement, is designated as rectangular regions A1, A2, A3, and A4. Meanwhile, each rectangular region of a reference patch P0 and a second patch P1, in which rectangular regions are provided in a 4×4 arrangement, is designated as A11~A14, A21~A24, A31~A34, and A41~A44, as shown in FIG. 13B. Note that the rectangular region A1 corresponds to the rectangular regions A11 through A14, the rectangular region A2 corresponds to the rectangular regions A21 through A24, the rectangular region A3 corresponds to the rectangular regions A31 through A34, and the rectangular region A4 corresponds to the rectangular regions A41 through A44.

In the case that the rectangular regions are provided in the 2×2 arrangement, correlative values for the reference frame FrN and the frame FrN+1 are calculated for each of the rectangular regions A1 through A4. The correlative values calculated for each of the rectangular regions A1 through A4 are designated as correlative values d01, d02, d03, and d04, respectively.

In the fourth embodiment, first, the correlative values d01, d02, d03, and d04, which have been calculated in the case of the 2×2 arrangement, are each compared against the threshold value Th1. For the regions that correspond to the rectangular regions within the reference patch P0 and the patch P1, for which the correlative value is less than or equal to the threshold value Th1, the number of rectangular regions (in the 2×2 arrangement) is determined to be the number of rectangular regions to be employed in generating the synthesized frame. On the other hand, for the rectangular regions, for which the correlative value exceeds the threshold value Th1, the number of rectangular regions is increased by one step, and the estimation of the correspondent relationship, the obtainment of the coordinate converted frame, and the calculation of the correlative value are performed again. The process is repeated, that is, the number of rectangular regions is increased and the correlative value is calculated, until the correlative value becomes less than or equal to the threshold value Th1 for all of the regions within the reference patch P0 and the patch P1. The number of rectangular regions that yields the correlative value less than or equal to the threshold value Th1 is determined to be the number of rectangular regions to be employed in generating the synthesized frame, for regions within the reference patch P0 and the patch P1 that correspond to the rectangular region.

For example, a case is considered in which the correlative values d01 and d02, of the rectangular regions A1 and A2 in the 2×2 arrangement, are less than or equal to the threshold value Th1, while the correlative values d03 and d04, of the rectangular regions A3 and A4 exceed the threshold value Th1. In this case, the number of rectangular regions (in this case, 2×2), is determined to be the number of rectangular regions to be employed in generating the synthesized frame, for the regions corresponding to the rectangular regions A1 and A2 within the reference patch P0 and the patch P1.

Then, the rectangular regions A3 and A4 are divided so that they have the same number of rectangular regions therein as in the case that rectangular regions are provided in the reference patch P0 and the patch P1 in a 4×4 arrangement. Correspondent relationships are estimated, coordinate converted frames are obtained, and correlative values are calculated only for the regions of the reference patch P0 and the patch P1 that correspond to the rectangular regions A3 and A4. Next, the correlative values of each of the rectangular regions A31 through A34 and A41 through A44, which correspond to the rectangular regions A3 and A4, are compared against the threshold value Th1. Assume that the correlative values of all of the rectangular regions A31 through A34 and A41 through A44 are less than or equal to the threshold value Th1. The number of rectangular regions (that is, 4×4), is determined to be the number of rectangular regions to be employed in generating the synthesized frame, for the regions corresponding to the rectangular regions A31 through A34 and A41 through A44 within the reference patch P0 and the patch P1.

In this case, the number of rectangular regions, to be employed in generating the synthesized frame from the reference patch P0 and the patch P1 is 2×2 in the left region and 4×4 in the right region, as shown in FIG. 14. Note that in the case that the correlative values of the rectangular regions A31 through A34 and A41 through A44 exceed the threshold value Th1, the numbers of rectangular regions therein are increased another step. Then, the estimation of correspondent relationships, the obtainment of coordinate converted frames and the calculation of correlative values are performed again. This is repeated until the correlative values become less than or equal to the threshold value Th1.

Figure 15:
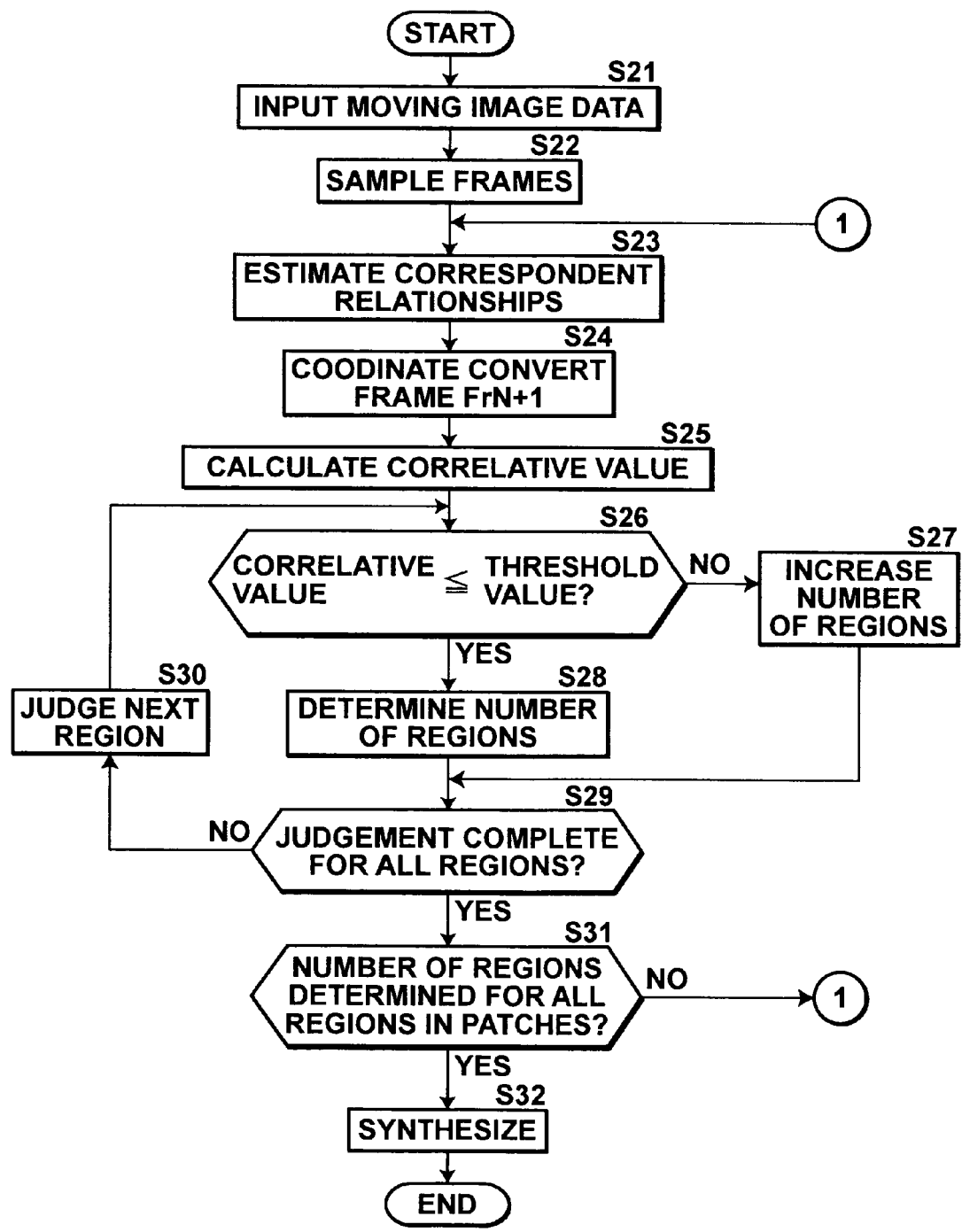
FIG. 15 is a flow chart illustrating the processes performed by the moving image synthesizing apparatus according to the fourth embodiment of the present invention.

Next, the operation of the fourth embodiment will be described. FIG. 15 is a flow chart illustrating the processes performed by the moving image synthesizing apparatus of the fourth embodiment. First, moving image data M0 is input to the sampling means 11 (step S21), and the reference frame FrN and the frame FrN+1 are sampled therefrom (step S22). Next, a correspondent relationship between the reference frame FrN and the frame FrN+1 is estimated by the correspondent relationship estimating means 12 (step S23).

Then, the frame FrN+1 is converted into the coordinate space of the reference frame FrN by the coordinate converting means 13, based on the estimated correspondent relationships, to obtain the coordinate converted frame FrT0 (step S24). Thereafter, a plurality of correlative values, which represents the degrees of correlation among each rectangular region of the reference frame FrN and the coordinate converted frame FrT0, is calculated by the correlative value calculating means 14 (step S25). Whether the correlative value of one of the rectangular regions is less than or equal to the threshold value Th1 is judged by the comparing means 15 (step S26).

In the case that the judgment in step S26 is negative, the number of rectangular regions within the rectangular region of the reference patch P0 and the patch P1 is increased by one step (step S27). Then, the process jumps to step S29, which will be described later. On the other hand, in the case that the judgment in step S26 is affirmative, the number of rectangular regions that yielded the correlative value for the rectangular region is determined to be that which is to be employed in generating the synthesized frame (step S28). Next, whether the judgment of step S26 has been completed for all of the rectangular regions is judged (step S29). In the case that the judgment in step S29 is negative, a different rectangular region is selected (step S30), the process returns to step S26, and the steps thereafter are repeated.

In the case that the judgment in step S29 is affirmative, whether the number of rectangular regions to be employed in generating the synthesized frame has been determined for all regions within the reference patch P0 and the patch P1 is judged (step S31). In the case that the judgment in step S31 is negative, the process returns to step S23, and the steps thereafter are repeated. On the other hand, in the case that the judgment in step S31 is affirmative, the synthesizing means 16 generates the synthesized frame FrG from the reference frame FrN and the frame FrN+1, based on the correspondent relationships which were estimated for the determined number of rectangular regions (step S32), and the process ends.

In this manner, the fourth embodiment determines the correspondent relationship to be employed in the generation of the synthesized frame FrG for each rectangular region. Accordingly, the synthesized frame FrG is generated in units of regions corresponding to rectangular regions into which the reference patch P0 and the patch P1 have been divided. Therefore, the synthesized frame FrG is enabled to be generated employing the optimal number of rectangular regions for following the movement and/or deformation of a moving subject within the frames. Accordingly, a synthesized frame FrG having high image quality is enabled to be obtained, regardless of movement of a subject included in the frames.

Note that in the fourth embodiment, the numbers of rectangular regions within the reference patch P0 and the patch P1 are increased in a stepwise manner until the correlative values of all of the rectangular regions become less than or equal to the threshold value Th1. Alternatively, the number of rectangular regions within the reference patch P0 and the patch P1 that yields a representative correlative value (for example, a mean correlative value, a median correlative value, a maximum correlative value, or a minimum correlative value) less than or equal to a predetermined threshold value Th2, may be determined as that employed in generating the synthesized frame FrG.

In the third and fourth embodiments, the numbers of rectangular regions within the reference patch P0 and the patch P1 are increased in a stepwise manner until the correlative values of all of the rectangular regions become less than or equal to the threshold value Th1. Alternatively, the number of rectangular regions within the reference patch P0 and the patch P1 that yields a correlative value less than or equal to the threshold value Th1 in one of the rectangular regions may be determined to be that employed in generating the synthesized frame FrG. For example, if the correlative value of only one rectangular region (for example, region A1) is less than or equal to the threshold value Th1 in the initial step (2×2 arrangement), then the 2×2 arrangement of rectangular regions is employed to generate the synthesized frame FrG.

As a further alternative, a number of rectangular regions that yields a percentage of the rectangular regions within the second patch or the reference patch having correlative values less than or equal to the threshold value Th1, which is greater than or equal to a predetermined percentage (for example, 50%), may be determined to be that to be employed in generating the synthesized frame FrG. For example, assume a case that the rectangular regions are provided in a 4×4 arrangement. If nine of the sixteen rectangular regions yield correlative values less than or equal to the threshold value Th1, as indicated by the hatched regions in FIG. 16, then the number of rectangular regions to be employed in generating the synthesized frame FrG may be determined to be sixteen.

There is a high possibility that a main subject, such as a human face or a complex texture, is included in the vicinity of the center of the frames (hereinafter, referred to as "main region"). Therefore, as a still further alternative, a number of rectangular regions within the reference patch P0 and the patch P1 that yields correlative values less than or equal to the threshold value Th1 in a main region may be determined to be that employed in generating the synthesized frame FrG. For example, assume a case that rectangular regions are provided in a 4×4 arrangement. If the four central rectangular regions are positioned at a portion of an image that includes a human face, as shown in FIG. 17, then a number of rectangular regions that yields correlative values less than or equal to the threshold value Th1 for the four central rectangular regions may be determined to be that employed in generating the synthesized frame FrG. Note that in this case, a mean of the correlative values of the rectangular regions positioned in the main region may be calculated, and compared against the threshold value Th1.

In the case that the mean of the correlative values is calculated, the correlative values, which have been calculated for each rectangular region, may be weighted according to the percentage that the main subject occupies within the rectangular region. Then, the mean correlative value dm may be calculated from the weighted correlative values, according to Formula (17) below.

$$dm = \frac{\sum Si \cdot d0i}{n} \qquad \text{Formula (17)}$$

wherein d0i: correlative values of each rectangular region
    Si: weighting coefficients that increase in proportion to the percentage of each rectangular region that the main subject occupies Further, in the fourth embodiment, the correlative values obtained of all of the rectangular regions at each step are compared against the threshold value Th1. However, local regions of the reference patch P0 and the patch P1 may have extremely high correlative values. There are cases in which the correlative values of these local regions do not become less than or equal to the threshold value Th1, even if the number of rectangular regions within the patches P0 and P1 are increased. For this reason, the correlative values of each rectangular region are compared against a predetermined value in the initial number of rectangular regions (provided in the 2×2 arrangement). In the case that the correlative value exceeds the predetermined value for a rectangular region, no further correlative values are calculated for that rectangular region. Thereby, the amount of calculation can be reduced, thereby expediting the process. Note that the predetermined value may be several times the threshold value Th1.

In the fourth embodiment, the threshold value Th1 that the correlative values are compared against may be changed, according to the number of rectangular regions. Specifically, as shown in FIG. 18, the threshold value Th1 may be changed so that it decreases according to an increase in the number of rectangular regions until the number reaches a predetermined value ($2^6$ in this case), and then increases according to the increase in the number of rectangular regions. Thereby, the number of rectangular regions may be set appropriately. Note that if the number of rectangular regions becomes excessively large, each of the rectangular regions becomes too small. This will cause similar images to be represented in a plurality of rectangular images, which in turn may cause an inability to follow the movement and/or deformation of the subject. Therefore, the threshold value is increased after the number of rectangular regions exceeds the predetermined value.

In the third and fourth embodiments, the correlative values di are calculated for each of the luminance chrominance components Y, Cb, and Cr. However, a single set of correlative values di' may be calculated, by weighting correlative values diY for the luminance component, and correlative values diCb and diCr for the chrominance components with weighting coefficients a1, b1, and c1, according to Formula (14).

Alternatively, Euclid distances, weighted by weighting coefficients a2, b2, and c2, among luminance components FrTi (x, y) and chrominance components FrTiCb (x, y) and FrTiCr (x, y) of a coordinate converted frame FrTi, and luminance components FrNY (x, y), and chrominance components FrNCb and FrNCr, may be calculated for each of the pixels within the reference patch P0, according to Formula (15). The Euclid distances are designated as correlative values di" (x, y) for each pixel. When applied to the third embodiment, the mean value of the correlative values di" (x, y) for all of the pixels within the reference patch P0 maybe employed as the correlative value that determines the number of rectangular regions. When applied to the fourth embodiment, the mean value of the correlative values di" (x, y) for all of the pixels within each rectangular region may be employed as the correlative value that determines the number of rectangular regions.

In the third and fourth embodiments described above, the synthesized frames FrG are generated from two frames FrN and FrN+1. However, a synthesized frame FrG may be generated from three or more frames. For example, a case is considered in which a synthesized frame FrG is generated from T number of frames FrN+t' (wherein $0 \leq t' \leq T-1$) in the image synthesizing apparatus of the third embodiment. In this case, a plurality of correspondent relationships, between a reference frame FrN (=FrN+0) and each of a plurality of other frames FrN+t (wherein $1 \leq t \leq T-1$), are estimated. Further, a plurality of coordinate converted frames are obtained, according to the plurality of correspondent relationships. Then, correlative values are calculated between the reference frame FrN and each of the plurality of coordinate converted frames. The estimation of the correspondent relationships, the obtainment of the coordinate converted frames, and calculation of the correlative values are performed until the correlative value becomes less than or equal to the threshold value Th1. Next, a synthesized frame is generated, based on the correspondent relationship, which was estimated for the number of rectangular regions that yielded the correlative value less than or equal to the threshold value Th1. This synthesized frame is designated as an intermediate synthesized frame FrGt. Note that pixel values of the intermediate synthesized frame FrGt at integer coordinates of an integrated images are designated as FrGt (x^, y^).

Intermediate synthesized frames FrGt are obtained for all of the other frames FrN+t. Finally, a synthesized frame FrG comprising pixel values (x^, y^) is generated, by adding corresponding pixels of the intermediate frames according to formula (16).

There are cases in which pixel values cannot be assigned to all of the integer coordinates of the integrated images. In these cases, the pixel values for the integer coordinates, for which no pixel values are assigned, may be calculated from assigned pixel values or from pixel values of the reference frame that correspond to the coordinates, for which no pixel values are assigned. The calculation may be an interpolation calculation such as linear interpolation and spline interpolation.

In the case that the synthesized frame FrG is generated from three or more frames, the intermediate synthesized frames may be generated in the same manner as that described in the fourth embodiment. That is, correlative values may be calculated for each of the rectangular regions within the patches, then the intermediate synthesized frames may be generated based on the correspondent relationships of each of the rectangular regions.

Figure 19:
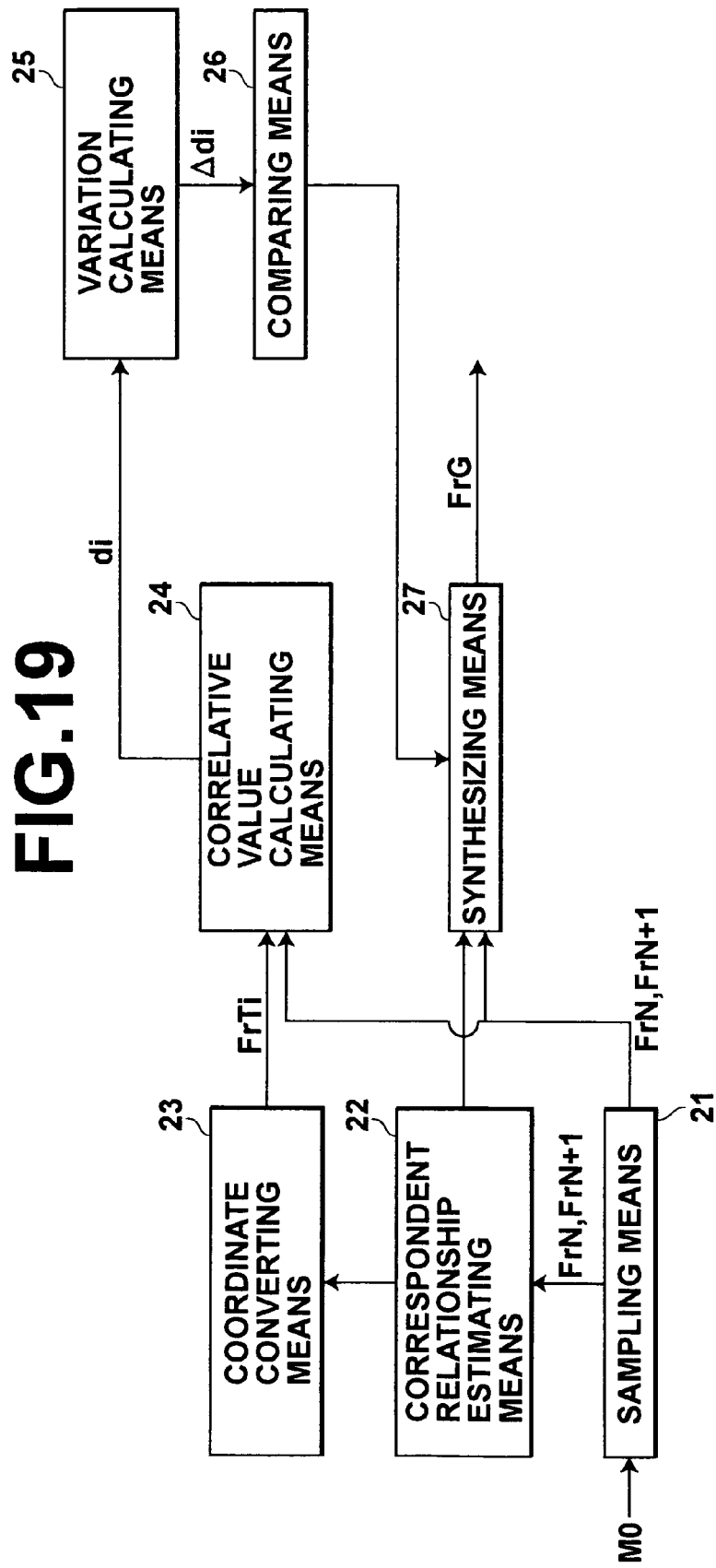
FIG. 19 is a block diagram illustrating the schematic construction of a moving image synthesizing apparatus according to a fifth embodiment of the present invention.

Next, a fifth embodiment of the present invention will be described. FIG. 19 is a block diagram illustrating the schematic construction of a moving image synthesizing apparatus according to the fifth embodiment of the present invention. The moving image synthesizing apparatus of the fifth embodiment comprises: a sampling means 21; a correspondent relationship estimating means 22; a coordinate converting means 23; a correlative value calculating means 24; a variation calculating means 25; a comparing means 26, and a synthesizing means 27, instead of the sampling means 1; the correspondent relationship estimating means 2; the coordinate converting means 3; the correlative value calculating means 4; the comparing means 5; and the synthesizing means 6 of the first embodiment. The coordinate converting means 23 coordinate converts frames other than a reference frame to a coordinate space of the reference frame, based on the correspondent relationships estimated by the correspondent relationship estimating means 22. The coordinate converting means 23 thus obtains a plurality of coordinate converted frames FrTi. The correlative value calculating means 24 calculates a plurality of correlative values, which represent degrees of correlation among the coordinate converted frames FrTi and the reference frame. The variation calculating means 25 calculates the variation between two correlative values, which have been calculated for two consecutive steps in the stepwise increase of a number of rectangular regions within patches, as described later. The comparing means 26 compares the variation against a threshold value Th3. The comparing means 26 causes the correspondent relationship estimating means 22, the coordinate converting means 23, the correlative value calculating means 24, and the variation calculating means 25 to increase the number of rectangular regions within patches, for which correspondent relationships are estimated, in a stepwise manner, to estimate correspondent relationships, to obtain coordinate converted frames FrTi, to calculate correlative values, and to calculate variations for each increased step of the number of rectangular regions, until the variation becomes less than or equal to the threshold value Th3. The synthesizing means 27 generates a synthesized frame FrG having a higher resolution than the sampled frames, by administering interpolation calculations on the reference frame and the other frame, based on the correspondent relationships, which were estimated by the correspondent relationship estimating means 22 regarding the frames having the number of rectangular regions therein that yielded the variation less than or equal to the threshold value Th3.

The sampling means 21 samples a plurality of frames from moving image data M0 in the same manner as the sampling means 1 of the first embodiment. In the fifth embodiment as well, the sampling means 21 samples two frames, FrN and FrN+1, from the moving image data M0.

In the first embodiment, the correspondent relationship estimating means 2 estimated the first correspondent relationship, then estimated the second correspondent relationship after increasing the number of rectangular regions in a stepwise manner. In the fifth embodiment, the correspondent relationship estimating means 22 derives a first correspondent relationship, then estimates further correspondent relationships after increasing the number of rectangular regions, as will be described later.

The coordinate converting means 23 obtains a coordinate converted frame FrT0 by employing bilinear conversion, according to (5) and (6), to coordinate convert the frame FrN+1 to the coordinate space of the reference frame FrN, based on an estimated correspondent relationship. Note that in the following description, conversion and synthesis is performed only for the regions within a reference patch P0 of the reference frame FrN and a patch P1 within the other frame FrN+1.

The correlative value calculating means 24 calculates a correlative value d0, which represents the degree of correlation between the reference frame FrN and the coordinate converted frame FrT0, according to Formula (9).

In the case that the number of rectangular regions is an initial value (four rectangular regions provided in a 2×2 arrangement in the present embodiment), the correlative value calculating means 24 calculates the correlative value d0. Then, the number of rectangular regions is increased by one step (to sixteen rectangular regions provided in a 4×4 arrangement in the present embodiment), and the correlative value calculating means 24 calculates a correlative value d1. The variation calculating means 25 calculates a variation $\Delta d0$ between the correlative value d0 and the correlative value d1.

Specifically, the correspondent relationship estimating means 22 increases the number of rectangular regions within the reference patch P0 and the patch P1 from a 2×2 arrangement to a 4×4 arrangement, as shown in FIG. 4A. The reference patch P0 and the patch P1 are provided at appropriate positions in the reference frame FrN and the frame FrN+1, respectively. Then, the amount of movement and the amount of deformation of the patch P1 with respect to the reference patch P0 is derived in the same manner as that described above. Thereafter, the correspondent relationships among the pixels of the reference patch P0 and the patch P1 are estimated. Next, the coordinate converting means 23 converts the frame FrN+1 to a coordinate space of the reference frame FrN, based on the correspondent relationships estimated by the correspondent relationship estimating means 22. The coordinate converting means 23 thus obtains a coordinate converted frame FrT1. The correlative value calculating means 24 calculates the correlative value d1, which represents the degree of correlation between the coordinate converted frame FrT1 and the reference frame FrN, according to Formula (10). Thereafter, the variation $\Delta d0$ is calculated as the absolute value of the difference between the correlative value d0 and the correlative value d1, according to Formula (18) below.

$$\Delta d0 = |d0 - d1|$$  Formula (18)

Note that the variation $\Delta d0$ cannot be calculated by calculating only the correlative value d0. Therefore, the variation calculating means 25 controls the correspondent relationship estimating means 22, the coordinate converting means 23, and the correlative value calculating means 24 to increase the number of rectangular regions one step, and to calculate the correlative value d1.

The comparing means 26 compares the variation $\Delta d0$ against the threshold value Th3. The threshold value Th3 is predetermined and recorded in a memory (not shown) of the comparing means 26. In the case that the variation $\Delta d0$ is less than or equal to the threshold value Th3, the smaller of the two numbers of rectangular regions that yielded the correlative values d0 and d1, from which the variation $\Delta d0$ was calculated, is determined. This number of rectangular regions is designated as the number of rectangular regions for which the correspondent relationship, to be employed by the synthesizing means 27 to generate the synthesized frame FrG from the frames FrN and FrN+1, was estimated, as will be described later.

On the other hand, in the case that the variation $\Delta d0$ exceeds the threshold value Th3, the comparing means 26 controls the correspondent relationship estimating means 22, the coordinate converting means 23, the correlative value calculating means 24, and the variation calculating means 25 to increase the number of rectangular regions within the reference patch P0 and the patch P1 one step in a stepwise manner, to estimate correspondent relationships, to obtain a coordinate converted frame, to calculate a correlative value, and to calculate a variation for the increased number of rectangular regions.

Specifically, the correspondent relationship estimating means 22 increases the number of rectangular regions within the reference patch P0 and the patch P1 from a 4×4 arrangement to an 8×8 arrangement, as shown in FIG. 4B. The reference patch P0 and the patch P1 are provided at appropriate positions in the reference frame FrN and the frame FrN+1, respectively. Then, the amount of movement and the amount of deformation of the patch P1 with respect to the reference patch P0 is derived in the same manner as that described above. Thereafter, the correspondent relationships among the pixels of the reference patch P0 and the patch P1 are estimated. Next, the coordinate converting means 23 converts the frame FrN+1 to a coordinate space of the reference frame FrN, based on the correspondent relationships estimated by the correspondent relationship estimating means 22. The coordinate converting means 23 thus obtains a coordinate converted frame FrT2. The correlative value calculating means 24 calculates a correlative value d2, which represents the degree of correlation between the coordinate converted frame FrT2 and the reference frame FrN. Thereafter, the variation calculating means 25 calculates the absolute value of the difference between the correlative value d1 and d2, as a variation $\Delta d1$.

Then, the comparing means 26 compares the variation $\Delta d1$ against the threshold value Th3. In the case that the variation $\Delta d1$ exceeds the threshold value Th3, the number of rectangular regions within the reference patch P0 and the patch P1 is further increased, to 256 rectangular regions provided in a 16×16 arrangement. Thereafter, the correspondent relationship estimating means 22, the coordinate converting means 23, the correlative value calculating means 24, and the variation calculating means 25 are caused to estimate correspondent relationships, to obtain coordinate converted frames, to calculate correlative values di+1 (wherein −1≦i) (hereinafter, the variable "i" will be employed for generalization), and to calculate variations for each stepwise increase in the number of rectangular regions, until the variation Δd1 between the correlative values di and di+1 becomes less than or equal to the threshold value Th3. Note that in the fifth embodiment, the number of rectangular regions within the reference patch P0 and the patch p1 of the i-th step is $2^{i+1} \times 2^{i+1}$. The coordinate converted frame, obtained by the number of rectangular regions of the i-th step, is designated as coordinate converted frame FrTi. The correlative value, calculated for the patches having therein the number of rectangular regions of the i-th step, is designated as correlative value di. The smaller of the two numbers of rectangular regions within the reference patch P0 and the patch P1 that yield the variation Δdi which is less than or equal to the threshold value Th3 is determined. This number of rectangular regions is designated as the number of rectangular regions to be employed to generate the synthesized frame.

Note that if the number of rectangular regions becomes excessively large, each of the rectangular regions becomes too small. This will cause similar images to be represented in a plurality of rectangular images, which in turn may cause an inability for the movement and/or deformation of the second patch to follow the movement and/or deformation of the subject. Therefore, it is preferable that an upper limit is set for the number of rectangular regions.

The synthesizing means 27 administers interpolation calculations on the reference frame FrN and the frame FrN+1, based on the correspondent relationship, which was estimated for the number of rectangular regions designated to be employed in the generation of the synthesized frame, and generates the synthesized frame FrG in the same manner as the synthesizing means 6 of the first embodiment.

Note that in the fifth embodiment, synthesized frames FrG are obtained for the luminance component Y and the chrominance components Cb and Cr, as in the first embodiment. A final synthesized frame is obtained by synthesizing the synthesized frame FrG(Y) derived from the luminance component Y, a synthesized frame FrG(Cb) derived from the chrominance component Cb, and a synthesized frame FrG (Cr), derived from the chrominance component Cr.

Figure 20:
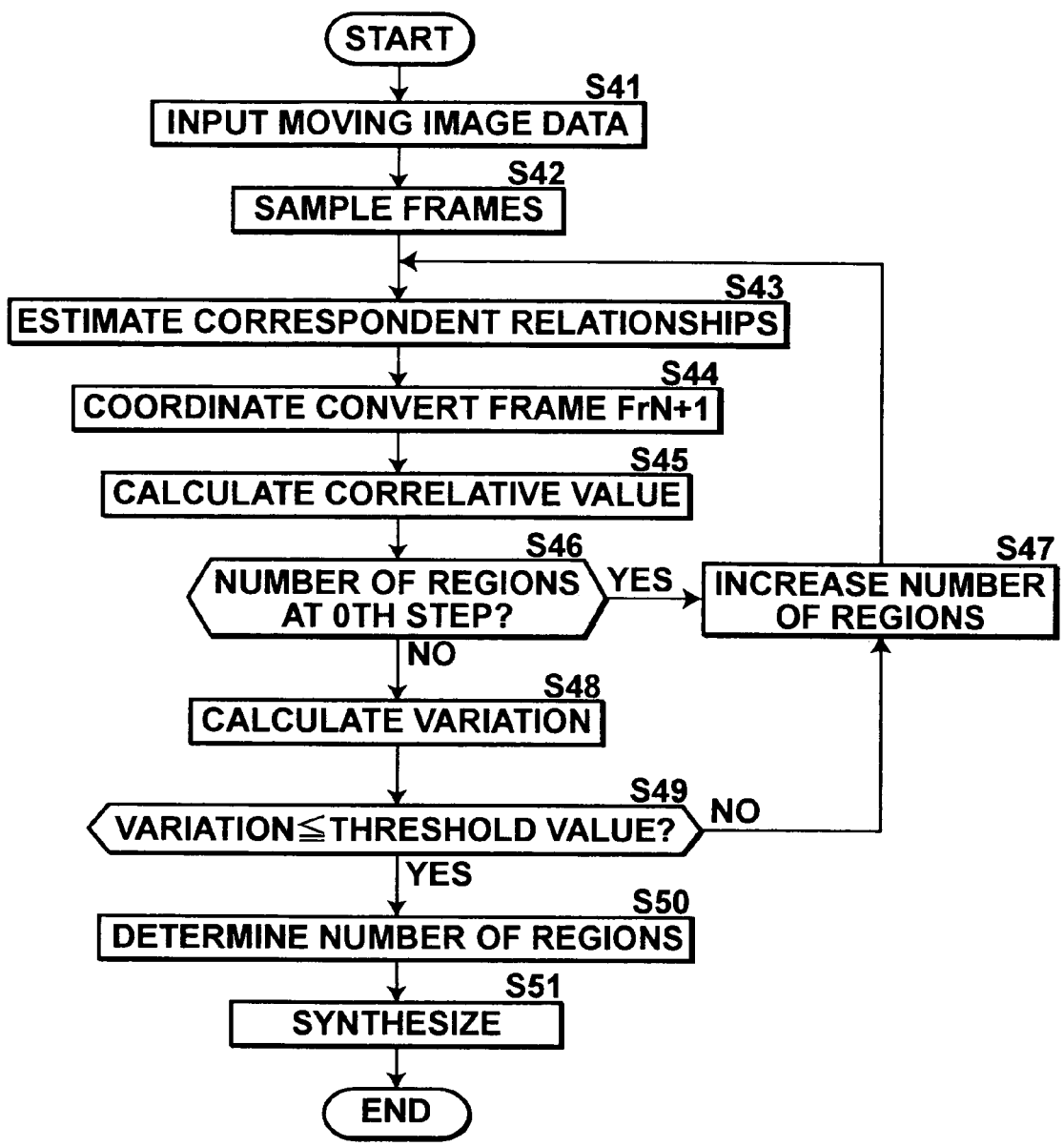
FIG. 20 is a flow chart illustrating the processes performed by the moving image synthesizing apparatus of the fifth embodiment.

Next, the operation of the fifth embodiment will be described. FIG. 20 is a flow chart illustrating the processes performed by the moving image synthesizing apparatus of the fifth embodiment. First, moving image data M0 is input to the sampling means 21 (step S41), and the reference frame FrN and the frame FrN+1 are sampled therefrom (step S42). Next, a correspondent relationship between the reference frame FrN and the frame FrN+1 is estimated by the correspondent relationship estimating means 22 (step S43).

Then, the frame FrN+1 is converted into the coordinate space of the reference frame FrN by the coordinate converting means 23, based on the estimated correspondent relationships, to obtain the coordinate converted frame FrTi (step S44) Thereafter, the correlative value di, which represents the degree of correlation between the reference frame FrN and the coordinate converted frame FrT0, is calculated by the correlative value calculating means 24 (step S45).

Thereafter, whether the correlative value has been calculated for the reference patch P0 and the patch P1 of the 0th step, that is, the initial number of rectangular regions, is judged (step S46). In the case that the judgment in step S46 is affirmative, the number of rectangular regions within the reference patch P0 and the patch P1 is increased one step (step S47). Then, the process returns to step S43, and steps S43 through S45 are repeated with respect to the reference patch P0 and the patch P1 having the increased number of rectangular regions therein. Thereby, a correlative value di+1, which represents the degree of correlation between the reference frame FrN and the coordinate converted frame FrT0, is calculated.

After the correlative value di+1 is calculated with respect to the increased number of rectangular regions, the judgment in step S46 becomes negative. The variation Δdi between the correlative value di, which was calculated for the number of rectangular regions of the previous step, and the correlative value di+1, which was calculated for the current number of rectangular regions, is calculated (step S48). Then, whether the variation Δdi is less than or equal to the threshold value Th3 is judged by the comparing means 26 (step S49).

In the case that the judgment in step S49 is negative, the number of rectangular regions within the reference patch P0 and the patch P1 is increased by another step (step S47). Then, the process returns to step S43, and steps S43 through S49 are repeated with respect to the reference patch P0 and the patch P1 having the increased number of rectangular regions therein.

In the case that the judgment in step S49 is affirmative, the smaller of the two numbers of rectangular regions that yielded the correlative value di, of the correlative values di and di+1, for which the variation Δdi was calculated, is determined to be that employed in generating the synthesized frame (step S50). Then, the synthesizing means 27 generates the synthesized frame FrG from the reference frame FrN and the frame FrN+1, based on the correspondent relationship which was estimated for the determined number of rectangular regions (step S51), and the process ends.

In this manner, the synthesized frame FrG is generated from the reference frame FrN and the frame FrN+1, based on the correspondent relationship which was estimated for the number of rectangular regions that yielded the variation less than or equal to the threshold value Th3, in the fifth embodiment. Therefore, the synthesized frame FrG is enabled to be generated employing the optimal number of rectangular regions for following the movement and/or deformation of a moving subject within the frames. Accordingly, a synthesized frame FrG having high image quality is enabled to be obtained, regardless of movement of a subject included in the frames.

Next, the sixth embodiment of the present invention will be described. In the fifth embodiment described above, the synthesized frame FrG is generated based on the correspondent relationship, estimated for the number of rectangular regions that yields the variation less than or equal to the threshold value Th3, of the entirety of the images in the patches within the reference frame FrN and the frame FrN+1. In the sixth embodiment, variations are calculated for each rectangular region within the reference patch P0 and the patch 1. Each of the variations are compared against the threshold value Th3, and a synthesized frame FrG is generated after determining the number of rectangular regions to be employed in generating the synthesized frame FrG for each of the rectangular regions. Note that in the sixth embodiment, Formula (9) is employed to calculate the sums of the absolute values of the differences between the pixel values FrN(x, y) and FrT0(x, y), for corresponding pixels within the reference frame FrN and the coordinate converted frame FrT0, divided by the number of pixels m, with respect to all of the pixels within each of the rectangular regions. The mean value of the quotients, that is, the absolute values of the differences of each pair of corresponding pixels, is calculated as the correlative value of each rectangular region.

Note that the calculation of the correlative values for each of the rectangular regions at each step is performed in the same manner as in the fourth embodiment, therefore a detailed description will be omitted here. Here, the correlative values calculated for each of the rectangular regions A1 through A4 are designated as correlative values d01, d02, d03, and d04, respectively.

In the sixth embodiment, sums of the correlative values of the rectangular regions A11 through A14, A21 through A24, A31 through A34, and A41 through A44 are calculated for the sixteen rectangular regions provided in the 4×4 arrangement, in order to calculate variations. The summed correlative values are designated as correlative values d11, d12, d13 and d14.

The absolute values of the differences among correlative values of corresponding rectangular regions are calculated as the variations. That is, variations $\Delta d01$, $\Delta d02$, $\Delta d03$, and $\Delta d04$, corresponding to the rectangular regions A1 through A4, provided in the 2×2 arrangement, are calculated according to Formulas (19) through (22) below.

$$\Delta d01 = |d01 - d11| \quad \text{Formula (19)}$$

$$\Delta d02 = |d02 - d12| \quad \text{Formula (20)}$$

$$\Delta d03 = |d03 - d13| \quad \text{Formula (21)}$$

$$\Delta d04 = |d04 - d14| \quad \text{Formula (22)}$$

Then, the variations $\Delta d01$, $\Delta d02$, $\Delta d03$, and $\Delta d04$ are compared against the threshold value Th3. For the regions that correspond to the rectangular regions within the reference patch P0 and the patch P1, for which the variation is less than or equal to the threshold value Th3, the smaller of the two numbers of rectangular regions (that is, the 2×2 arrangement) is determined to be the number of rectangular regions to be employed in generating the synthesized frame. On the other hand, for the rectangular regions, for which the variation exceeds the threshold value Th3, the number of rectangular regions is increased by one step, and the estimation of the correspondent relationship, the obtainment of the coordinate converted frame, the calculation of the correlative value, and the calculation of the variation are performed again. The process is repeated, that is, the number of rectangular regions is increased, the correlative value is calculated, and the variation is calculated, until the variation becomes less than or equal to the threshold value Th3 for all of the regions within the reference patch P0 and the patch P1. The smaller of the two numbers of rectangular regions that yield the variation less than or equal to the threshold value Th3 is determined to be the number of rectangular regions to be employed in generating the synthesized frame, for regions within the reference patch P0 and the patch P1 that correspond to the rectangular region.

For example, a case is considered in which the variations $\Delta d01$ and $\Delta d02$, of the rectangular regions A1 and A2 in the 2×2 arrangement, are less than or equal to the threshold value Th3, while the variations $\Delta d03$ and $\Delta d04$, of the rectangular regions A3 and A4 exceed the threshold value Th3. In this case, the smaller of the two numbers of rectangular regions (in this case, 2×2), is determined to be the number of rectangular regions to be employed in generating the synthesized frame, for the regions corresponding to the rectangular regions A1 and A2 within the reference patch P0 and the patch P1.

On the other hand, the rectangular regions A31 through A34 and A41 through 44, corresponding to the rectangular regions A3 and A4, are further divided so that they have the same number of rectangular regions therein as in the case that rectangular regions are provided in the reference patch P0 and the patch P1 in a 8×8 arrangement. Correspondent relationships are estimated, coordinate converted frames are obtained, and correlative values are calculated only for the regions of the reference patch P0 and the patch P1 that correspond to the rectangular regions A31 through A34 and A41 through A44. Next, the correlative values of the four rectangular regions that correspond to each of the rectangular regions A31 through A34 and A41 through A44 are summed. The summed correlative values are designated as the correlative values of the regions that correspond to the rectangular regions A31 through A34 and A41 through A44. The variations among the correlative values of the rectangular regions A31 through A34 and A41 through A44 and the correlative values of the rectangular regions, provided in the 8×8 arrangement, which correspond to the rectangular regions A31 through A34 and A41 through A44, are calculated. The variations are compared against the threshold value Th3.

Assume that the variations of all of the rectangular regions A31 through A34 and A41 through A44 are less than or equal to the threshold value Th3. The smaller of the two numbers of rectangular regions (that is, sixteen regions provided in the 4×4 arrangement), is determined to be the number of rectangular regions to be employed in generating the synthesized frame, for the regions corresponding to the rectangular regions A31 through A34 and A41 through A44 within the reference patch P0 and the patch P1.

In this case, the number of rectangular regions, to be employed in generating the synthesized frame from the reference patch P0 and the patch P1, is 2×2 in the left region and 4×4 in the right region, as shown in FIG. 14. Note that in the case that the variations of the rectangular regions A31 through A34 and A41 through A44 exceed the threshold value Th3, the numbers of rectangular regions therein are increased another step. Then, the estimation of correspondent relationships, the obtainment of coordinate converted frames, the calculation of correlative values and the calculation of the variations are performed again. This is repeated until the variations of all of the regions within the reference patch P0 and the patch P1 become less than or equal to the threshold value Th3.

Figure 21:
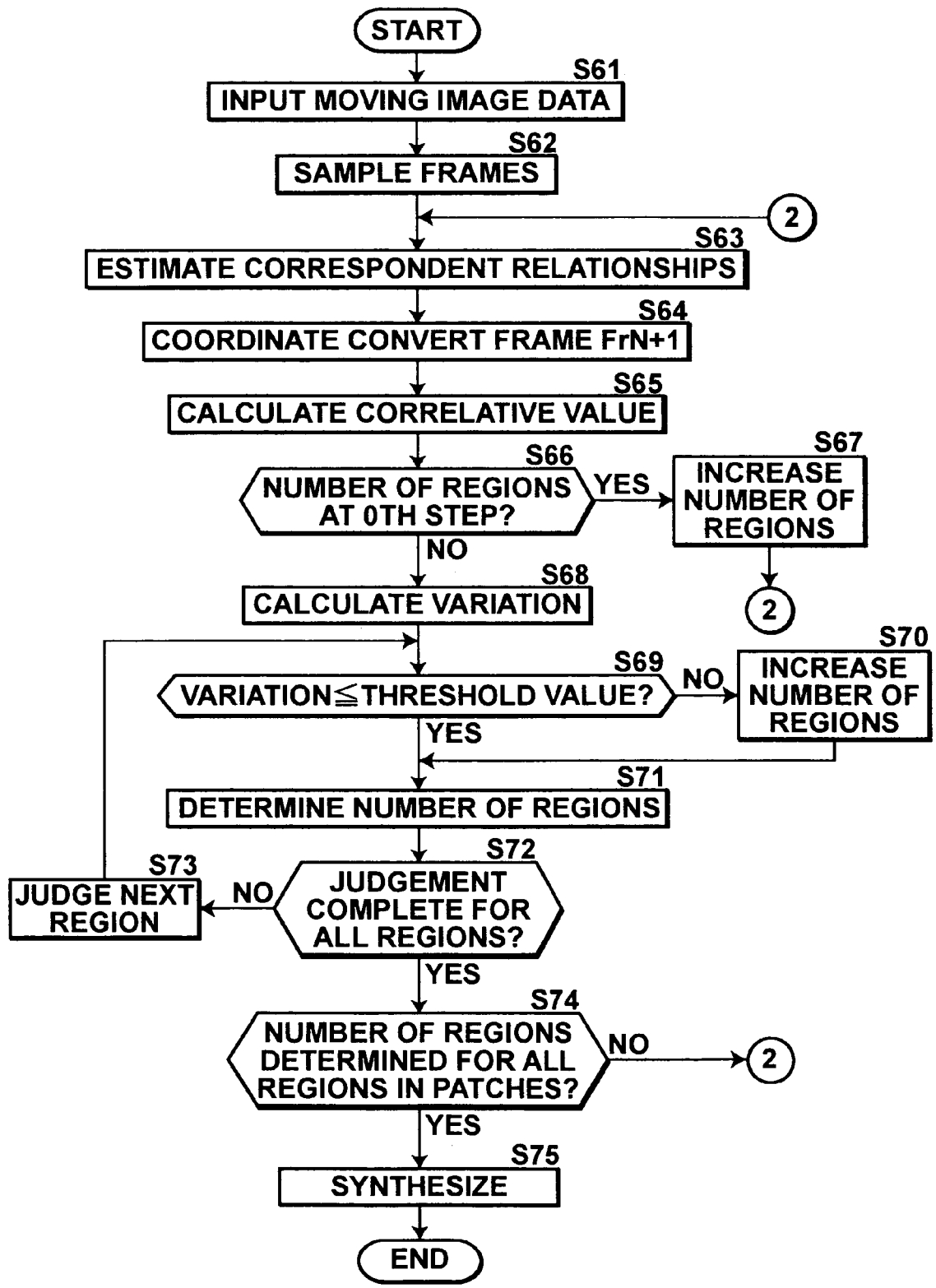
FIG. 21 is a flow chart illustrating the processes performed by a moving image synthesizing apparatus according to a sixth embodiment of the present invention.

Next, the operation of the sixth embodiment will be described. FIG. 21 is a flowchart illustrating the processes performed by the moving image synthesizing apparatus of the sixth embodiment. First, moving image data M0 is input to the sampling means 21 (step S61), and the reference frame FrN and the frame FrN+1 are sampled therefrom (step S62). Next, a correspondent relationship between the reference frame FrN and the frame FrN+1 is estimated by the correspondent relationship estimating means 22 (step S63).

Then, the frame FrN+1 is converted into the coordinate space of the reference frame FrN by the coordinate converting means 23, based on the estimated correspondent relationships, to obtain the coordinate converted frame FrTi (step S64). Thereafter, a plurality of correlative values, which represents the degrees of correlation among each rectangular region of the reference frame FrN and the coordinate converted frame FrT0, is calculated by the correlative value calculating means 24 (step S65).

Thereafter, whether the correlative values have been calculated for the reference patch P0 and the patch P1 of the $0^{th}$ step, that is, the initial number of rectangular regions, is judged (step S66). In the case that the judgment in step S66 is affirmative, the number of rectangular regions within the reference patch P0 and the patch P1 is increased one step (step S67). Then, the process returns to step S63, and steps S63 through S65 are repeated with respect to the reference patch P0 and the patch P1 having the increased number of rectangular regions therein. Thereby, correlative values, which represent the degrees of correlation among each rectangular region of the reference frame FrN and the coordinate converted frame FrT0, are calculated.

After the correlative values are calculated with respect to the increased number of rectangular regions, the judgment in step S66 becomes negative. The variations among the correlative values, which were calculated for the number of rectangular regions of the previous step, and the correlative values, which were calculated for the current number of rectangular regions, are calculated (step S68). Then, whether the variations of each rectangular region are less than or equal to the threshold value Th3 is judged by the comparing means 26 (step S69).

In the case that the judgment in step S69 is negative, the number of rectangular regions within the reference patch P0 and the patch P1 is increased by another step (step S70). Then, the process jumps to step S72, which will be described later. On the other hand, in the case that the judgment in step S69 is affirmative, the smaller of the two numbers of rectangular regions that yielded the variation for the rectangular region is determined to be that which is to be employed in generating the synthesized frame (step S71). Next, whether the judgment of step S69 has been completed for all of the rectangular regions is judged (step S72). In the case that the judgment in step S72 is negative, a different rectangular region is selected (step S73), the process returns to step S69, and the steps thereafter are repeated.

In the case that the judgment in step S72 is affirmative, whether the number of rectangular regions to be employed in generating the synthesized frame has been determined for all regions within the reference patch P0 and the patch P1 is judged (step S74). In the case that the judgment in step S74 is negative, the process returns to step S73, and the steps thereafter are repeated regarding the rectangular regions, for which the number of rectangular regions to be employed in generating the synthesized frame has not been determined. On the other hand, in the case that the judgment in step S74 is affirmative, the synthesizing means 27 generates the synthesized frame FrG from the reference frame FrN and the frame FrN+1, based on the correspondent relationships which were estimated for the determined number of rectangular regions (step S75), and the process ends.

In this manner, the sixth embodiment determines the correspondent relationship to be employed in the generation of the synthesized frame FrG for each rectangular region. Accordingly, the synthesized frame FrG is generated in units of regions corresponding to rectangular regions into which the reference patch P0 and the patch P1 have been divided. Therefore, the synthesized frame FrG is enabled to be generated employing the optimal number of rectangular regions for following the movement and/or deformation of a moving subject within the frames. Accordingly, a synthesized frame FrG having high image quality is enabled to be obtained, regardless of movement of a subject included in the frames.

Note that in the sixth embodiment, the numbers of rectangular regions within the reference patch P0 and the patch P1 are increased in a stepwise manner until the variations of all of the rectangular regions become less than or equal to the threshold value Th3. Alternatively, the number of rectangular regions within the reference patch P0 and the patch P1 that yields a representative variation (for example, a mean variation, a median variation, a maximum variation, or a minimum variation) less than or equal to a predetermined threshold value Th4, may be determined as that employed in generating the synthesized frame FrG.

In the sixth embodiment, the numbers of rectangular regions within the reference patch P0 and the patch P1 are increased in a stepwise manner until the variations of all of the rectangular regions become less than or equal to the threshold value Th3. Alternatively, the number of rectangular regions within the reference patch P0 and the patch P1 that yields a variation less than or equal to the threshold value Th3 in one of the rectangular regions may be determined to be that employed in generating the synthesized frame FrG. For example, if the variation of only one rectangular region (for example, region A1) is less than or equal to the threshold value Th3 in the initial step (2×2 arrangement), then the 2×2 arrangement of rectangular regions is employed to generate the synthesized frame FrG.

As a further alternative, a number of rectangular regions that yields a percentage of the rectangular regions within the second patch or the reference patch having variations less than or equal to the threshold value Th3, which is greater than or equal to a predetermined percentage (for example, 50%), may be determined to be that to be employed in generating the synthesized frame FrG. For example, assume a case that the rectangular regions are provided in a 4×4 arrangement. If nine of the sixteen rectangular regions yield variations less than or equal to the threshold value Th3, as indicated by the hatched regions in FIG. 16, then the number of rectangular regions to be employed in generating the synthesized frame FrG may be determined to be sixteen.

There is a high possibility that a main subject, such as a human face or a complex texture, is included in the vicinity of the center of the frames (hereinafter, referred to as "main region"). Therefore, as a still further alternative, a number of rectangular regions within the reference patch P0 and the patch P1 that yields variations less than or equal to the threshold value Th3 in a main region may be determined to be that employed in generating the synthesized frame FrG. For example, assume a case that rectangular regions are provided in a 4×4 arrangement. If the four central rectangular regions are positioned at a portion of an image that includes a human face, as shown in FIG. 17, then a number of rectangular regions that yields variations less than or equal to the threshold value Th3 for the four central rectangular regions may be determined to be that employed in generating the synthesized frame FrG. Note that in this case, a mean of the variations of the rectangular regions positioned in the main region may be calculated, and compared against the threshold value Th1.

In the case that the mean of the variations is calculated, the variations, which have been calculated for each rectangular region, may be weighted according to the percentage that the main subject occupies within the rectangular region. Then, the mean variation $\Delta dm$ may be calculated from the weighted variations, according to Formula (23) below.

$$\Delta dm = \frac{\sum Si \cdot \Delta d0i}{n} \qquad \text{Formula (23)}$$

wherein $\Delta d0i$: correlative values of each rectangular region $Si$: weighting coefficients that increase in proportion to the percentage of each rectangular region that the main subject occupies.

Further, in the sixth embodiment, the variations obtained of all of the rectangular regions at each step are compared against the threshold value Th3. However, local regions of the reference patch P0 and the patch P1 may have extremely high variations. There are cases in which the variations of these local regions do not become less than or equal to the threshold value Th3, even if the number of rectangular regions within the patches P0 and P1 are increased. For this reason, the variations of each rectangular region are compared against a predetermined value in the initial number of rectangular regions (provided in the 2×2 arrangement). In the case that the variation exceeds the predetermined value for a rectangular region, no further variations are calculated for that rectangular region. Thereby, the amount of calculation can be reduced, thereby expediting the process. Note that the predetermined value may be several times the threshold value Th3.

Figure 22:
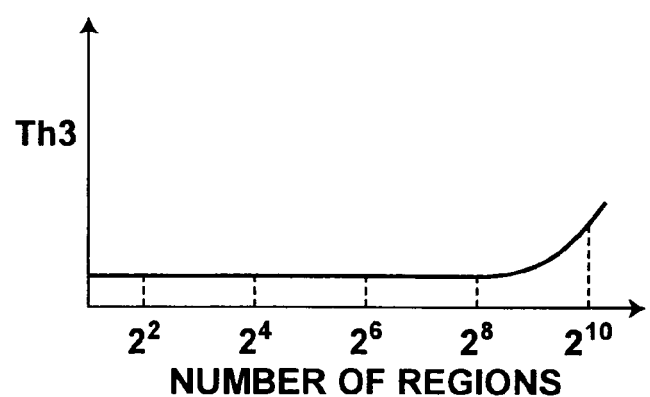
FIG. 22 is a graph illustrating the relationship between numbers of rectangular regions and a threshold value in the sixth embodiment.

In the fifth and sixth embodiments, the threshold value Th3 that the variations are compared against may be changed, according to the number of rectangular regions. Specifically, as shown in FIG. 22, the threshold value Th3 may be changed so that it remains constant regardless of an increase in the number of rectangular regions until the number reaches a predetermined value ($2^8$ in this case), and then increases according to the increase in the number of rectangular regions. Thereby, the number of rectangular regions may be set appropriately. Note that if the number of rectangular regions becomes excessively large, each of the rectangular regions becomes too small. This will cause similar images to be represented in a plurality of rectangular images, which in turn may cause an inability to follow the movement and/or deformation of the subject. Therefore, the threshold value is increased after the number of rectangular regions exceeds the predetermined value.

Note that in the first through sixth embodiments, the synthesized frame FrG is obtained for each of the luminance and chrominance components Y, Cb, and Cr of the reference frame FrM and the frame FrN+1. However, the synthesized frame FrG may be obtained only for the luminance component Y. Regarding the chrominance components Cb and Cr, synthesized frames therefor may be obtained by performing linear interpolations on the chrominance components Cb and Cr of the reference frame FrN.

In the case that the frames FrN and FrN+1 comprise RGB color data, the synthesized frame FrG may be generated by processing each of the components R, G, and B.

In the fifth and sixth embodiments, the correlative values di are calculated for each of the luminance chrominance components Y, Cb, and Cr. However, a single set of correlative values di' may be calculated, by weighting correlative values diY for the luminance component, and correlative values diCb and diCr for the chrominance components with weighting coefficients a1, b1, and c1, according to Formula (14). Then, variations Δdi' may be calculated from the correlative values di' and correlative values di+1', which have been calculated for the next step in the number of rectangular regions.

Alternatively, Euclid distances, weighted by weighting coefficients a2, b2, and c2, among luminance components FrTi (x, y) and chrominance components FrTiCb (x, y) and FrTiCr (x, y) of a coordinate converted frame FrTi, and luminance components FrNY (x, y), and chrominance components FrNCb and FrNCr, may be calculated for each of the pixels within the reference patch P0, according to Formula (15). The Euclid distances are designated as correlative values di" (x, y) for each pixel. When applied to the fifth embodiment, the mean value of the correlative values di" (x, y) for all of the pixels within the reference patch P0 may be employed as the correlative value to be used in calculating the variation that determines the number of rectangular regions. When applied to the sixth embodiment, the mean value of the correlative values di" (x, y) for all of the pixels within each rectangular region may be employed as the correlative value to be used in calculating the variation that determines the number of rectangular regions.

In the fifth and sixth embodiments described above, the synthesized frames FrG are generated from two frames FrN and FrN+1. However, a synthesized frame FrG may be generated from three or more frames. For example, a case is considered in which a synthesized frame FrG is generated from T number of frames FrN+t' (wherein 0≦t'≦T−1) in the image synthesizing apparatus of the third embodiment. In this case, a plurality of correspondent relationships, between a reference frame FrN (=FrN+0) and each of a plurality of other frames FrN+t (wherein 1≦t≦T−1), are estimated. Further, a plurality of coordinate converted frames are obtained, according to the plurality of correspondent relationships. Then, correlative values are calculated between the reference frame FrN and each of the plurality of coordinate converted frames. Then, variations among the correlative values, obtained for two consecutive stepwise increases in the number of rectangular regions, are calculated. The estimation of the correspondent relationships, the obtainment of the coordinate converted frames, the calculation of the correlative values, and the calculation of the variations are performed until the variation becomes less than or equal to the threshold value Th3. Next, a synthesized frame is generated, based on the correspondent relationship, which was estimated for the number of rectangular regions that yielded the variation less than or equal to the threshold value Th3. This synthesized frame is designated as an intermediate synthesized frame FrGt. Note that pixel values of the intermediate synthesized frame FrGt at integer coordinates of an integrated images are designated as FrGt (x^, y^).

Intermediate synthesized frames FrGt are obtained for all of the other frames FrN+t. Finally, a synthesized frame FrG comprising pixel values (x^, y^) is generated, by adding corresponding pixels of the intermediate frames according to formula (16).

There are cases in which pixel values cannot be assigned to all of the integer coordinates of the integrated images. In these cases, the pixel values for the integer coordinates, for which no pixel values are assigned, may be calculated from assigned pixel values or from pixel values of the reference frame that correspond to the coordinates, for which no pixel values are assigned. The calculation may be an interpolation calculation such as linear interpolation and spline interpolation.

In the case that the synthesized frame FrG is generated from three or more frames, the intermediate synthesized frames may be generated in the same manner as that described in the fourth embodiment. That is, correlative values may be calculated for each of the rectangular regions within the patches, then the intermediate synthesized frames may be generated based on the correspondent relationships of each of the rectangular regions.

In the fifth and sixth embodiments, the variations Δdi are calculated from two correlative values di and di+1. The number of rectangular regions, the correspondent relationship of which is to be employed in the generation of a synthesized frame, is determined to be the smaller of the two numbers of rectangular regions, for which the correlative value di was calculated. However, the larger number of rectangular regions, for which the correlative value di+1 was calculated, may be the number of rectangular region, the correspondent relationship of which is to be employed in the generation of the synthesized frame.

What is claimed is:

1. A method for synthesizing moving images, comprising the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

varying the number of said at least one rectangular regions within the reference patch and the second patch in a stepwise manner, estimating the correspondent relationships, obtaining the coordinate converted frames, and calculating the correlative values for each number of said at least one rectangular regions, thereby obtaining a plurality of correlative values corresponding to the number of rectangular regions within the reference patch and the second patch;

comparing the degrees of correlation for each number of said at least one rectangular regions, based on the plurality of the correlative values; and generating a synthesized frame having a higher resolution than either of the two frames, by administering interpolation calculations on the images within the second patch and the reference patch, based on the correspondent relationships, which were estimated among the pixels of the reference patch and the second patch having the number of said at least one rectangular regions therein that yielded the highest degree of correlation.

2. A method for synthesizing moving images, comprising the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

varying the number of said at least one rectangular regions within the reference patch and the second patch in a stepwise manner, estimating the correspondent relationships, obtaining the coordinate converted frames, and calculating the correlative values for each number of said at least one rectangular regions, thereby obtaining a plurality of correlative values corresponding to the number of said at least one rectangular regions within the reference patch and the second patch;

comparing the degrees of correlation for each number of said at least one rectangular regions, based on the plurality of the correlative values;

obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of said at least one rectangular regions therein that yielded the highest degree of correlation;

obtaining a plurality of intermediate synthesized frames by estimating the correspondent relationships, obtaining the coordinate converted frames, calculating the plurality of correlative values, and comparing the degrees of correlation for all of the plurality of sampled frames; and generating a synthesized frame by synthesizing the plurality of intermediate synthesized frames.

3. A moving image synthesizing apparatus, comprising:

a sampling means, for sampling two consecutive frames from a moving image;

a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among pixels within the second patch of the other frame and pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a correlative value, which represents a degree of correlation between the images within the reference patch of the reference frame and the coordinate converted frame;

a control means, for controlling the correspondent relationship estimating means, the coordinate converting means, and the correlative value calculating means, to vary the number of said at least one rectangular regions within the reference patch and the second patch in a stepwise manner, to estimate the correspondent relationships, to obtain the coordinate converted frames, and to calculate the correlative values for each number of said at least one rectangular regions, thereby obtaining a plurality of correlative values corresponding to the number of said at least one rectangular regions within the reference patch and the second patch;

a comparing means, for comparing the degrees of correlation for each number of said at least one rectangular regions, based on the plurality of the correlative values; and a synthesizing means, for generating a synthesized frame having a higher resolution than either of the two frames, by administering interpolation calculations on the images within the second patch and the reference patch, based on the correspondent relationships, which were estimated among the pixels of the reference patch and the second patch having the number of said at least one rectangular regions therein that yielded the highest degree of correlation.

4. A moving image synthesizing apparatus as defined in claim 3, wherein:

the correspondent relationships employed in the generation of the synthesized frame are those which are estimated for each of the rectangular regions.

5. A moving image synthesizing apparatus as defined in claim 3, wherein:

the correspondent relationship estimating means, the coordinate converting means, the correlative value calculating means, and the synthesizing means employ at least one component that constitutes the frames during the estimation of the correspondent relationships, the obtainment of the coordinate converted frames, the calculation of the correlative values, and the generation of the synthesized frame.

6. A moving image synthesizing apparatus, comprising:

a sampling means, for sampling at least three consecutive frames from a moving image;

a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among pixels within the second patch of the other frame and pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a correlative value, which represents a degree of correlation between the images within the reference patch of the reference frame and the coordinate converted frame;

a control means, for controlling the correspondent relationship estimating means, the coordinate converting means, and the correlative value calculating means, to vary the number of said at least one rectangular regions within the reference patch and the second patch in a stepwise manner, to estimate the correspondent relationships, to obtain the coordinate converted frames, and to calculate the correlative values for each number of said at least one rectangular regions, thereby obtaining a plurality of correlative values corresponding to the number of said at least one rectangular regions within the reference patch and the second patch;

a comparing means, for comparing the degrees of correlation for each number of said at least one rectangular regions, based on the plurality of the correlative values; and a synthesizing means, for: obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of said at least one rectangular regions therein that yielded the highest degree of correlation; obtaining a plurality of intermediate synthesized frames by estimating the correspondent relationships, obtaining the coordinate converted frames, calculating the plurality of correlative values, and comparing the correlations for all of the plurality of sampled frames; and generating a synthesized frame by synthesizing the plurality of intermediate synthesized frames.

7. A moving image synthesizing apparatus as defined in claim 6, wherein:

the correspondent relationships employed in the generation of the intermediate synthesized frame are those which are estimated for each of the rectangular regions.

8. A moving image synthesizing apparatus as defined in claim 6, wherein:

the correspondent relationship estimating means, the coordinate converting means, the correlative value calculating means, and the synthesizing means employ at least one component that constitutes the frames during the estimation of the correspondent relationships, the obtainment of the coordinate converted frames, the calculation of the correlative values, the generation of the intermediate synthesized frames, and the generation of the synthesized frame.

9. A computer readable medium having embodied thereon a program that causes a computer to execute a method for synthesizing moving images, comprising the procedures of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

varying the number of said at least one rectangular regions within the reference patch and the second patch in a stepwise manner, estimating the correspondent relationships, obtaining the coordinate converted frames, and calculating the correlative values for each number of said at least one rectangular regions, thereby obtaining a plurality of correlative values corresponding to the number of said at least one rectangular regions within the reference patch and the second patch;

comparing the degrees of correlation for each number of said at least one rectangular regions, based on the plurality of the correlative values; and generating a synthesized frame having a higher resolution than either of the two frames, by administering interpolation calculations on the images within the second patch and the reference patch, based on the correspondent relationships, which were estimated among the pixels of the reference patch and the second patch having the number of said at least one rectangular regions therein that yielded the highest degree of correlation.

10. A computer readable medium having embodied thereon a program that causes a computer to execute a method for synthesizing moving images, comprising the procedures of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

varying the number of said at least one rectangular regions within the reference patch and the second patch in a stepwise manner, estimating the correspondent relationships, obtaining the coordinate converted frames, and calculating the correlative values for each number of said at least one rectangular regions, thereby obtaining a plurality of correlative values corresponding to the number of said at least one rectangular regions within the reference patch and the second patch;

comparing the degrees of correlation for each number of said at least one rectangular regions, based on the plurality of the correlative values;

obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of said at least one rectangular regions therein that yielded the highest degree of correlation;

obtaining a plurality of intermediate synthesized frames by estimating the correspondent relationships, obtaining the coordinate converted frames, calculating the plurality of correlative values, and comparing the degrees of correlation for all of the plurality of sampled frames; and generating a synthesized frame by synthesizing the plurality of intermediate synthesized frames.

11. A method for synthesizing moving images, comprising the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

increasing the number of said at least one rectangular regions within the reference patch and the second patch in a stepwise manner, estimating the correspondent relationships, obtaining the coordinate converted frames, and calculating the correlative values for each number of said at least one rectangular regions, until the degree of correlation is greater than or equal to a predetermined threshold value; and generating a synthesized frame having a higher resolution than either of the two frames, by administering interpolation calculations on the images within the second patch and the reference patch, based on the correspondent relationships, which were estimated among the pixels of the reference patch and the second patch having the number of said at least one rectangular regions therein that yielded the degree of correlation greater than or equal to the threshold value.

12. A method for synthesizing moving images, comprising the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating correlative values, which represent a degree of correlation between the images within the reference patch of the reference frame and the coordinate converted frame, for each of the rectangular regions;

increasing the number of said at least one rectangular regions within the reference patch and the second patch, in a stepwise manner, estimating the correspondent relationships, obtaining the coordinate converted frames, and calculating the correlative values for each number of said at least one rectangular regions, until the degree of correlation or a representative degree of correlation of all of said at least one rectangular regions, or of said at least one rectangular regions at predetermined positions from among all of said at least one rectangular regions, other than those for which the degree of correlation is less than a predetermined value, or of a predetermined number of said at least one rectangular regions from among all of said at least one rectangular regions, other than those for which the degree of correlation is less than a predetermined value, becomes greater than or equal to a predetermined threshold value; and generating a synthesized frame having a higher resolution than either of the two frames, by administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the degree of correlation or the representative degree of correlation greater than or equal to the threshold value.

13. A method for synthesizing moving images, comprising the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

increasing the number of said at least one rectangular regions within the reference patch and the second patch in a stepwise manner, estimating the correspondent relationships, obtaining the coordinate converted frames, and calculating the correlative values for each number of said at least one rectangular regions, until the degree of correlation is greater than or equal to a predetermined threshold value;

obtaining an intermediate synthesized frame having a higher resolution than either the reference frame of the other frame, by administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the degree of correlation greater than or equal to the threshold value;

obtaining a plurality of intermediate synthesized frames by estimating the correspondent relationships, obtaining the coordinate converted frames, and calculating the plurality of correlative values, for all of the plurality of sampled frames; and generating a synthesized frame by synthesizing the plurality of intermediate synthesized frames.

14. A method for synthesizing moving images, comprising the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

increasing the number of said at least one rectangular regions within the reference patch and the second patch in a stepwise manner, estimating the correspondent relationships, obtaining the coordinate converted frames, and calculating the correlative values for each number of said at least one rectangular regions, until the degree of correlation or a representative degree of correlation of all of said at least one rectangular regions, or of said at least one rectangular regions at predetermined positions from among all of said at least one rectangular regions, other than those for which the degree of correlation is less than a predetermined value, or of a predetermined number of said at least one rectangular regions from among all of said at least one rectangular regions, other than those for which the degree of correlation is less than a predetermined value, becomes greater than or equal to a predetermined threshold value;

obtaining an intermediate synthesized frame having a higher resolution than either the reference frame of the other frame, by administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the degree of correlation or the representative degree of correlation greater than or equal to the threshold value;

obtaining a plurality of intermediate synthesized frames by estimating the correspondent relationships, obtaining the coordinate converted frames, and calculating the plurality of correlative values, for all of the plurality of sampled frames; and generating a synthesized frame by synthesizing the plurality of intermediate synthesized frames.

15. A moving image synthesizing apparatus comprising:
a sampling means, for sampling two consecutive frames from a moving image;
a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among pixels within the second patch of the other frame and pixels within the reference patch of the reference frame, based on the second patch after the movement and/or deformation thereof and the reference patch;
a coordinate converting means, for obtaining a coordinate converted frame, by coordinate converting the image within the second patch into a coordinate space of the reference frame, based on the correspondent relationships;
a correlative value calculating means, for calculating a correlative value, which represents a degree of correlation between the images within the reference patch of the reference frame and the coordinate converted frame;
a control means, for controlling the correspondent relationship estimating means, the coordinate converting means, and the correlative value calculating means, to increase the number of said at least one rectangular regions within the reference patch and the second patch in a stepwise manner, to estimate the correspondent relationships, to obtain the coordinate converted frames, and to calculate the correlative values for each number of said at least one rectangular regions, until the degree of correlation is greater than or equal to a predetermined threshold value; and
a synthesizing means, for generating a synthesized frame having a higher resolution than either of the two frames, by administering interpolation calculations on the images within the second patch and the reference patch, based on the correspondent relationships, which were estimated among the pixels of the reference patch and the second patch having the number of said at least one rectangular regions therein that yielded the degree of correlation greater than or equal to the predetermined threshold value.

16. A moving image synthesizing apparatus comprising:
a sampling means, for sampling two consecutive frames from a moving image;
a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among pixels within the second patch of the other frame and pixels within the reference patch of the reference frame, based on the second patch after the movement and/or deformation thereof and the reference patch;
a coordinate converting means, for obtaining a coordinate converted frame, by coordinate converting the image within the second patch into a coordinate space of the reference frame, based on the correspondent relationships;
a correlative value calculating means, for calculating a correlative value, which represents a degree of correlation between the images within the reference patch of the reference frame and the coordinate converted frame;
a control means, for controlling the correspondent relationship estimating means, the coordinate converting means, and the correlative value calculating means, to increase the number of said at least one rectangular regions within the reference patch and the second patch in a stepwise manner, to estimate the correspondent relationships, to obtain the coordinate converted frames, and to calculate the correlative values for each number of said at least one rectangular regions, until the degree of correlation or a representative degree of correlation of all of said at least one rectangular regions, or of said at least one rectangular regions at predetermined positions from among all of said at least one rectangular regions, other than those for which the degree of correlation is less than a predetermined value, or of a predetermined number of said at least one rectangular regions from among all of said at least one rectangular regions, other than those for which the degree of correlation is less than a predetermined value, becomes greater than or equal to a predetermined threshold value; and
a synthesizing means, for generating a synthesized frame having a higher resolution than either of the two frames, by administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the degree of correlation or the representative degree of correlation greater than or equal to the predetermined threshold value.

17. A moving image synthesizing apparatus as defined in claim 15, wherein:
the control means decreases the threshold value, according to the increase in the number of rectangular regions, until the number of rectangular regions reaches a predetermined value, and increases the threshold value, when the number of rectangular regions exceeds the predetermined value.

18. A moving image synthesizing apparatus as defined in claim 16, wherein:
the control means decreases the threshold value, according to the increase in the number of rectangular regions, until the number of rectangular regions reaches a predetermined value, and increases the threshold value, when the number of rectangular regions exceeds the predetermined value.

19. A moving image synthesizing apparatus as defined in claim 15, wherein:

the correspondent relationship estimating means, the coordinate converting means, the correlative value calculating means, and the synthesizing means employ at least one component that constitutes the frames during the estimation of the correspondent relationships, the obtainment of the coordinate converted frames, the calculation of the correlative values, and the generation of the synthesized frame.

20. A moving image synthesizing apparatus as defined in claim 16, wherein:
the correspondent relationship estimating means, the coordinate converting means, the correlative value calculating means, and the synthesizing means employ at least one component that constitutes the frames during the estimation of the correspondent relationships, the obtainment of the coordinate converted frames, the calculation of the correlative values, and the generation of the synthesized frame.

21. A moving image synthesizing apparatus, comprising:
a sampling means, for sampling at least three consecutive frames from a moving image;
a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among pixels within the second patch of the other frame and pixels within the reference patch of the reference frame, based on the second patch after the movement and/or deformation thereof and the reference patch;
a coordinate converting means, for obtaining a coordinate converted frame, by coordinate converting the image within the second patch into a coordinate space of the reference frame, based on the correspondent relationships;
a correlative value calculating means, for calculating a correlative value, which represents a degree of correlation between the images within the reference patch of the reference frame and the coordinate converted frame;
a control means, for controlling the correspondent relationship estimating means, the coordinate converting means, and the correlative value calculating means, to increase the number of said at least one rectangular regions within the reference patch and the second patch in a stepwise manner, to estimate the correspondent relationships, to obtain the coordinate converted frames, and to calculate the correlative values for each number of said at least one rectangular regions, until the degree of correlation is greater than or equal to a predetermined threshold value; and
a synthesizing means, for: obtaining an intermediate synthesized frame having a higher resolution than either the reference frame of the other frame, by: administering interpolation calculations on the images within the second patch and the reference patch, based on the correspondent relationships, which were estimated among the pixels of the reference patch and the second patch having the number of said at least one rectangular regions therein that yielded the degree of correlation greater than or equal to the threshold value; obtaining a plurality of intermediate synthesized frames by estimating the correspondent relationships obtaining the coordinate converted frames, and calculating the plurality of correlative values, for all of the plurality of sampled frames; and generating a synthesized frame by synthesizing the plurality of intermediate synthesized frames.

22. A moving image synthesizing apparatus, comprising:
a sampling means, for sampling at least three consecutive frames from a moving image;
a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among pixels within the second patch of the other frame and pixels within the reference patch of the reference frame, based on the second patch after the movement and/or deformation thereof and the reference patch;
a coordinate converting means, for obtaining a coordinate converted frame, by coordinate converting the image within the second patch into a coordinate space of the reference frame, based on the correspondent relationships;
a correlative value calculating means, for calculating a correlative value, which represents a degree of correlation between the images within the reference patch of the reference frame and the coordinate converted frame;
a control means, for controlling the correspondent relationship estimating means, the coordinate converting means, and the correlative value calculating means, to increase the number of said at least one rectangular regions within the reference patch and the second patch in a stepwise manner, to estimate the correspondent relationships, to obtain the coordinate converted frames, and to calculate the correlative values for each number of said at least one rectangular regions, until the degree of correlation or a representative degree of correlation of all of said at least one rectangular regions, or of said at least one rectangular regions at predetermined positions from among all of said at least one rectangular regions, other than those for which the degree of correlation is less than a predetermined value, or of a predetermined number of said at least one rectangular regions from among all of said at least one rectangular regions, other than those for which the degree of correlation is less than a predetermined value, becomes greater than or equal to a predetermined threshold value; and
a synthesizing means, for: obtaining an intermediate synthesized frame having a higher resolution than either the reference frame of the other frame, by: administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the degree of correlation or the representative degree of correlation greater than or equal to the threshold value; obtaining a plurality of intermediate synthesized frames by estimating the correspondent relationships obtaining the coordinate converted frames, and calculating the plurality of correlative values, for all of the plurality of sampled frames; and generating a synthesized frame by synthesizing the plurality of intermediate synthesized frames.

23. A moving image synthesizing apparatus as defined in claim 21, wherein:
the control means decreases the threshold value, according to the increase in the number of rectangular regions, until the number of rectangular regions reaches a predetermined value, and increases the threshold value, according to the increase in the number of rectangular regions, when the number of rectangular regions exceeds the predetermined value.

24. A moving image synthesizing apparatus as defined in claim 22, wherein:
the control means decreases the threshold value, according to the increase in the number of rectangular regions, until the number of rectangular regions reaches a predetermined value, and increases the threshold value, according to the increase in the number of rectangular regions, when the number of rectangular regions exceeds the predetermined value.

25. A moving image synthesizing apparatus as defined in claim 21, wherein:
the correspondent relationship estimating means, the coordinate converting means, the correlative value calculating means, and the synthesizing means employ at least one component that constitutes the frames during the estimation of the correspondent relationships, the obtainment of the coordinate converted frames, the calculation of the correlative values, the generation of the intermediate synthesized frames, and the generation of the synthesized frame.

26. A moving image synthesizing apparatus as defined in claim 22, wherein:
the correspondent relationship estimating means, the coordinate converting means, the correlative value calculating means, and the synthesizing means employ at least one component that constitutes the frames during the estimation of the correspondent relationships, the obtainment of the coordinate converted frames, the calculation of the correlative values, the generation of the intermediate synthesized frames, and the generation of the synthesized frame.

27. A computer readable medium having embodied thereon a program that causes a computer to execute a method for synthesizing moving images, comprising the procedures of:
sampling two consecutive frames from a moving image;
providing a reference patch having at least one rectangular region therein, in one of the two frames, which is designated as a reference frame;
providing a second patch, which is the same as the reference patch, in the other of the two frames;
moving and/or deforming the second patch in the other of the two frames so that an image within the second patch matches that within the reference image;
estimating correspondent relationships among pixels within the second patch of the other frame and pixels within the reference patch of the reference frame, based on the second patch after the movement and/or deformation thereof and the reference patch;
obtaining a coordinate converted frame, by coordinate converting the image within the second patch into a coordinate space of the reference frame, based on the correspondent relationships;
calculating a correlative value, which represents a degree of correlation between the images within the reference patch of the reference frame and the coordinate converted frame;
increasing the number of said at least one rectangular regions within the reference patch and the second patch in a stepwise manner, estimating the correspondent relationships, obtaining the coordinate converted frames, and calculating the correlative values for each number of said at least one rectangular regions, until the degree of correlation is greater than or equal to a predetermined threshold value; and
generating a synthesized frame having a higher resolution than either of the two frames, by administering interpolation calculations on the images within the second patch and the reference patch, based on the correspondent relationships, which were estimated among the pixels of the reference patch and the second patch having the number of said at least one rectangular regions therein that yielded the degree of correlation greater than or equal to the threshold value.

28. A computer readable medium having embodied thereon a program that causes a computer to execute a method for synthesizing moving images, comprising the procedures of:
sampling two consecutive frames from a moving image;
providing a reference patch having at least one rectangular region therein, in one of the two frames, which is designated as a reference frame;
providing a second patch, which is the same as the reference patch, in the other of the two frames;
moving and/or deforming the second patch in the other of the two frames so that an image within the second patch matches that within the reference image;
estimating correspondent relationships among pixels within the second patch of the other frame and pixels within the reference patch of the reference frame, based on the second patch after the movement and/or deformation thereof and the reference patch;
obtaining a coordinate converted frame, by coordinate converting the image within the second patch into a coordinate space of the reference frame, based on the correspondent relationships;
calculating correlative values, which represent a degree of correlation between the images within the reference patch of the reference frame and the coordinate converted frame, for each of the rectangular regions;
increasing the number of said at least one rectangular regions within the reference patch and the second patch, in a stepwise manner, estimating the correspondent relationships, obtaining the coordinate converted frames, and calculating the correlative values for each number of said at least one rectangular regions, until the degree of correlation or a representative degree of correlation of all of said at least one rectangular regions, or of said at least one rectangular regions at predetermined positions from among all of said at least one rectangular regions, other than those for which the degree of correlation is less than a predetermined value, or of a predetermined number of said at least one rectangular regions from among all of said at least one rectangular regions, other than those for which the degree of correlation is less than a predetermined value, becomes greater than or equal to a predetermined threshold value; and
generating a synthesized frame having a higher resolution than either of the two frames, by administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the degree of correlation or the representative degree of correlation greater than or equal to the threshold value.

29. A computer readable medium having embodied thereon a program that causes a computer to execute a method for synthesizing moving images, comprising the procedures of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

increasing the number of said at least one rectangular regions within the reference patch and the second patch in a stepwise manner, estimating the correspondent relationships, obtaining the coordinate converted frames, and calculating the correlative values for each number of said at least one rectangular regions, until the degree of correlation is greater than or equal to a predetermined threshold value;

obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of said at least one rectangular regions therein that yielded the degree of correlation greater than or equal to the threshold value;

obtaining a plurality of intermediate synthesized frames by estimating the correspondent relationships, obtaining the coordinate converted frames, and calculating the plurality of correlative values, for all of the plurality of sampled frames; and generating a synthesized frame by synthesizing the plurality of intermediate synthesized frames.

30. A computer readable medium having embodied thereon a program that causes a computer to execute a method for synthesizing moving images, comprising the procedures of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a correlative value, which represents a degree of correlation between the images within the reference patch of the reference frame and the coordinate converted frame;

increasing the number of said at least one rectangular regions within the reference patch and the second patch in a stepwise manner, estimating the correspondent relationships, obtaining the coordinate converted frames, and calculating the correlative values for each number of said at least one rectangular regions, until the degree of correlation or a representative degree of correlation of all of said at least one rectangular regions, or of said at least one rectangular regions at predetermined positions from among all of said at least one rectangular regions, other than those for which the degree of correlation is less than a predetermined value, or of a predetermined number of said at least one rectangular regions from among all of said at least one rectangular regions, other than those for which the degree of correlation is less than a predetermined value, becomes greater than or equal to a predetermined threshold value;

obtaining an intermediate synthesized frame having a higher resolution than either the reference frame of the other frame, by administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the degree of correlation or the representative degree of correlation greater than or equal to the threshold value;

obtaining a plurality of intermediate synthesized frames by estimating the correspondent relationships, obtaining the coordinate converted frames, and calculating the plurality of correlative values, for all of the plurality of sampled frames; and generating a synthesized frame by synthesizing the plurality of intermediate synthesized frames.

31. A method for synthesizing moving images, comprising the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents a degree of correlation between the images within the reference patch of the reference frame and the coordinate converted frame;

increasing the number of said at least one rectangular regions within the reference patch and the second patch in a stepwise manner by one step, estimating the correspondent relationships, obtaining the coordinate converted frames, and calculating the correlative value, thereby obtaining a second correlative value;

calculating the variation between the first and second correlative values;

increasing the number of said at least one rectangular regions within the reference patch and the second patch in a stepwise manner an additional step, estimating the correspondent relationships, obtaining the coordinate converted frames, calculating the first and second correlative values, and calculating the variation between the first and second correlative values of consecutive steps, until the variation becomes less than or equal to a predetermined threshold value; and generating a synthesized frame having a higher resolution than either of the two frames, by administering interpolation calculations on the images within the second patch and the reference patch, based on the correspondent relationships, which were estimated among the pixels of either of the reference patches and the second patches having the number of said at least one rectangular regions therein that yielded the variation less than or equal to the threshold value.

32. A method for synthesizing moving images, comprising the steps of:

sampling two consecutive frames from a moving image;

providing a reference patch having at least one rectangular region therein, in one of the two frames, which is designated as a reference frame;

providing a second patch, which is the same as the reference patch, in the other of the two frames;

moving and/or deforming the second patch in the other of the two frames so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents a degree of correlation between the images within the reference patch of the reference frame and the coordinate converted frame, for each of the rectangular regions;

increasing the number of said at least one rectangular regions within the reference patch and the second patch in a stepwise manner by one step, estimating the correspondent relationships, obtaining the coordinate converted frames, and calculating the correlative value, thereby obtaining a second correlative value;

calculating the variation between the first and second correlative values for each of the rectangular regions;

increasing the number of said at least one rectangular regions within the reference patch and the second patch in a stepwise manner an additional step, estimating the correspondent relationships, obtaining the coordinate converted frames, calculating the first and second correlative values, and calculating the variation between the first and second correlative values of consecutive steps, until the variation or a representative variation of all of said at least one rectangular regions, or of said at least one rectangular regions at predetermined positions from among all of said at least one rectangular regions, other than those for which the variation is greater than or equal to a predetermined value, or of a predetermined number of said at least one rectangular regions from among all of said at least one rectangular regions, other than those for which the variation is greater than or equal to a predetermined value, becomes less than or equal to a predetermined threshold value; and generating a synthesized frame having a higher resolution than either of the two frames, by administering interpolation calculations on the images within the second patch and the reference patch for each region corresponding to said at least one rectangular regions, based on the correspondent relationships, which were estimated among the pixels of either of the reference patches and the second patches having the number of said at least one rectangular regions therein that yielded the variation or the representative variation less than or equal to the threshold value.

33. A method for synthesizing moving images, comprising the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents a degree of correlation between the images within the reference patch of the reference frame and the coordinate converted frame;

increasing the number of said at least one rectangular regions within the reference patch and the second patch in a stepwise manner by one step, estimating the correspondent relationships, obtaining the coordinate converted frames, and calculating the correlative value, thereby obtaining a second correlative value;

calculating the variation between the first and second correlative values;

increasing the number of said at least one rectangular regions within the reference patch and the second patch in a stepwise manner an additional step, estimating the correspondent relationships, obtaining the coordinate converted frames, calculating the first and second correlative values, and calculating the variation between the first and second correlative values of consecutive steps, until the variation becomes less than or equal to a predetermined threshold value;

obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of said at least one rectangular regions therein that yielded the variation less than or equal to the threshold value;

obtaining a plurality of intermediate synthesized frames by estimating the correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

34. A method for synthesizing moving images, comprising the steps of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents a degree of correlation between the images within the reference patch of the reference frame and the coordinate converted frame, for each of the rectangular regions;

increasing the number of said at least one rectangular regions within the reference patch and the second patch in a stepwise manner by one step, estimating the correspondent relationships, obtaining the coordinate converted frames, and calculating the correlative value, thereby obtaining a second correlative value;

calculating the variation between the first and second correlative values for each of the rectangular regions;

increasing the number of said at least one rectangular regions within the reference patch and the second patch in a stepwise manner an additional step, estimating the correspondent relationships, obtaining the coordinate converted frames, calculating the first and second correlative values, and calculating the variation between the first and second correlative values of consecutive steps, until the variation or a representative variation of all of said at least one rectangular regions, or of said at least one rectangular regions at predetermined positions from among all of said at least one rectangular regions, other than those for which the variation is greater than or equal to a predetermined value, or of a predetermined number of said at least one rectangular regions from among all of said at least one rectangular regions, other than those for which the variation is greater than or equal to a predetermined value, becomes less than or equal to a predetermined threshold value;

obtaining an intermediate synthesized frame having a higher resolution than either the reference frame of the other frame, by administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the variation or the representative variation less than or equal to the threshold value;

obtaining a plurality of intermediate synthesized frames by estimating the correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

35. A moving image synthesizing apparatus, comprising:

a sampling means, for sampling two consecutive frames from a moving image;

a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among pixels within the second patch of the other frame and pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a first correlative value, which represents a degree of correlation between the images within the reference patch of the reference frame and the coordinate converted frame;

a control means, for controlling the correspondent relationship estimating means, the coordinate converting means, and the correlative value calculating means, to increase the number of said at least one rectangular regions within the reference patch and the second patch in a stepwise manner by one step, to estimate the correspondent relationships, to obtain the coordinate converted frames, and to calculate the correlative value, thereby obtaining a second correlative value;

a variation calculating means, for calculating the variation between the first and second correlative values;

a comparing means, for controlling the correspondent relationship estimating means, the coordinate converting means, the correlative relationship calculating means, and the variation calculating means, to increase the number of said at least one rectangular regions within the reference patch and the second patch in a stepwise manner an additional step, to estimate the correspondent relationships, to obtain the coordinate converted frames, to calculate the first and second correlative values, and to calculate the variation between the first and second correlative values of consecutive steps, until the variation becomes less than or equal to a predetermined threshold value; and a synthesizing means, for generating a synthesized frame having a higher resolution than either of the two frames, by administering interpolation calculations on the images within the second patch and the reference patch, based on the correspondent relationships, which were estimated among the pixels of either of the reference patches and the second patches having the number of said at least one rectangular regions therein that yielded the variation less than or equal to the threshold value.

36. A moving image synthesizing apparatus, comprising:

a sampling means, for sampling two consecutive frames from a moving image;

a correspondent relationship estimating means, for: providing a reference patch having at least one rectangular region therein, in one of the two frames, which is designated as a reference frame; providing a second patch, which is the same as the reference patch, in the other of the two frames; moving and/or deforming the second patch in the other of the two frames so that an image within the second patch matches that within the reference image; and estimating correspondent relationships among pixels within the second patch of the other frame and pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a first correlative value, which represents a degree of correlation between the images within the reference patch of the reference frame and the coordinate converted frame, for each of the rectangular regions;

a control means, for controlling the correspondent relationship estimating means, the coordinate converting means, and the correlative value calculating means, to increase the number of said at least one rectangular regions within the reference patch and the second patch in a stepwise manner by one step, to estimate the correspondent relationships, to obtain the coordinate converted frames, and to calculate the correlative value, thereby obtaining a second correlative value;

a variation calculating means, for calculating the variation between the first and second correlative values for each of the rectangular regions;

a comparing means, for controlling the correspondent relationship estimating means, the coordinate converting means, the correlative relationship calculating means, and the variation calculating means, to increase the number of said at least one rectangular regions within the reference patch and the second patch in a stepwise manner an additional step, to estimate the correspondent relationships, to obtain the coordinate converted frames, to calculate the first and second correlative values, and to calculate the variation between the first and second correlative values of consecutive steps, until the variation or a representative variation of all of said at least one rectangular regions, or of said at least one rectangular regions at predetermined positions from among all of the said at least one rectangular regions, other than those for which the variation is greater than or equal to a predetermined value, or of a predetermined number of said at least one rectangular regions from among all of said at least one rectangular regions, other than those for which the variation is greater than or equal to a predetermined value, becomes less than or equal to a predetermined threshold value; and a synthesizing means, for generating a synthesized frame having a higher resolution than either of the two frames, by administering interpolation calculations on the images within the second patch and the reference patch for each region corresponding to said at least one rectangular regions, based on the correspondent relationships, which were estimated among the pixels of either of the reference patches and the second patches having the number of said at least one rectangular regions therein that yielded the variation or the representative variation less than or equal to the threshold value.

37. A moving image synthesizing apparatus as defined in claim 35, wherein:

the control means sets the predetermined threshold value to be larger, according to the increase in the number of rectangular regions, when the number of rectangular regions exceeds a predetermined value.

38. A moving image synthesizing apparatus as defined in claim 36, wherein:

the control means sets the predetermined threshold value to be larger, according to the increase in the number of rectangular regions, when the number of rectangular regions exceeds a predetermined value.

39. A moving image synthesizing apparatus as defined in claim 35, wherein:

the correspondent relationship estimating means, the coordinate converting means, the correlative value calculating means, the control means, the variation calculating means, the comparing means, and the synthesizing means employ at least one component that constitutes the frames during the estimation of the correspondent relationships, the obtainment of the coordinate converted frames, the calculation of the correlative values, the calculation of the variations, and the generation of the synthesized frame.

40. A moving image synthesizing apparatus as defined in claim 36, wherein:

the correspondent relationship estimating means, the coordinate converting means, the correlative value calculating means, the control means, the variation calculating means, the comparing means, and the synthesizing means employ at least one component that constitutes the frames during the estimation of the correspondent relationships, the obtainment of the coordinate converted frames, the calculation of the correlative values, the calculation of the variations, and the generation of the synthesized frame.

41. A moving image synthesizing apparatus, comprising:

a sampling means, for sampling at least three consecutive frames from a moving image;

a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among pixels within the second patch of the other frame and pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a first correlative value, which represents a degree of correlation between the images within the reference patch of the reference frame and the coordinate converted frame;

a control means, for controlling the correspondent relationship estimating means, the coordinate converting means, and the correlative value calculating means, to increase a number of said at least one rectangular regions within the reference patch and the second patch in a stepwise manner by one step, to estimate the correspondent relationships, to obtain the coordinate converted frames, and to calculate the correlative value, thereby obtaining a second correlative value;

a variation calculating means, for calculating the variation between the first and second correlative values;

a comparing means, for controlling the correspondent relationship estimating means, the coordinate converting means, the correlative value calculating means, and the variation calculating means, to increase the number of said at least one rectangular regions within the reference patch and the second patch in a stepwise manner an additional step, to estimate the correspondent relationships, to obtain the coordinate converted frames, to calculate the first and second correlative values, and to calculate the variation between the first and second correlative values of consecutive steps, until the variation becomes less than or equal to a predetermined threshold value; and a synthesizing means, for: obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of said at least one rectangular regions therein that yielded the variation less than or equal to the threshold value; obtaining a plurality of intermediate synthesized frames by estimating the correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

42. A moving image synthesizing apparatus, comprising:

a sampling means, for sampling at least three consecutive frames from a moving image;

a correspondent relationship estimating means, for: providing a reference patch having at least one rectangular region therein, in a first frame from among the at least three sampled frames, which is designated as a reference frame; providing a second patch, which is the same as the reference patch, in another of the plurality of sampled frames; moving and/or deforming the second patch in the other frame so that an image within the second patch matches that within the reference image; and estimating correspondent relationships among pixels within the second patch of the other frame and pixels within the reference patch of the reference frame, based on the second patch after the movement and/or deformation thereof and the reference patch;

a coordinate converting means, for obtaining a coordinate converted frame, by coordinate converting the image within the second patch into a coordinate space of the reference frame, based on the correspondent relationships;

a correlative value calculating means, for calculating a first correlative value, which represents a degree of correlation between the images within the reference patch of the reference frame and the coordinate converted frame, for each of the rectangular regions;

a control means, for controlling the correspondent relationship estimating means, the coordinate converting means, and the correlative value calculating means, to increase a number of rectangular regions within the reference patch and the second patch in a stepwise manner by one step, to estimate the correspondent relationships, to obtain the coordinate converted frames, and to calculate the correlative value, thereby obtaining a second correlative value;

a variation calculating means, for calculating the variation between the first and second correlative values for each of the rectangular regions;

a comparing means, for controlling the correspondent relationship estimating means, the coordinate converting means, the correlative value calculating means, and the variation calculating means, to increase the number of said at least one rectangular regions within the reference patch and the second patch in a stepwise manner an additional step, to estimate the correspondent relationships, to obtain the coordinate converted frames, to calculate the first and second correlative values, and to calculate the variation between the first and second correlative values of consecutive steps, until the variation of all of said at least one rectangular regions, or of said at least one rectangular regions at predetermined positions from among all of said at least one rectangular regions, other than those for which the variation is greater than or equal to a predetermined value, or of a predetermined number of said at least one rectangular regions from among all of said at least one rectangular regions, other than those for which the variation is greater than or equal to a predetermined value, becomes less than or equal to a predetermined threshold value; and a synthesizing means, for: obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of said at least one rectangular regions therein that yielded the variation or the representative variation less than or equal to the threshold value; obtaining a plurality of intermediate synthesized frames by estimating the correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

43. A moving image synthesizing apparatus as defined in claim 41, wherein:
the control means sets the predetermined threshold value to be larger, according to the increase in the number of rectangular regions, when the number of rectangular regions exceeds a predetermined value.

44. A moving image synthesizing apparatus as defined in claim 42, wherein:
the control means sets the predetermined threshold value to be larger, according to the increase in the number of rectangular regions, when the number of rectangular regions exceeds a predetermined value.

45. A moving image synthesizing apparatus as defined in claim 41, wherein:
the correspondent relationship estimating means, the coordinate converting means, the correlative value calculating means, the control means, the variation calculating means, the comparing means, and the synthesizing means employ at least one component that constitutes the frames during the estimation of the correspondent relationships, the obtainment of the coordinate converted frames, the calculation of the correlative values, the calculation of the variations, the generation of the intermediate synthesized frames, and the generation of the synthesized frame.

46. A moving image synthesizing apparatus as defined in claim 42, wherein:
the correspondent relationship estimating means, the coordinate converting means, the correlative value calculating means, the control means, the variation calculating means, the comparing means, and the synthesizing means employ at least one component that constitutes the frames during the estimation of the correspondent relationships, the obtainment of the coordinate converted frames, the calculation of the correlative values, the calculation of the variations, the generation of the intermediate synthesized frames, and the generation of the synthesized frame.

47. A computer readable medium having embodied thereon a program that causes a computer to execute a method for synthesizing moving images, comprising the procedures of:
sampling two consecutive frames from a moving image;
providing a reference patch having at least one rectangular region therein, in one of the two frames, which is designated as a reference frame;
providing a second patch, which is the same as the reference patch, in the other of the two frames;
moving and/or deforming the second patch in the other of the two frames so that an image within the second patch matches that within the reference image;
estimating correspondent relationships among pixels within the second patch of the other frame and pixels within the reference patch of the reference frame, based on the second patch after the movement and/or deformation thereof and the reference patch;
obtaining a coordinate converted frame, by coordinate converting the image within the second patch into a coordinate space of the reference frame, based on the correspondent relationships;
calculating a first correlative value, which represents a degree of correlation between the images within the reference patch of the reference frame and the coordinate converted frame;
increasing the number of said at least one rectangular regions within the reference patch and the second patch in a stepwise manner by one step, estimating the correspondent relationships, obtaining the coordinate converted frames, and calculating the correlative value, thereby obtaining a second correlative value;
calculating the variation between the first and second correlative values;
increasing the number of said at least one rectangular regions within the reference patch and the second patch in a stepwise manner an additional step, estimating the correspondent relationships, obtaining the coordinate converted frames, calculating the first and second correlative values, and calculating the variation between the first and second correlative values of consecutive steps, until the variation becomes less than or equal to a predetermined threshold value; and
generating a synthesized frame having a higher resolution than either of the two frames, by administering interpolation calculations on the images within the second patch and the reference patch, based on the correspondent relationships, which were estimated among the pixels of either of the reference patches and the second patches having the number of said at least one rectangular regions therein that yielded the variation less than or equal to the threshold value.

48. A computer readable medium having embodied thereon a program that causes a computer to execute a method for synthesizing moving images, comprising the procedures of:
sampling two consecutive frames from a moving image;
providing a reference patch having at least one rectangular region therein, in one of the two frames, which is designated as a reference frame;
providing a second patch, which is the same as the reference patch, in the other of the two frames;
moving and/or deforming the second patch in the other of the two frames so that an image within the second patch matches that within the reference image;
estimating correspondent relationships among pixels within the second patch of the other frame and pixels within the reference patch of the reference frame, based on the second patch after the movement and/or deformation thereof and the reference patch;
obtaining a coordinate converted frame, by coordinate converting the image within the second patch into a coordinate space of the reference frame, based on the correspondent relationships;
calculating a first correlative value, which represents a degree of correlation between the images within the reference patch of the reference frame and the coordinate converted frame, for each of said at least one rectangular regions;
increasing the number of said at least one rectangular regions within the reference patch and the second patch in a stepwise manner by one step, estimating the correspondent relationships, obtaining the coordinate converted frames, and calculating the correlative value, thereby obtaining a second correlative value;

calculating the variation between the first and second correlative values for each of said at least one rectangular regions;

increasing the number of said at least one rectangular regions within the reference patch and the second patch in a stepwise manner an additional step, estimating the correspondent relationships, obtaining the coordinate converted frames, calculating the first and second correlative values, and calculating the variation between the first and second correlative values of consecutive steps, until the variation or a representative variation of all of said at least one rectangular regions, or of said at least one rectangular regions at predetermined positions from among all of said at least one rectangular regions, other than those for which the variation is greater than or equal to a predetermined value, or of a predetermined number of said at least one rectangular regions from among all of said at least one rectangular regions, other than those for which the variation is greater than or equal to a predetermined value, becomes less than or equal to a predetermined threshold value; and generating a synthesized frame having a higher resolution than either of the two frames, by administering interpolation calculations on the images within the second patch and the reference patch for each region corresponding to the rectangular regions, based on the correspondent relationships, which were estimated among the pixels of either of the reference patches and the second patches having the number of said at least one rectangular regions therein that yielded the variation or the representative variation less than or equal to the threshold value.

49. A computer readable medium having embodied thereon a program that causes a computer to execute a method for synthesizing moving images, comprising the procedures of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents a degree of correlation between the images within the reference patch of the reference frame and the coordinate converted frame;

increasing the number of said at least one rectangular regions within the reference patch and the second patch in a stepwise manner by one step, estimating the correspondent relationships, obtaining the coordinate converted frames, and calculating the correlative value, thereby obtaining a second correlative value;

calculating the variation between the first and second correlative values;

increasing the number of said at least one rectangular regions within the reference patch and the second patch in a stepwise manner an additional step, estimating the correspondent relationships, obtaining the coordinate converted frames, calculating the first and second correlative values, and calculating the variation between the first and second correlative values of consecutive steps, until the variation becomes less than or equal to a predetermined threshold value;

obtaining an intermediate synthesized frame having a higher resolution than either the reference frame of the other frame, by administering interpolation calculations on the images within the second patch and the reference patch, based on the correspondent relationships, which were estimated among the pixels of the reference patch and the second patch having the number of said at least one rectangular regions therein that yielded the variation less than or equal to the threshold value;

obtaining a plurality of intermediate synthesized frames by estimating the correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

50. A computer readable medium having embodied thereon a program that causes a computer to execute a method for synthesizing moving images, comprising the procedures of:

sampling at least three consecutive frames from a moving image;

providing a reference patch having at least one rectangular region therein, in a first frame from among the at least three sampled frames, which is designated as a reference frame;

providing a second patch, which is the same as the reference patch, in another of the plurality of sampled frames;

moving and/or deforming the second patch in the other frame so that an image within the second patch matches that within the reference image;

estimating correspondent relationships among pixels within the second patch of the other frame and pixels within the reference patch of the reference frame, based on the second patch after the movement and/or deformation thereof and the reference patch;

obtaining a coordinate converted frame, by coordinate converting the image within the second patch into a coordinate space of the reference frame, based on the correspondent relationships;

calculating a first correlative value, which represents a degree of correlation between the images within the reference patch of the reference frame and the coordinate converted frame, for each of the rectangular regions;

increasing the number of said at least one rectangular regions within the reference patch and the second patch in a stepwise manner by one step, estimating the correspondent relationships, obtaining the coordinate converted frames, and calculating the correlative value, thereby obtaining a second correlative value;

calculating the variation between the first and second correlative values for each of the rectangular regions;

increasing the number of said at least one rectangular regions within the reference patch and the second patch in a stepwise manner an additional step, estimating the correspondent relationships, obtaining the coordinate converted frames, calculating the first and second correlative values, and calculating the variation between the first and second correlative values of consecutive steps, until the variation or a representative variation of all of said at least one rectangular regions, or of said at least one rectangular regions at predetermined positions from among all of said at least one rectangular regions, other than those for which the variation is greater than or equal to a predetermined value, or of a predetermined number of said at least one rectangular regions from among all of said at least one rectangular regions, other than those for which the variation is greater than or equal to a predetermined value, becomes less than or equal to a predetermined threshold value;

obtaining an intermediate synthesized frame having a higher resolution than either the reference frame of the other frame, by administering interpolation calculations on the images within the second patch and the reference patch for each region corresponding to said at least one rectangular regions, based on the correspondent relationships, which were estimated among the pixels of the reference patch and the second patch having the number of said at least one rectangular regions therein that yielded the variation or the representative variation less than or equal to the threshold value;

obtaining a plurality of intermediate synthesized frames by estimating the correspondent relationships, obtaining the coordinate converted frames, calculating the plurality of correlative values, and calculating the variations among the plurality of the correlative values, for all of the plurality of sampled frames; and generating a synthesized frame by synthesizing the plurality of intermediate synthesized frames.

* * * * *